United States Patent [19]
Moncrieff

[11] Patent Number: 5,442,516
[45] Date of Patent: Aug. 15, 1995

[54] METHOD FOR CONTROLLING ELECTRIC CHARGE MOVEMENT BY SEGEMENTING CONDUCTIVE SURFACE

[76] Inventor: J. Peter Moncrieff, 408 Mason Rd., Vista, Calif. 92084

[21] Appl. No.: 176,333

[22] Filed: Jan. 3, 1994

Related U.S. Application Data

[63] Continuation-in-part of Ser. No. 6,370, Jan. 19, 1993, abandoned.

[51] Int. Cl.$^6$ ............................................. H01G 4/005
[52] U.S. Cl. .................................. 361/303; 361/301.4; 361/301.5; 361/330
[58] Field of Search .................. 361/272, 273, 301.1, 361/303, 304, 306.1, 306.3, 308.1, 308.3, 309, 321.2, 321.3, 328, 330, 301.4, 301.5

[56] References Cited

U.S. PATENT DOCUMENTS

| | | | |
|---|---|---|---|
| 1,899,176 | 2/1933 | Bailey | 361/303 |
| 2,090,360 | 8/1937 | Sprague | 361/308.3 |
| 2,216,558 | 10/1940 | Ortlieb | 361/304 |
| 2,758,256 | 8/1956 | Eisler | 361/271 |
| 3,009,086 | 11/1961 | Rice et al. | 361/308.3 |
| 3,104,377 | 9/1963 | Alexander et al. | 361/303 |
| 3,248,619 | 4/1966 | Ferrante | 361/273 |
| 3,670,378 | 6/1972 | Behn et al. | 361/323 |
| 3,737,805 | 6/1973 | Shimodaira et al. | 361/271 |
| 3,764,938 | 10/1973 | Barnes | 361/303 |
| 3,892,023 | 7/1975 | Warmont | 29/25.42 |
| 3,921,041 | 11/1975 | Stockman | 29/25.42 X |
| 4,348,714 | 9/1982 | Wallace | 29/25.42 X |
| 4,433,359 | 2/1984 | Hamabe et al. | 361/273 |
| 4,475,967 | 10/1984 | Kanai et al. | 361/309 |
| 4,638,402 | 1/1987 | Lim et al. | 361/328 |
| 4,719,537 | 1/1988 | Gizolme | 361/273 |
| 4,814,940 | 3/1989 | Horstmann et al. | 361/309 |
| 4,856,102 | 8/1989 | Insetta et al. | 361/330 |
| 5,057,967 | 10/1991 | Den et al. | 361/328 |
| 5,099,387 | 3/1992 | Kato et al. | 361/321.2 |
| 5,136,462 | 8/1992 | Steiner | 361/273 |
| 5,172,299 | 12/1992 | Yamada et al. | 361/321.2 |

FOREIGN PATENT DOCUMENTS

| | | | |
|---|---|---|---|
| 0169226 | 1/1990 | European Pat. Off. | H01G 1/005 |
| 4346408 | 12/1992 | Japan | 361/311 |
| 351516 | 6/1931 | United Kingdom | 361/298.3 |

*Primary Examiner*—Bruce A. Reynolds
*Assistant Examiner*—Gregory Mills

[57] ABSTRACT

A capacitor structure which provides improved electrical performance, utilizing a segmented plate and varied registration alignment. A method for providing improved electrical performance in a capacitor, utilizing a segmented plate structure with varied registration alignment.

13 Claims, 18 Drawing Sheets

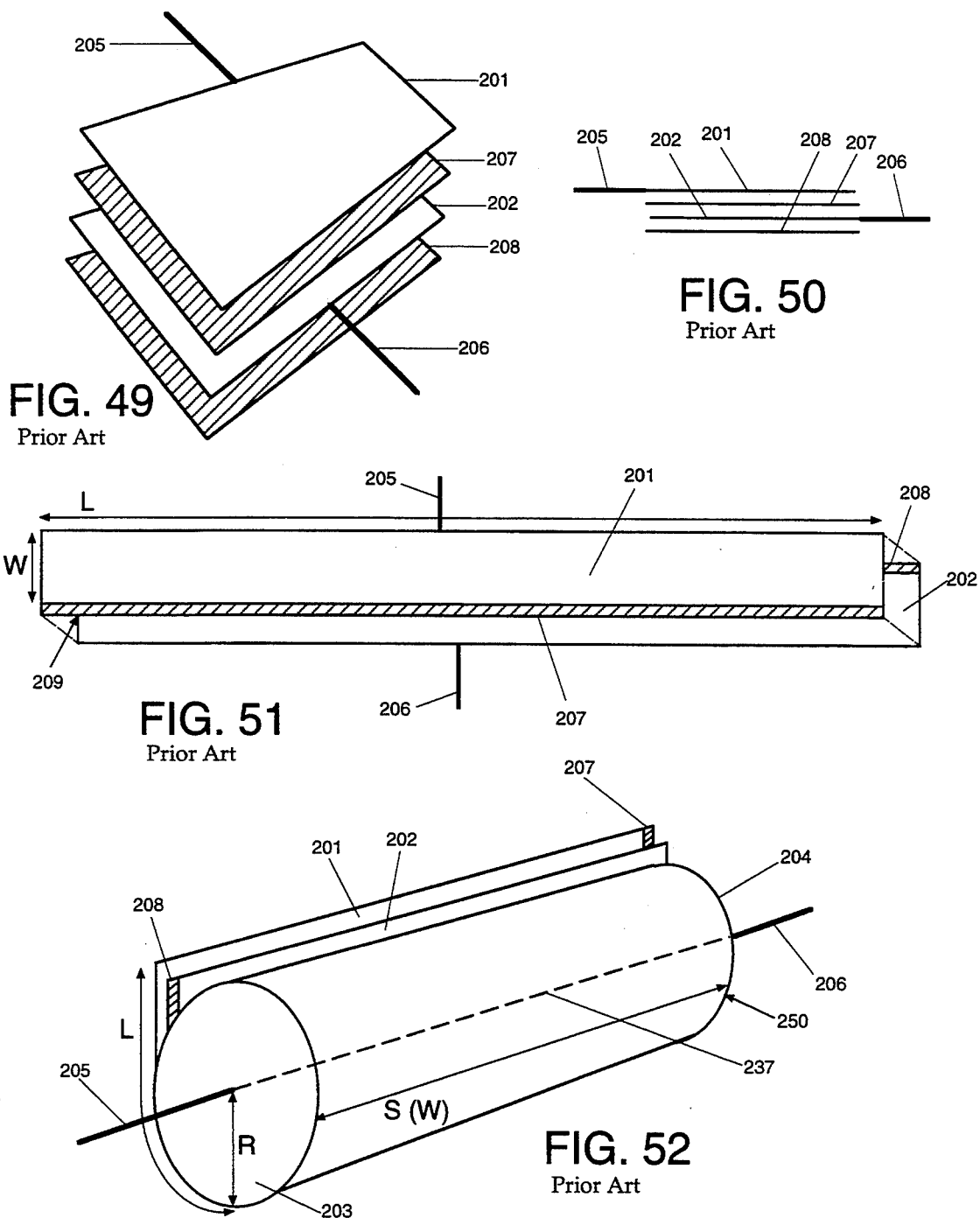

METHOD FOR CONTROLLING ELECTRIC CHARGE MOVEMENT BY SEGEMENTING CONDUCTIVE SURFACE

RELATED APPLICATIONS

This application is a continuation-in-part of U.S. patent application Ser. No. 08/006,370 filed Jan. 19, 1993 and now abandoned.

BACKGROUND OF THE INVENTION

1. Field of the Invention

This invention relates to electrical capacitors, and to structures and methods for improving the electrical performance thereof, utilizing a segmented plate.

2. Description of Prior Art

A basic capacitor comprises two conductive plate electrodes separated by a dielectric. The normal basic capacitor structure employed by the art is shown in FIG. 1, in perspective view. A plate 1 is placed adjacent to a dielectric substrate 7, and a second plate 2 is placed adjacent to a dielectric substrate 8. Dielectric substrates 7,8 are shown hatched in FIG. 1 and some succeeding figures, for the sake of clarity.

In the conventional prior art structure, plate 1 is a single contiguous conductive surface, whereby no interruption of the conductive surface occurs within the confines of the outer perimeter dimensions of plate 1; the same is true of plate 2.

Plates 1 and 2 may be said to be of opposite polarity; this nomenclature arises from the fact that, as excess charge of one polarity is put into one plate, excess charge of the opposite polarity accumulates in the other plate, and this is the basis of a capacitor's operation. A terminal 5 is normally used to connect plate 1 to the external world, and a second terminal 6 is normally used to connect plate 2 to the external world.

In order to make a capacitor having usefully large capacitance in a usefully small space, the art normally uses one of two techniques: making a stacked capacitor or a roll capacitor.

I. Stacked Capacitors

A typical stacked capacitor is shown in FIG. 2, in cross sectional view. A stacked capacitor essentially consists of multiples of the basic capacitor of FIG. 1, that is multiple separate capacitors, stacked vertically atop one another and electrically connected in parallel. As shown in FIG. 2, there are multiple plates 1, multiple dielectric substrates 7, multiple plates 2, and multiple dielectric substrates 8. A conductive end spray 3 connects the multiple plates 1 in parallel, and end spray 3 is then connected to a single terminal 5; likewise, a conductive end spray 4 connects the multiple plates 2 in parallel, and end spray 4 is connected to a single terminal 6. The dielectric substrates 7 normally extend beyond plates 1 on the side adjacent to end spray 4, by a small edge safety margin 9, to prevent electrical connection between the plates 1 and end spray 4; likewise, dielectric substrates 8 extend beyond plates 2 on the side adjacent to end spray 3, by a small edge safety margin 10, to prevent electrical connection between plates 2 and end spray 3. Edge safety margins 9,10 are not necessarily physically distinct structural elements, but can merely be a geometrical description of an absence of conductive plate electrode 1 or 2 adjacent to an area of dielectric substrate 7 or 8, along one edge of the dielectric substrate as shown.

In FIG. 2 each plate 1 is again a single contiguous conductive surface, whereby no interruption of the conductive surface occurs within the confines of the outer perimeter dimensions of plate 1; the same is true of plate 2. The edges of all plates 1 are registered in vertical alignment with one another, the edges of all plates 2 are also registered in vertical alignment with one another, and the edges of plates 1 are substantially vertically aligned with the edges of plates 2, within the confines of the vertical stack of plates. Every plate 1 is contiguous to the edges of vertical registration alignment with plate 2. These structural features will be seen to be in contrast to the structure employed by the present invention.

Common usage dictates that a that a planar conductive surface used in a capacitor is called a plate, and that two distinct and separate conductive surfaces located in their entirety on two different planes in space are necessarily two distinct, separate plates; they cannot be called two segments of the same plate. Thus, the multiple plates 1 of FIG. 2 cannot be said to be segments of a single plate, and this prior art (e.g. Behn, Horstmann FIGS. 1 and 3) cannot be said to be employing any single plate that comprises a plurality of segments, as does the present invention.

Additionally, the stacked capacitor of FIG. 2 actually consists topologically of multiple distinct capacitors stacked vertically and electrically connected in parallel, since each pair of adjacent opposite polarity plates forms a distinct capacitor. Each of these distinct capacitors employs a plate structure that is a single contiguous conductive surface.

Furthermore, there is a concise topological differentiator that characterizes this prior art of stacked capacitors, and will be seen to be in contrast to the present invention. In a stacked capacitor, no plate is adjacent to another plate of the same polarity, since a plate of opposite polarity always is interposed topologically in three dimensional space between plates of the same polarity, and the edges of all plates are substantially vertically aligned in the vertical stack. No direct straight line can be drawn in three dimensional space that connects the main portion of two plates of the same polarity without touching a plate of opposite polarity (discounting small edge safety margin areas 9,10, or Horstmann's connecting tabs 16). No two planar plates of the same polarity can have any subareas located in the same plane in space, or coplanar.

In contrast, the present invention will teach a structure in which two plate segments of the same polarity can freely be adjacent, without any plate segment of opposite polarity being interposed between the two. A direct straight line can easily be drawn in three dimensional space that connects two plate segments of the same polarity, without touching a plate segment of opposite polarity. Plate segments of the same polarity can have subareas that are mutually coplanar.

II. Conventional (Contiguous Plate) Roll Capacitors

A. Basic Structure

The other structure commonly employed by the art is a roll capacitor. For a roll capacitor, the planar plates 1 and 2 of FIG. 1 are dimensioned such that their length is very much greater than their width. This is shown in FIG. 3, in offset plan view, with plate 2 offset behind plate 1. In FIG. 3, plate I is adjacent to dielectric substrate 7, with edge margin 9, and plate 1 is connected to the outside world via terminal 5 at a plate edge 11; likewise, plate 2 is adjacent to dielectric substrate 8, with edge margin 10, and plate 2 is connected to the outside world via terminal 6 at a plate edge 12. Plate edges 11,12 are not necessarily physically distinct structural elements, but can merely be a geometrical description of one plate edge that extends along the length L of each plate. The length L of plates 1 and 2 is very much greater than the width W of plates 1 and 2, even far beyond the proportions shown in FIG. 3. For a moderately large capacitor, the plate dimensions could be 2000 inches length L vs. 1 inch width W; this will be used as an example for ensuing discussions in this specification. , To make a roll capacitor, the planar sandwich structure shown in FIG. 3 is rolled up along the length L dimension into a cylinder, shown in FIG. 4, in perspective view; the width W dimension in FIG. 3 becomes approximately the length S of the cylinder in FIG. 4. This results in a prior art roll capacitor 50, shown in FIG. 4. Cylindrical roll capacitor 50 has a central axis 114, shown as a dashed line. The sandwich structure of FIG. 3 consists of plate 1, dielectric substrate 7, plate 2, and dielectric substrate 8, with the respective edge safety margins 9 and 10 being included. When this sandwich structure is rolled up into a cylinder, an edge 11 of plate 1 along its length L dimension is exposed at one end of the cylinder, as a tight spiral; likewise, an edge 12 of plate 2 along its length L dimension is exposed at the opposite end of the cylinder as a tight spiral. This is commonly called extended foil construction. Conductive end spray 3 can be applied to the cylinder end where plate 1 is exposed, and conductive end spray 4 can be applied to the cylinder end where plate 2 is exposed. Terminals 5 and 6 can then be connected to end sprays 3 and 4 respectively.

In the conventional roll capacitor of prior art, plate 1 is a contiguous electrically conductive surface, without interruption or segmentation. Thus, there are not any two distinct plate segments in the same plane of FIG. 3, nor at the same radius from axis 114 of the cylindrical roll in FIG. 4. The same is true for plate 2. Neither plate has a plurality of distinct segments that can be coplanar, or substantially coradial from a capacitor axis. No plate is adjacent to another plate of the same polarity, since a plate of opposite polarity always is interposed topologically in three dimensional space between plates of the same polarity, and the edges of all plates are substantially vertically aligned in the sandwich structure that is then rolled up. No direct straight line can be drawn in three dimensional space that connects the main portion of two plates of the same polarity without touching a plate of opposite polarity.

End spray 3 connects all layers of plate 1's tight spiral in parallel, and thereby gives terminal 5 a short path electrical access to all parts of plate edge 11 of plate 1; likewise, end spray 4 connects all layers of plate 2's tight spiral in parallel, and thereby gives terminal 6 a short path electrical access to all parts of plate edge 12 of plate 2. In FIG. 3 the electrical path from terminal 5 to some portions of plate edge 11 of plate 1 can be as long as L/2, which can be a great distance, since L can be so large (about 2000 inches) in a roll capacitor. This long path would cause high self inductance, which is proportional to the length of an electrical path. In FIG. 4 the electrical path from the same terminal 5 to the farthest part of plate edge 11 of plate 1 is reduced to a radius R, the radius of the cylinder, which could typically be 0.5 inch (terminal 5 is normally attached at the center of the circle which is the end of the cylinder of the roll capacitor). Self inductance varies linearly as the length of the electrical path. Thus, the use of end spray by prior art can reduce self inductance, by factors of about 1000, in roll capacitors.

B. Disadvantages in Electrical Performance

However, the self inductance of this prior art roll capacitor is still needlessly high, for reasons described below. It is desirable to reduce self inductance as much as possible, because self inductance adds series impedance to the capacitor at high frequencies, thereby interfering with the capacitor's ability to act as a capacitor at high frequencies, with the low series impedance that a pure capacitor is supposed to have at high frequencies. Reducing a capacitor's self inductance enables the capacitor to function more like a pure capacitive reactance, and to perform better to higher frequencies. Because prior art roll capacitors have a needlessly high self inductance, they function less like a pure capacitor, exhibiting poorer electrical performance at a given high frequency, and not extending as high in frequency for a given level of performance.

Moreover, a capacitor's self inductance acts in series with the capacitor's capacitance, to form an internal series self resonance. This internal self resonance can interfere with the capacitor's intended function, as a purely capacitive reactance, in handling any signal frequencies that are in the vicinity of this self resonance. Furthermore, this internal self resonance can cause the capacitor to have a ringing response if excited by a transient containing spectral energy at the frequency of this internal self resonance. Therefore, it is undesirable to have the frequency of this series resonance be within the passband of the circuit employing the capacitor or within the passband of the signal being processed by the capacitor. The frequency of this series resonance is inversely proportional to the square root of the self inductance. Thus, reducing self inductance can increase the frequency at which the series resonance occurs. This yields the advantages of a wider available passband for the capacitor, for the circuit employing the capacitor, and for the range of signals that can be efficaciously processed by the capacitor and circuit. Because prior art roll capacitors have a needlessly high self inductance, and therefore a needlessly low frequency for their internal series self resonance, they are disadvantageously restricted in the passband of frequencies that the capacitor and circuit can efficaciously process.

Furthermore, a capacitor's self inductance is related to other recognized measures of its electrical performance, and to its utility and advantageousness for various applications. A high series self inductance causes a high series impedance at high frequencies. This in turn worsens dissipation factor and losses at high frequencies. This dissipation and loss generate additional internal heat at high frequencies. This restricts the amount of current that the capacitor can handle at high frequencies, and restricts the voltage that a given capacitance value can handle at high frequencies, and restricts the power that can be handled by the circuit employing the capacitor. It also restricts the local ambient temperature range in which the capacitor can be operated, which in turn can add cost to the packaging of the product employing the capacitor (by requiring a larger package with better cooling), and can restrict the environmental temperature range in which the product package can operate. A high self inductance can also restrict the highest frequency that can be handled by the capacitor and by the circuit employing the capacitor, for any given set of the other conditions such as voltage, current, power, temperature, and product package design.

A high self inductance degrades the phase angle at which the capacitor operates, causing it to deviate further from the 90 degree phase angle that characterizes the pure capacitance that is ideally desired from a capacitor, and worsening the loss angle and loss tangent. This can degrade the electrical performance of circuits that depend on the phase angle of the capacitor being as close to the ideal 90 degrees as possible. The added dissipation and loss from high self inductance degrade the capacitor's quality factor, and cause less electrical energy to be available to the circuit employing the capacitor, which can be critical in certain capacitor applications. The high series impedance from high self inductance mitigates against the low impedance that is often desired from a capacitor at high frequencies, and can disadvantageously increase the capacitor's equivalent series resistance (ESR). A high self inductance slows the transient response of the capacitor, and that of the circuit employing the capacitor.

It will be shown that conventional prior art roll capacitors, employing a contiguous plate structure, also face a number of other electrical performance problems. These problems include a wide variation of high self inductance values within one capacitor, large stray circulating current loops with long time constants, and interference patterns and turbulence which also have long time constants. These problems further degrade the electrical performance of a capacitor and a circuit employing the capacitor. The wide range of self inductance values have a time dispersive smearing effect upon any signal transient being processed by the capacitor, and thereby corrupt that signal. The long time constants, of the large stray current loops and of the interference patterns and turbulence, cause a lingering reverberation after any signal transients, which thereby corrupts that signal.

C. Long Displacement Current Paths

FIG. 5 shows, in plan view, the roll capacitor of FIG. 4, complete with end sprays, unrolled into a flat plate sandwich structure. For clarity, dielectric substrates 7,8 are not shown in FIG. 5 and succeeding figures. For clarity, plates 1,2 are shown with proportions less elongated than they would have in reality. FIG. 5 is similar to FIG. 3, except that it is understood that all parts of the very long plate edge 11 are fed electric charge from terminal 5 via end spray 3, through a maximum path length corresponding to radius R in FIG. 4, instead of through a maximum path length L/2 in FIG. 3. The commonly used center location of terminals 5,6 in FIG. 4 results in the rolled up spiral plates being connected at one end of their length, as shown in the unrolled view shown in FIG. 5, rather than at the center of their length L as shown in FIG. 3 for a flat plate capacitor.

The so-called displacement current through a capacitor is a model derived from the electric charge accumulating on plate 1, and the resulting opposite charge accumulating on plate 2, which can be modeled as a current flowing through the capacitor under conditions of changing electric charge applied to one or both plates. If all parts of plate edge 11 were to be fed electric charge in perfect simultaneity from terminal 5 via end spray 3, then all of the displacement current through the capacitor would flow along paths 13 in the direction indicated by the arrows in FIG. 5 (electrical flow paths are indicated by hollow arrows in all drawings). All of the displacement current would follow the shortest paths through the capacitor, from plate edge 11 of plate 1 to plate edge 12 of plate 2, resulting in the lowest self inductance due to path length. Additionally, all paths 13 would have the same length and the same self inductance, so there would be no time dispersive smearing of the signal through plate 1. Furthermore, all of the displacement current would travel parallel to itself, resulting in minimal interference with itself under changing signal conditions through the capacitor. Thus, paths 13 may be termed the ideal paths for displacement current to follow.

However, the path followed by any current in a conductor is actually a spatial distribution around the shortest or lowest impedance path. Some current invariably follows other possible paths, which are longer or offer higher impedance. FIG. 6 shows the same structure as FIG. 5, an unrolled roll capacitor of prior art. Terminal 5 is connected to plate edge 11 at a point 18 of plate edge 11. FIG. 6 shows some other paths 14 that can be taken by a minority of the displacement current through the capacitor, just from point 18. In a normal capacitor of prior art, some of these paths 14 are very much longer than the paths 13 of FIG. 5. This occurs because the plate length dimension L is so much greater than the plate width dimension W in a normal roll capacitor of prior art, often by a factor of 2000.

This effect is worsened in conventional prior art roll capacitors because all parts of plate edge 11 are not in fact fed electric charge in perfect simultaneity from terminal 5 via end spray 3. The radius R in FIG. 4 is greater than zero, and electric charge travels and accumulates at a finite speed. Therefore, the displacement current will begin propagating in plate 1 from point 18 at which terminal 5 is attached to plate edge 11, and will propagate from other points along plate edge 11 only after a time delay.

FIG. 7 shows the same structure as FIG. 5, an unrolled roll capacitor of prior art (for clarity, plate 2 is not shown in this and many succeeding figures). FIG. 7 shows the initial propagation of displacement current in plate 1 from terminal 5, as paths 15. It can be seen that the initial displacement current radiates in a fan pattern in plate 1 from terminal 5. This reinforces the problem shown in FIG. 6, where some of the displacement current followed longer paths 14 instead of the shortest paths 13 of FIG. 5. The initial displacement current, propagating in this fan pattern, follows some paths 15 that are very much longer than the paths 13 of FIG. 5.

These longer paths 14 and 15 create several problems that degrade electrical performance, especially for processing transient signals. Since the electrical transient response of a system can be derived from its impulse response, it will also be instructive to consider how the degraded electrical performance could affect a Dirac delta function impulse of finite amplitude being processed by this conventional prior art roll capacitor.

D. First Problem: Time Differential Due to End Spray

The first problem faced by conventional prior art roll capacitors is that there is a mechanism at the end sprays 3,4 that directly causes various path lengths through the capacitor, hence various time delays, thereby garbling the signal with time dispersion. This is shown in FIG. 8, which is similar to FIG. 4, and shows capacitor 50 in perspective view. Three possible paths 16 (16a–16c) are shown through capacitor 50, having traversed various distances through end spray 3. The signal, e.g. a Dirac impulse, initially begins propagating as displacement current into plate 1 from plate edge 11 at the point where terminal 5 is connected. But only after a time delay does the same signal begin propagating into plate 1 from other parts of plate edge 11 that are remote from terminal 5. The signal is carried from terminal 5 to other parts of plate edge 11 via end spray 3, along various paths 16. The distance the signal must travel through end spray 3 along various paths 16, before it reaches some parts of plate edge 11, varies; it can be as little as zero (path 16a) or as great as radius R (path 16c)(assuming a centrally located terminal 5; otherwise, the distance could be two times radius R). This causes some parts of plate edge 11 to receive the signal later than other parts of plate edge 11. A symmetrical mechanism operates at the other end of the capacitor, where the distance along radius R causes terminal 6 to receive the signal from some parts of plate edge 12 later than from other parts.

The signal delivered by the whole capacitor at any instant is the sum of all the paths 16. Since each path has delayed the signal by a different amount of time, by a factor of radius R to zero through each end spray, the instantaneous sum of the paths will yield a garbled version of the original signal, with time dispersion or smearing. This time dispersion is shown schematically as length dispersion along the three paths 16; path 16c that traveled the farthest through end spray 3 is the farthest behind in getting through the capacitor, while path 16a that went straight into the capacitor from terminal 5 is the farthest ahead, already having reached terminal 6. In conventional prior art roll capacitors both terminals 5 and 6 are centrally located on the cylinder ends, which makes these two time dispersive, signal garbling effects compound each other. The parts of plate edge 12 most remote from terminal 6 delay the signal the most, and they are also the parts of plate edge 12 that receive the most delayed signal from the parts of plate edge 11 that are most remote from terminal 5. Thus, the total garbling time dispersion due to this mechanism can be equivalent to a delay variation introduced by a path length twice the radius R. Since the distance of radius R is not great in roll capacitors with extended foil construction, this time dispersion is not that serious a problem in and of itself. But it does produce further problems, which do have serious consequences.

E. Fan Shaped Propagation of Impulse

Consider the entire signal being processed by the capacitor to be a single Dirac function impulse of finite magnitude. The capacitor's transient performance for all other kinds of signals can be derived from its impulse response, its performance in processing this single impulse. The time delay introduced by the end spray paths 16, shown in FIG. 8, means that the initial displacement current will propagate from only that point of plate edge 11 where terminal 5 is attached. This will produce the fan shaped propagation pattern in plate 1 for the initial displacement current, as shown in FIG. 7.

Now consider whether this fan shaped propagation pattern in FIG. 7 changes after the initial displacement current, as the signal continues. The answer is that the signal doesn't continue, because it is a single Dirac impulse. Thus there is no further displacement current stimulation, later in time, at point 18 where terminal 5 meets plate 1 at plate edge 11. Therefore, the original fan shaped pattern will continue propagating, as a quarter-circular wavefront, across the entire surface of plate 1.

Later in time, the impulse signal will travel via end spray 3 to a nearby part of plate edge 11, and will propagate as a displacement current into plate 1 from there; still later, the impulse will travel via end spray 3 to a farther part of plate edge 11, and will propagate as a displacement current into plate 1 from there. Parts of plate edge 11 that are progressively farther from terminal 5 will propagate displacement current into plate 1 at progressively later times. For purposes of the present discussion, we can say to a first approximation that the sum of these progressively delayed propagation launches will reinforce the fan shaped pattern and quarter-circular wavefront initially propagated from point 18 of plate edge 11 at terminal 5. This is true for a Dirac impulse, and thus it is true for every time slice of any signal being processed by the capacitor.

Therefore, the true characteristic of displacement current propagation in a capacitor is more like a fan shaped pattern as shown in FIG. 7; it is not an ideal pattern with short, straight, parallel paths 13 as shown in FIG. 5. In a conventional prior art roll capacitor, the path lengths 15 for this fan shaped pattern vary greatly, by a factor of up to 2000 to 1, and some paths 15 are very long, up to 2000 inches, which is much longer than the 1 inch length of ideal paths 13 as shown in FIG. 5.

F. Second Problem: Time Differential Due to Path Length Differential in Plate The second problem faced by conventional prior art roll capacitors is that signal garbling time dispersion occurs directly in the time domain because of the differences among lengths of paths 14 or 15 as shown in FIGS. 6 and 7. The displacement current travels at a finite speed, so the longer paths 14 or 15 will impose a longer travel time than the shorter paths. Thus the signal, e.g. a Dirac impulse, will be delayed more by the longer paths 14 or 15 than by the shorter paths 14 or 15. The shortest of the paths 14 or 15 is equivalent to an ideal path 13 of FIG. 5, and is merely 1 inch long in the current example, whereas the longest of the paths 14 or 15 is slightly more than 2000 inches long in the current example. Thus, in a conventional prior art capacitor the path lengths 14 and 15 vary by a factor of up to 2000 to 1. Therefore, the signal will be delayed by differing time amounts for the different length paths 14 and 15. The signal delivered by the whole capacitor at any instant is the sum of all the paths 14 and 15. Since each path has delayed the signal by a different amount of time, by a factor of 2000 to 1, the instantaneous sum of the paths will yield a garbled version of the original signal, with time dispersion or smearing.

G. Third Problem: Higher Self Inductance as Linear Function of Path Length

The third problem faced by conventional prior art roll capacitors is that the longer paths 14 and 15 will exhibit higher self inductance, compared to the ideal paths 13, simply because of their longer length, in linear proportion to their greater length. The longest of these paths 14 or 15 can be about 2000 times longer than the ideal path 13, so their self inductance can be about 2000 times worse, resulting in the degraded electrical performance associated with higher self inductance.

H. Fourth Problem: Higher Self Inductance as Squared Function of Number of Turns The fourth problem faced by conventional prior art roll capacitors is that the self inductance of the longest paths 14 or 15 can be 1,000,000 times worse (not just 2000 times worse) than the ideal path 13, because of solenoid coil loops. This is shown by FIG. 9. FIG. 9 shows prior art roll capacitor 50 of FIG. 4 in perspective view, as rolled up once again. A path 17 shows one of the longest of the paths 14 or 15. This shows that longer paths 14 and 15 actually execute a corkscrew spiral path in three dimensional space, as they traverse the rolled up plate 1 along the same path that appears diagonal in the unrolled plate shown in FIGS. 6,7. Thus, the paths 14 and 15 form a solenoid coil with many loop turns that are closely packed together. A typical roll capacitor of prior art can have up to about 1000 turns in its rolled up spiral, so this solenoid coil formed by the longest paths 14 and 15 can have up to 1000 turns. The self inductance of a coil or solenoid is proportional to the square of the number of closely packed turns. Therefore, in a prior art roll capacitor the greater self inductance of the longest paths 14 and 15 can be not only 2000 times worse than the ideal paths 13 due simply to longer path length, but can also be 1,000,000 times worse, being increased by the square of the number of turns (1000) in the roll capacitor and thus in the longest corkscrew path.

I. Fifth Problem: Time Dispersive Variation of Self Inductance

The fifth problem faced by conventional prior art roll capacitors is that the various paths for the displacement current modify the signal through the capacitor with a wide range of inductive impedances, varying by a factor of 1,000,000 to 1, and this degrades any transient signal by dispersing or smearing it in time. If a capacitor were to offer a single lumped inductance to the signal being processed, then the signal would be slowed, with a longer time constant, in a way that, though disadvantageous for high frequencies, would at least be non-dispersive, and would impose a benignly predictable change on the signal, which might be taken into account elsewhere in the circuitry where the capacitor is employed. However, conventional prior art roll capacitors offer different inductances to different displacement current paths 14 and 15 as shown in FIGS. 6 and 7, varying by a factor of up to 1,000,000 to 1. Thus, each displacement current path 14 or 15 modifies the signal in a different way, with a different slowing and time constant, over a very wide range, by a factor of 1,000,000 to 1. The signal as delivered by the whole capacitor at any instant is the sum of all the paths 14 and 15. Since each path has modified the signal in a different way, the instantaneous sum of the paths will yield a garbled version of the original signal, with time dispersion or smearing. This garbling, time dispersive effect is analogous to the effect long observed (since the early days of telephone) in very long wires carrying signals; in this case, the effect occurs even over a short distance because of the very large ratio (1,000,000 to 1) of inductances modifying the signal within the compact space of a capacitor.

This signal garbling, time dispersing mechanism is distinct from, and works in addition to the mechanism of the second problem, the longer time delay of the longer paths 14 and 15. It is again the longer paths that have their transient response more slowed or delayed by the mechanism of this fifth problem, this time via higher self inductance. Thus, the second and fifth problems compound each other (rather than perhaps offsetting each other), thereby making the time dispersive garbling of the signal even worse.

J. Sixth Problem: Interference in Plate for Single Impulse

The sixth problem faced by conventional prior art roll capacitors is that interferences can arise among the displacement currents propagated from different parts of plate edge 11. These interferences can corrupt the signal as it is received by different parts of plate edge 12 of plate 2, and can corrupt the summation of the signal as it received at terminal 6. These interferences can also have deleterious effects by stimulating and encouraging stray currents within the large area of plates 1 and 2. Electric charge will flow in unpredictable directions on the plates, moving quickly from areas of reinforced high charge to canceled low charge, and then moving quickly elsewhere again, as the interferences keep changing in response to an ever changing signal. Thus, these interferences are very disadvantageous.

FIG. 10 is a plan view of unrolled plate 1, as in FIG. 5. FIG. 10 shows in simplified form how these interferences can be caused. Consider the signal to again be a single Dirac impulse of finite magnitude. As described above, the initial displacement current for this signal propagates as a quarter-circular pattern into plate 1 from point 18 on plate edge 11, where terminal 5 connects to plate edge 11. Suppose it starts propagating at time T1. At some later time T2 this signal from terminal 5 will have traveled via conductive end spray 3 to a point 19, from where it starts propagating as a displacement current with a semi-circular pattern into plate 1. Likewise, at some yet later time T3 the signal from terminal 5 will have traveled via conductive end spray 3 to a point 20, from where it starts propagating as a displacement current with a semi-circular pattern into plate 1. Thus, at some yet later time T4 the situation will obtain as depicted in FIG.10. FIG. 10 shows that the wavefront of displacement current, representing the Dirac impulse signal, propagated from point 18, has advanced to a quarter-circular position 21. The distance it has propagated, represented by an arrow 24, is proportional to the time T4-T1 that it has had to propagate. Meanwhile, the wavefront of displacement current propagated from point 19 has advanced to a semi-circular position 22. The distance it has propagated, represented by an arrow 25, is proportional to the time T4-T2 that it has had to propagate. Meanwhile, the wavefront of displacement current propagated from point 20 has advanced to a semi-circular position 23. The distance it has propagated, represented by an arrow 26, is proportional to the time T4-T3 that it has had to propagate.

It can be appreciated that the wavefronts 21,22,23 of propagating displacement current interact and interfere within the conductive surface that is plate 1, and will do likewise within plate 2. In particular, where the wavefronts intersect they will add vectorially. These vectorial additions result in localized reinforcements or cancellations (partial to complete vectorial cancellation), which can form interference patterns. An illustrative analogy would be to view plate 1 as a swimming pool, and consider dropping pebbles into the pool, first at the corner (point 18), and then in rapid succession at progressive points along one edge of the pool (points 19 and 20). The ripples propagating semi-circularly from points 19 and 20 would interfere with each other and with the ripples propagating quarter-circularly from point 18. These interference patterns would produce some local cancellation nulls and some local wave peaks twice normal height. Another useful analogy is the interference pattern produced by light propagating into an area (like plate 1) from two or more slits or points (like 18,19,20). Indeed, if time delay is introduced between these two (or more) propagation points for light, the interference patterns become so pronounced and complex that they can be used as holograms.

K. Seventh Problem: Interference Compounded by Travel Time Disparity

The seventh problem faced by conventional prior art roll capacitors is that these interference patterns are made worse because of the disparity between the propagation speed across plate 1 (and 2) versus the effective traveling speed along plate edge 11. If the two speeds were the same, then the vectorial additions could produce a coherent overall wavefront as a resultant, a wavefront similar to 21, propagating in a quarter-circular fan pattern across plate 1 like the displacement currents 15 of FIG. 7. However, end spray 3 shortens the electrical path to reach all parts of plate edge 11.

FIG. 11 is a plan view of plate 1, like FIG. 10. FIG. 11 shows that the traveling path along plate edge 11 is reduced from length L of FIG. 10 down to radius R as shown in FIG. 11. This raises the effective traveling speed along plate edge 11. Thus, displacement current propagates into plate 1 from points 19 and then 20 before the displacement current propagating from point 18 arrives. Displacement current leaves points 19 and then 20 too soon to vectorially join wavefront 21 and become part of a coherent wavefront. Yet this displacement current leaves points 19 and then 20 too late to be simultaneous with that from point 18, and produce the ideal displacement currents 13 as shown in FIG. 5. The consequence is that the various displacement currents in plate 1 (and plate 2) do not form a coherent current pattern at all, either straight like 13 in FIG. 5 or fan shaped like 15 in FIG. 7. Instead, they form interference patterns across the entire surface of plate 1 (and plate 2), with localized reinforcements and cancellations of electric charge.

L. Eighth Problem: Interference Compounded by Signal Changing over Time

The eighth problem faced by conventional prior art roll capacitors is that the above interference patterns, due to the capacitor's geometry, are made yet worse by the temporally changing nature of most signals to be processed by the capacitor. Consider for example a signal with a positive transient (like the Dirac impulse considered heretofore) that is then quickly followed by a negative transient. This negative transient would call for a depletion of electric charge in plate 1 in locations where the positive transient had previously just called for an accumulation of electric charge. But the time delays and interference patterns described above, for a Dirac impulse propagating into and through plate 1, mean that the charge depletion called for by the subsequent negative transient would cross paths with the charge accumulation called for by the previous positive transient, in some local areas of plate 1 (and plate 2).

FIG. 12 shows an example of this signal dependent interference, in a plan view of plate 1 similar to FIG. 11. Wavefronts 21,22 of the positive transient, having propagated from points 18,19 respectively, are the same as in FIG. 11. Wavefronts 21,22 are followed by wavefronts 27,28 of a negative transient that temporally follows the positive transient in the signal being processed by the capacitor; wavefronts 27 and 28 have also propagated from points 18,19 respectively.

Of particular interest in FIG. 12 are two local areas: an area 29 where wavefront 22 intersects wavefront 27 and an area 30 where wavefront 21 intersects wavefront 28. In these local areas 29,30, vectorial addition takes place as shown in FIGS. 10 and 11, but with the added complication that the signal transients have opposite polarity and thus issue opposing commands for local electric charge accumulation or depletion. In these local areas, the charge accumulation will offset the charge depletion, thus at least partially canceling and annihilating both signal transients, and thereby partially destroying some of the information in the signal being processed by the capacitor. These areas of annihilated signal will propagate across plate 1. There will also be local areas where temporally distinct parts of the signal will reinforce each other instead of canceling each other.

The consequence is that plate 1 (and plate 2) will be peppered with reinforced hot spots and canceled dead spots. These spots will dynamically change over time and in location, in response to the temporally changing nature of the signal. And they will also dynamically change over time and in location, as a consequence of the time delays and propagation patterns and interference patterns imposed upon the displacement currents by the capacitor's geometry, as described previously.

M. Ninth Problem: Turbulence Due to Charge Redistribution

This is a picture of complex turbulence, over time and over location on the surface of plate 1 (and plate 2). The ninth problem faced by conventional prior art roll capacitors is that the above described interference and turbulence in turn creates even more turbulence. Consider for example a reinforced hot spot, having twice as much charge as it should due to an interference pattern, that happens at some instant to be located adjacent to a canceled dead spot. At that instant, there will be a local electrostatic force, tending toward evening out the charge disparity by moving charge from the hot spot to the canceled dead spot. But this local charge movement is additional unwanted turbulence, having nothing to do with the desired charge movement for the desired signal. Furthermore, this local charge movement could itself adversely interfere with desired charge movement for the desired signal, since any charge movement affects other nearby electric charge and charge movement.

FIG. 13 illustrates this problem in simplified form. FIG. 13 shows plate 1 in plan view, like FIG. 12. Two hot spots 31,33 have excess charge due to interference patterns. This excess charge is beyond what these local areas of plate 1 should have at that instant at that location if the capacitor were processing the signal accurately without interference patterns and turbulence on its plates. Likewise, two dead spots 32,34 have depleted charge due to interference patterns, i.e. less charge than they should have at that instant at that location if the capacitor were processing the signal accurately without interference patterns and turbulence on its plates. As shown by an arrow 35, the excess charge at local area 33 will migrate to nearby local area 32 with depleted charge, and likewise an arrow 36 shows that the excess charge at local area 31 will migrate to nearby local area 34 with depleted charge. These local electric charge movements are unwanted because they have no relation to the desired displacement current through the capacitor that represents the signal being processed. These local movements form turbulent whorls and eddies throughout the surface of plate 1 (and plate 2).

Furthermore, these unwanted local movements can be destructive of accurate signal processing by the capacitor. For example, it can be seen that the local electric movement represented by arrow 35 opposes the direction of the primary desired displacement current, represented by the ideal paths 13 in FIG. 5. Meanwhile, the local electric movement represented by arrow 36 artificially adds to the primary desired displacement current 13. These local current turbulences are complex, having arisen from complex and dynamically changing interference patterns. Thus they do not balance each other out in some neat pattern. Rather, they corrupt the desired displacement current representing the desired signal in complex ways.

N. Tenth Problem: Turbulence Stimulates Circulating Current Loops

The tenth problem faced by conventional prior art roll capacitors is that these turbulent whorls and eddies can stimulate circulating eddy current loops throughout the large surface area of each plate. FIG. 14 shows this in simplified form. FIG. 14 shows a plan view of plate 1, like FIG. 13. The arrows 35,36 in FIG. 13 may also be regarded as representing electrostatic forces, which produce the charge migration and currents described above. The forces represented by arrows 35,36 can act as a force couple. It can be appreciated that this force couple would tend to engender, stimulate, or reinforce a stray circulating current loop 37, as shown in FIG. 14. Many such stray circulating current loops of varying size could arise and circulate throughout the large contiguous plate area of a conventional prior art roll capacitor.

Every such stray circulating current loop creates a number of problems in turn. It would have no relation to the desired displacement current representing the desired signal being processed by the capacitor. It would sap energy from the desired signal being processed by the capacitor, thereby degrading that signal. It would worsen the noise level of the capacitor. It would interfere with the desired propagation of displacement current representing the desired signal being processed by the capacitor, thereby corrupting that signal; such interference could be not only electrostatic but also electromagnetic, since any stray current would generate electromagnetic fields that could interfere with the desired displacement current. Each such loop would have a circulating periodicity and time constant of its own (depending on its size), which would corrupt the signal's own periodicity and would also linger after each signal transient had past, thereby causing time smearing of the desired signal being processed by the capacitor, and a reverberant shadow lingering after each signal transient.

Furthermore, the vector component of such stray circulating current loop paths in the length L dimension would tend to predominate over the vector component in the width W dimension, by a factor of 2000:1, corresponding to the 2000:1 ratio of plate 1's dimensions. Thus, an overwhelming preponderance of the stray circulating current loops would have their inductance multiplied by the squared coil loop factor, which operates for the vector component in the length L dimension, for all those stray circulating current loop paths in plate 1 that execute more than one of the 1000 turns of the roll capacitor. This squared multiplying effect on the inductance would create an even worse time lag for each large stray circulating current loop behind the signal's transients, thereby smearing the signal even worse. The time constant for these larger circulating loops could be increased by a factor of up to 1,000,000, thus making their time lag and lingering reverberant shadow much worse.

The longest stray circulating loops might have a periodicity and time constant commensurate with the highest frequencies of the signal being processed by the capacitor. In this case, intermodulation distortion might arise between the circulating loops and the desired signal, with distortion byproducts within the passband of the circuit utilizing the capacitor. Furthermore, if the circulating loops are substantially started and stopped with each zero crossing of an alternating current signal, then with a broadband signal the low frequencies of the signal that govern the zero crossings might thus intermodulate with the high frequencies of the same signal, thereby causing a kind of automodulation distortion via the circulating current loops.

O. Eleventh Problem: Large Circulating Current Loops

The eleventh problem faced by conventional prior art roll capacitors is that stray circulating eddy current loops naturally tend to form in any large conducting body or surface, as is well known. FIG. 15 shows this in simplified form. FIG. 15 shows plate 1 in plan view, like FIG. 14. In FIG. 15, three stray circulating eddy current loops 38, 39, 49 are shown, having various sizes and being situated at various locations within plate 1.

Again, every such stray circulating current loop creates a number of problems in turn. It would have no relation to the desired displacement current representing the desired signal being processed by the capacitor. It would sap energy from the desired signal being processed by the capacitor, thereby degrading that signal. It would worsen the noise level of the capacitor. It would interfere with the desired propagation of displacement current representing the desired signal being processed by the capacitor, thereby corrupting that signal. It would have a circulating periodicity and time constant of its own (depending on its size), which would corrupt the signal's own periodicity and would also linger after each signal transient had past, thereby causing time smearing and a lingering reverberant shadow of the desired signal being processed by the capacitor. Again, this time smearing is made far worse by the fact that the predominant vector component of such stray circulating current loops, which is in the length L dimension, has its inductance multiplied by the square of the number of turns executed in the roll capacitor. Again, these circulating current loops could cause intermodulation distortion and automodulation distortion with certain signals.

P. Role of Contiguous Plate Structure for Second Through Fifth Problems

Eleven major problems faced by conventional prior art roll capacitors have been described above. Most of these problems are made worse by the fact that, in a conventional prior art roll capacitor, plates 1 and 2 have a large single contiguous conductive surface area (it can be about 2000 square inches), and the fact that the length dimension L is very large (it can be about 2000 inches), and the fact that the length dimension L is very much larger than the width dimension W (it can be about 2000 times larger).

Thus, the key structural feature that makes these problems severe in conventional prior art roll capacitors is the plate being a large single contiguous conductive surface. This point can be demonstrated by reexamining the eleven major problems, and focusing on the role of the large contiguous topology of the plate.

To make this point clearer, a segmented plate structure, of the general type employed by the present invention, will be used as an illustration by way of contrast, showing how the problems can be alleviated if the large single contiguous plate feature is eliminated.

A segmented plate structure divides plate 1 into a plurality of distinct segments (plate 2 might be similarly divided into segments). For the present purposes of illustration, assume an example in which plate 1 is divided into 1000 segments, each measuring 2 inches along length dimension L and 1 inch along width dimension W. This structure will be contrasted with the current example of conventional prior art plate structure, in which a single contiguous plate measures 2000 inches in length L and 1 inch in width W. Further details of the particular structure taught by the present invention will be described in other sections of the specification to follow.

The major problems will now be reexamined, focusing on the contrast in this one structural feature of plate topology. For conceptual clarity, the major problems will be reeexamined step by step, one conceptual subject at a time.

The second problem is summarized in FIGS. 16 and 17. FIG. 16 shows plate 1 of a conventional prior art capacitor in plan view, and is similar to FIG. 7. The longest of paths 15 in FIG. 7 that the displacement current can travel through plate 1 is shown as a path 46 in FIG. 16; the shortest of paths 15 in FIG. 7 is shown as a path 47 in FIG. 16. The ratio of longest path 46 to shortest path 47 through plate 1 is slightly greater than 2000:1, due to the ratio of plate length L to plate width W. This will garble the signal with considerable time smearing, due to the 2000:1 ratio in signal propagation time via the different path lengths.

In contrast, FIG. 17 shows plate 1 of a segmented plate capacitor in plan view; this is the general type of structure employed by the present invention. For purposes of this illustrative example, plate 1 is divided into 1000 segments 41, each measuring 2 inches by 1 inch. The longest path through a plate segment 41 is shown by a path 48; the shortest path is shown by a path 49. Here the ratio of the longest path 48 to the shortest path 49 through any plate segment is merely 2.2:1. This will cause much less time smearing of the signal due to different propagation times via different path lengths. The conventional prior art structure garbles the signal due to the second problem 900 times worse than the type of structure employed by the present invention. The conventional prior art structure exhibits 900 times worse performance for its longest paths because its ratio of plate length L to plate width W is much greater than the ratio L to W for each segment of the structure employed by the present invention.

The third problem is summarized in FIGS. 18 and 19. FIG. 18 shows plate 1 of a conventional prior art capacitor in plan view, and is similar to FIG. 7. The longest of paths 15 in FIG. 7 that the displacement current can travel through plate 1 is shown as path 46 in FIG. 18. Path 46 has a length of 2000 inches, with a consequently high self inductance that is linearly proportional to the length of this path. In contrast, FIG. 19 shows plate 1 of a segmented plate capacitor in plan view; this is the type of structure employed by the present invention. The longest path that the displacement current can travel through any plate segment 41 is shown as a path 48, which has a length of merely 2.2 inches. This reduces self inductance in linear proportion to the length of this path, namely by a factor of about 900 contrasted to the conventional prior art structure. Thus, the conventional prior art structure has a self inductance due to the third problem that is 900 times worse than the structure employed by the present invention. The conventional prior art structure exhibits 900 times worse performance for its longest paths because its plate length L is much greater than the segment length L of the structure employed by the present invention.

The fourth problem is summarized in FIGS. 20 and 21a, 21b. FIG. 20 shows the conventional prior art capacitor 50 in perspective view, and is similar to FIG. 9. The longest path 46 across plate 1, as shown in FIG. 18, becomes closely packed corkscrew spiral path 17 when viewed in three dimensional space, and follows all the turns of the rolled up plate, which can number about 1000 turns. This solenoid coil path produces a self inductance multiplying effect for the longest path that is proportional to the square of the number of turns, i.e. 1,000,000 times greater than an ideal straight path would have.

In contrast, FIGS. 21a,b show a segmented plate capacitor 51 in perspective view; this is the type of structure employed by the present invention. It can be appreciated that the 2 inch length L of a plate segment in the current example extends only about halfway around the circumference of the roll capacitor near the outer circumference of the cylindrical roll. Thus, a plate segment does not complete even one turn throughout the outer portion of the cylindrical roll, say the outer half for simplicity. For this outer half of the cylindrical roll, the longest path 48 across a segment 41, as shown in FIG. 19, follows a path 42 as shown in FIG. 21a, when viewed in three dimensional space. Thus, even this longest path does not complete even one turn of a solenoid coil loop. And thus there is no inductance multiplying effect proportional to the square of the number of turns. Therefore, for this outer half of the capacitor, the conventional prior art structure has a self inductance due to the fourth problem that is 1,000,000 times worse than the structure employed by the present invention.

The structure employed by the present invention has the option of varying the size of segments 41 within each capacitor. If segments with a length dimension L smaller than 2 inches are employed for the inner half of the capacitor's cylindrical roll, then it would be possible to prevent any coil loop turns from being completed by any segment, even for the inner half of the cylindrical roll, as the winding approaches a dummy core mandrel 60. In this case, FIG. 21a would be applicable even for the inner half of the cylindrical roll. On the other hand, it might be advantageous for the sake of manufacturing economy to employ uniform size plate segments 41 throughout the body of the capacitor. In this case, the chosen segment length L might complete 2 or 3 turns for the inner part of the cylindrical roll. FIG. 21b shows this; a longest path 43, through a plate segment in the inner part, is shown executing a gentle helix with 2 turns. The current example of 2 inches for segment length L might produce 3.16 turns worst case near the capacitor's core mandrel. If the coil loop turns of longest path 43 were closely packed together (as are the 1000 turns of path 17 in FIG. 20), then this could result in an inductance multiplying effect of 10 (3.16 squared) due to coil loop turns for the longest path within any plate segment 41. This performance is still 100,000 times better than the conventional prior art structure. However, since path 43 executes a gentle helix with the turns spread far apart, the penalty of the coil loop turn squared multiplying factor of 10 will be decreased, in approximate proportion to how far apart the turns are spread.

Thus, for the fourth problem of high inductance the conventional prior art structure exhibits 100,000 to 1,000,000 times worse performance for its longest paths because its plate length L is much greater than the circumference of the capacitor, so that its plate executes many loop turns (perhaps about 1000). In contrast, the segment length L of the structure employed by the present invention is normally less than the circumference of the capacitor, so that any plate segment executes fewer than 3 loop turns, and many segments execute less than 1 loop turn.

The fifth problem is summarized in FIGS. 22 and 23a, 23b. FIG. 22 shows conventional prior art capacitor 50 in perspective view, and is similar to FIG. 20. The signal smearing time dispersion depends on the range of inductance presented by the various possible paths through the plate or plate segment, i.e. the ratio of the highest inductance path to the lowest inductance path. Path 17 is the three dimensional view of the longest of paths 15 shown in FIG. 7, also shown as path 46 in FIG. 18; while a path 44 is the three dimensional view of the shortest of paths 15 shown in FIG. 7, also shown as path 47 in FIG. 18. Path 17 is 2000 times longer than path 44, so its inductance is 2000 times higher due to the linear multiplying effect of length. Furthermore, path 17 completes 1000 closely packed loop turns, while path 44 completes none, so its inductance is also 1,000,000 times higher due to the squared multiplying effect of the number of turns. Inductances add, so for simplicity we may say that the inductance of path 17 is about 1,002,000 times higher than the inductance of path 44. Thus, the conventional prior art structure corrupts the signal via a time dispersive range of inductances for different paths that varies by a factor of 1,002,000 to 1.

In contrast, FIGS. 23a,b show segmented plate capacitor 51 in perspective view; this is the type of structure employed by the present invention. FIG. 23a is similar to FIG. 21a, and applies to the outer part of the cylindrical capacitor, that portion where a segment 41 completes less than 1 loop turn of the capacitor. Path 42 is the three dimensional view of longest path 48 in FIG. 19; while a path 45 is the three dimensional view of shortest path 49 shown in FIG. 19. Path 42 is merely 2.2 times longer than path 45, so its inductance is merely 2.2 times higher due to the linear multiplying effect of length. Furthermore, there is no squared multiplying effect, since longest path 42 does not complete any loop turns. Thus, the segmented plate structure employed by the present invention corrupts the signal via a time dispersive range of inductances for different paths that varies by a factor of merely 2.2 to 1, for the outer part of the capacitor cylinder. Here the conventional prior art structure exhibits 455,000 times worse time dispersive corruption due to this fifth problem than the segmented plate structure employed by the present invention.

FIG. 23b is similar to FIG. 21b, and applies to the inner part of the cylindrical capacitor, that portion where a segment 41 completes more than 1 loop turn of the capacitor. Path 43 is the three dimensional view of longest path 48 in FIG. 19; while path 45 is the three dimensional view of shortest path 49 shown in FIG. 19. Path 43 is still merely 2.2 times longer than path 45, so its inductance is still merely 2.2 times higher due to the linear multiplying effect of length. In this case, there is a squared multiplying effect on inductance due to completing some loop turns. In the current example, path 43 completes 3.16 turns worst case (near mandrel core 60), which could produce an inductance multiplying factor of 10 worst case, if the turns of path 43 were closely packed together. Assuming for simplicity that the inductances add, the worst case inductance of worst case path 43 would be 12.2 times the inductance of shortest path 45, near the center of the cylindrical capacitor. Thus, the segmented plate structure employed by the present invention corrupts the signal via a time dispersive range of inductances for different paths that varies by a factor of merely 12.2 to 1 or less, for the worst case inner part of the capacitor cylinder. Here the conventional prior art structure still exhibits at least 82,000 times worse time dispersive corruption due to this fifth problem than the segmented plate structure employed by the present invention.

Thus, for the fifth problem, of time dispersive corruption due to variation in inductance, the conventional prior art structure exhibits 82,000 to 455,000 times worse performance for its longest paths because its plate length L is much greater than the circumference of the capacitor, so that its plate executes many loop turns (perhaps about 1000). In contrast, the segment length L of the structure employed by the present invention can be less than the circumference of the capacitor, so that any plate segment would execute at most a few loop turns, and many segments would execute less than 1 loop turn.

Q. Role of Contiguous Plate Structure for Sixth Through Tenth Problems

The sixth through tenth problems may be summarized together. FIG. 24 shows plate 1 of a conventional prior art roll capacitor in plan view, and is similar to FIG. 11. In keeping with the current example, assume plate 1 to be 2000 inches long. Wavefront 21 has propagated from point 18 where terminal 5 meets plate edge 11. Likewise, a wavefront 147 has propagated from a farthest point 146 on plate edge 11, having traveled from terminal 5 to point 146 via end spray 3 over a distance which is the radius R of the cylindrical capacitor. Once launched from plate edge 11, wavefronts 21 and 147 will propagate toward each other within plate 1 via the entire distance of plate length L, not merely via the distance that is the radius R of end spray 3. As discussed above, they will form complex interference patterns and subsequent turbulence when and where they meet in plate 1. These interference patterns and turbulence are primarily caused and made severe by the fact that wavefronts 21 and 147 are not launched simultaneously from plate edge 11.

It can be appreciated that wavefronts will also be launched from all the points along plate edge 11 that are between point 18 and point 146. The total amount of interference and turbulence in plate 1 can be thought of as being a function of the number of spatially distinct points along plate edge 11 that are radiating displacement current into plate 1, at temporally distinct instants. Suppose that there are M such points in the contiguous plate structure of a conventional prior art roll capacitor, as shown in FIG. 24.

FIG. 25 shows plate 1 of a segmented roll capacitor in plan view. In FIG. 25 plate 1 is divided into only two segments 52,53, each being 1000 inches long. Wavefront 21 has propagated from point 18 where terminal 5 meets plate edge 11. Likewise, a wavefront 149 has propagated from a farthest point 148 on plate edge 11 that feeds segment 52, having traveled from terminal 5 to point 148 via end spray 3. If there are M points between points 18 and 146 in FIG. 24, then there are M/2 (half as many) points between points 18 and 148 in FIG. 25. Thus, the amount of interference and turbulence in segment 52 of FIG. 25 will be merely half of that which occurs in plate 1 of FIG. 24. The amount of interference and turbulence can be lessened, and performance thereby improved, in proportion to how much shorter a segment 52 (or 41 in FIG. 19) is than the length L of contiguous plate 1 in a conventional prior art roll capacitor. In addition, the complexity of the signal corrupting interference and turbulence can also be lessened by reducing segment length, perhaps by a better than linear function (this would depend on how complexity is defined).

More importantly, the time smearing corruption of the desired signal can be significantly lessened by reducing segment length. The signal degradation caused by interference and turbulence can be thought of as being a function of the time duration from the initial wavefront launch to the final dying out of the interference. The longer this time, the more lingering are the reverberant shadows and echoes of the original signal caused by the interference. The more lingering the interference reverberation, the less intelligible the signal becomes due to this corruption.

The interference and turbulence between wavefronts 21 and 147 in FIG. 24 will linger twice as long after the desired signal as that between wavefronts 21 and 149 in FIG. 25, because the wavefronts have twice as far to travel through plate 1 before reaching each other as they do through segment 52. This factor does not even count the added travel time required to reach point 146 via end spray 3 compared to reaching point 148.

Furthermore, transient wavefronts 21 and 147 must travel through twice as many coil loop turns of the roll capacitor to reach each other in FIG. 24, compared to transient wavefronts 21 and 149 in FIG. 25, so they will face four times the inductance, which will slow them even further than a factor of two, thereby making the signal corrupting interference and turbulence linger more than twice as long for a doubling of the plate or segment length.

R. Virtual Elimination of Second Through Tenth Problems

FIG. 26 shows the segmented plate structure employed by the present invention, in plan view; it is similar to FIG. 19. In keeping with the current example, there are 1000 segments 41 from FIG. 19, each measuring 2 inches along length dimension L by 1 inch along width dimension W. Two specific such segments 41 are shown in FIG. 26; a plate segment 63 is the innermost segment in a roll capacitor, and a plate segment 62 is a typical plate segment in the middle of the roll capacitor. Point 18 is where terminal 5 meets plate edge 11. A point 54 is the point along plate edge 11 farthest from point 18, that connects to plate segment 63. Likewise, a point 61 is the point along plate edge 11 nearest to point 18, that connects to plate segment 62; while a point 55 is the point along plate edge 11 farthest from point 18, that connects to this same plate segment 62.

From the foregoing discussion, one might expect that the signal corrupting interference and turbulence would be reduced by a factor of 1000 compared to the conventional prior art roll capacitor shown in FIG. 24. If there are M points between points 18 and 146 in FIG. 24, then there are M/1000 points between points 61 and 55 in FIG. 26 so one would expect 1/1000 the interference and turbulence in plate segment 62. More importantly, the travel time through plate segment 62 between points 55 and 61 is merely 1/1000 the travel time through plate 1 between points 146 and 18 in FIG. 24, so one might expect the lingering corruption by the interference and turbulence to last merely 1/1000 as long in time. One might then expect somewhat better performance than this for the segmented plate structure, when noting that the squared inductance multiplying effect of 1000 coil loop turns slows the transients traveling the path between points 146 and 18 in FIG. 24 even further, and prolongs their lingering corruption even longer, whereas transients traveling the path between points 55 and 61 in FIG. 26 do not execute any coil loop turns, are thus are not further slowed by any squared inductance multiplying factor.

However, the segmented structure employed by the present invention in fact offers far better performance than even this. In fact, the segmented structure employed by the present invention virtually eliminates signal corrupting interference and turbulence entirely. It virtually eliminates the sixth through tenth problems faced by conventional prior art roll capacitors. Indeed, it offers virtually the ideal performance shown in FIG. 5, where the displacement current follows ideal paths 13 that are parallel, and therefore do not interfere with one another.

These ideal paths 13 are all the same length, so they do not exhibit any travel time differential. Moreover, these ideal paths 13 are the shortest possible paths, so they exhibit the least inductance. These ideal paths 13 also have uniform low inductance, so they exhibit the least time dispersion due to differing inductances. Therefore, these ideal paths 13 also eliminate the second through fifth problems faced by conventional prior art roll capacitors.

FIG. 26 shows displacement current paths 56 in one segment 63 that are virtually identical to the ideal current paths 13 in FIG. 5; likewise, displacement current paths 57 in another segment 62 are virtually identical to the ideal current paths 13 in FIG. 5.

FIG. 27 shows the mechanism that accounts for this virtually perfect performance by the segmented plate structure employed by the present invention, and its virtual elimination of the second through tenth problems faced by conventional prior art roll capacitors. FIG. 27 shows the end view of roll capacitor 51 with the segmented plate structure employed by the present invention. Terminal 5 is shown in the common position at the center of the circular end of the capacitor cylinder. End spray 3 occupies this entire circle, and carries the signal from terminal 5 to all plate segments. One typical such plate segment 62 is shown, corresponding to plate segment 62 in FIG. 26, but as seen from plate edge 11 edge on. This plate segment's length dimension L is wound around the capacitor roll, thus forming part of an almost perfect circle; this plate segment 62 executes about ¾ of a turn around the capacitor roll at the radius shown. End points 61,55 along plate edge 11 of this plate segment 62 correspond to end points 61,55 shown in FIG. 26 along plate edge 11 on the plate segment's length L dimension. Three paths 58 show the distances from terminal 5 to points 61, 55, and some midpoint of plate edge 11 along the plate segment's length L dimension, via end spray 3. These three paths 58 are virtually identical in length, due to the fact that plate segment 62 executes an almost perfect circle as shown in FIG. 27 (the only deviation from perfect circularity is a slight spiraling due to the minute thickness of the rolled up sandwich structure shown in FIG. 3).

Thus, with the segmented plate structure employed by the present invention, all points along plate edge 11 are fed the signal virtually simultaneously from terminal 5, for any given plate segment. Therefore, within any plate segment, all of the displacement current propagates as shown by paths 57 in FIG. 26, which are virtually identical to the ideal paths 13 in FIG. 5.

FIG. 28 shows the same mechanism as FIG. 27, but for innermost plate segment 63 that is nearest dummy core mandrel 60 of the roll capacitor, rather than for a typical plate segment 62 as shown in FIG. 27. Depending on the diameter of the mandrel and the chosen length L for innermost plate segment 63, it is possible that innermost plate segment 63 will execute several turns around the capacitor cylinder. FIG. 28 shows innermost plate segment 63 executing almost two turns around the capacitor cylinder. End points 18,54 along plate edge 11 of plate segment 63 correspond to end points 18,54 shown in FIG. 26. It can be appreciated that there is slightly more deviation among the length of paths 58 for this innermost plate segment 63 than for typical plate segment 62 shown in FIG. 27. The deviation per turn is merely twice the thickness of plate 1 with its supporting dielectric substrate 7, which would typically be about 0.5 mil (0.0005 inch). Thus there is slightly more deviation from perfect simultaneity in propagating the signal from the various points along plate edge 11 into innermost plate segment 63. And therefore displacement current paths 56 as shown in FIG. 26 for innermost plate segment 63 are slightly less identical to ideal paths 13 as shown in FIG. 5. Nevertheless, the signal propagation is still very close to simultaneous, and the displacement current paths 56 are still very close to ideal paths 13, within innermost plate segment 63.

In contrast, FIG. 29 shows how this same mechanism operates very differently in conventional prior art roll capacitor 50, also shown in end view. Plate edge 11 of contiguous plate 1 occupies the entire spiral of the rolled up capacitor, and as such its spiral occupies the entire circular face shown in this end view. End points 18,146 along plate edge 11 correspond to end points 18,146 shown in FIG. 24. Two paths 59 show the distances from terminal 5 to points 18 vs. 146 along the plate's length L dimension, via end spray 3. There is a large difference between the length of these two paths 59; the difference is approximately the radius R of the complete roll capacitor (disregarding the mandrel core radius for simplicity); this difference could typically be .5 inch. Thus, end points 18 and 146 will be fed the signal at significantly different times, corresponding to the travel time for the distance of radius R via end spray 3. This in turn gives rise to the non-ideal displacement current propagation patterns discussed above for the second through tenth problems faced by conventional prior art roll capacitors. This causes the signal corrupting interference and turbulence discussed as the sixth through tenth problems. This also causes the higher inductance and time dispersion discussed as the second through fifth problems.

It can be appreciated that the segmented plate structure employed by the present invention virtually eliminates the second through tenth problems faced by conventional prior art roll capacitors. Its performance is not merely 1,000,000 times better, or 455,000 times better, or 1000 times better in these various problem areas. Rather, it cures these problems almost completely. Recall that these problems arose in conventional prior art roll capacitors only because the signal did not propagate simultaneously from all points along plate edge 11. The segmented plate structure employed by the present invention solves these problems by insuring that the signal does propagate virtually simultaneously from all parts of plate edge 11 for each plate segment 41. Thus, within each plate segment 41 all the displacement current propagates along paths virtually identical to ideal paths 13. These ideal paths 13 provide the lowest possible inductance, eliminate time dispersive problems, eliminate signal corrupting interference and turbulence, and do not stimulate stray circulating eddy current loops.

A key design feature in the segmented plate structure employed by the present invention is to make the plate segments short enough along length dimension L so that the entirety of plate edge 11 for any plate segment 41 is substantially the same distance from terminal 5. This insures that the entirety of plate edge 11 for any plate segment 41 will be fed simultaneously. This in turn produces the nearly ideal displacement current paths similar to paths 13, and thereby virtually eliminates the second through tenth problems faced by conventional prior art roll capacitors.

S. Continuous Control of Electrical Change

Thus, the segmented plate structure employed by the present invention directs and constrains electrical phenomena within the capacitor, with respect to time (e.g. feeding a plate segment simultaneously from its entire plate edge 11) and with respect to space (e.g. making the displacement current paths 57 parallel).

A primary goal and primary overall use of the segmented plate structure employed by the present invention may be summarized as control of electrical change, with respect to both space and time, within a capacitor. The term electrical change is intended here to comprise: signal propagation, current, displacement current, current direction, current path, current change, electromagnetic field change, electromagnetic wave propagation, electrostatic force change, electrostatic field change, electric charge movement, stray or eddy currents, and interference patterns and turbulence.

A primary goal and use of this segmented plate structure is to direct and constrain, i.e. control, these various electrical changes so as to provide improved and superior electrical performance, compared to that afforded by the contiguous plate structure of conventional prior art roll capacitors. The virtual elimination of the second through tenth problems faced by conventional prior art roll capacitors is accomplished by directing and constraining electrical change within the capacitor, in such ways as to provide more ideal electrical changes and hence better electrical performance, as described above.

T. Reducing Eleventh Problem of Circulating Current Loops

The segmented plate structure employed by the present invention provides significant advantage for the eleventh problem faced by conventional prior art roll capacitors, stray circulating eddy current loops. FIG. 30 shows contiguous plate 1 of a conventional prior art roll capacitor in plan view, and is similar to FIG. 15. One plate segment 41 from the segmented plate structure employed by the present invention is shown superimposed (dashed lines) on plate 1, to illustrate the contrast in performance of the two structures. A subarea 68 of contiguous plate 1, equivalent in size to plate segment 41, is also shown superimposed (dotted lines) on plate 1. Within any large conducting solid or surface, stray circulating eddy current loops tend to form, of various sizes and at various locations within the conducting solid or surface. Four sizes of typical stray circulating eddy current loops 64,65,66,67 are shown, at various locations.

Within any plate segment 41 of the segmented plate structure employed by the present invention, the only sizes of stray circulating eddy current loops that can form are 64 and 65; loops 66 and 67 are too large. In contrast, within plate 1 of the structure employed by conventional prior art roll capacitors, all sizes 64,65,66,67 of stray circulating eddy current loops can form, at various locations within plate 1.

Larger loops naturally have a longer periodicity, in proportion to their greater circumferential length, due simply to the longer travel time necessary for the eddy current to complete the loop. If the mechanisms causing stray circulating eddy current loops tend to cause a proportional (or constant) current density per periodicity of loop, then any given 2 inch by 1 inch subarea 68 of plate 1 in the conventional prior art contiguous plate structure will have the same current density of loops 64,65 as any 2 inch by 1 inch plate segment 41 in the segmented plate structure employed by the present invention. But any given 2 inch by 1 inch subarea 68 of contiguous plate 1 will also have additional current density of stray circulating eddy current loops, for all of the larger loops 66,67 that also traverse this subarea 68. Thus, the current density of stray circulating eddy current loops will be higher in any subarea 68 of the conventional prior art roll capacitor contiguous plate structure than in equivalent size plate segment 41 of the segmented plate structure employed by the present invention.

Moreover, the total amount of stray circulating eddy current in plate 1 of a conventional prior art roll capacitor will be higher than that in the sum of all 1000 plate segments of a segmented plate capacitor. Analogously, the total amount of stray eddy current is much higher in a solid permeable structure than in a structure of the same volume comprising 1000 laminations, which is why transformers are made as laminated structures. This higher stray current density and higher total amount of stray current is disadvantageous because it saps energy from the displacement current of the desired signal being processed by the capacitor, and worsens noise. It can also corrupt the desired signal by interfering vectorially with the displacement current, both electrostatically and electromagnetically.

Furthermore, the longer loops 66,67 allowed by the contiguous plate structure of a conventional prior art roll capacitor have a longer periodicity and a longer decay time constant than the shorter loops 64,65. Thus, these longer loops 66,67 will linger longer after each transient of the desired signal being processed by the capacitor, and will cause worse time smearing corruption of this signal. This problem is then made far worse by the fact that these longer loops 66,67 follow paths that have preponderant vector components along the length dimension L of plate 1, and therefore execute many closely packed coil loop turns of the rolled up plate 1. This multiplies the inductance of these paths in proportion to the square of the number of turns executed, and this much higher inductance causes a further lingering for loops 66,67, thereby making their time smearing effect upon the desired signal far worse.

In contrast, the segmented plate structure employed by the present invention does not allow these longer stray circulating eddy current loops 66,67 to form, and does not allow any paths that execute many coil loop turns of the rolled up capacitor. Hence there are no loops with long periodicity, long time constant, or significantly multiplied inductance, and thus there is much less time smearing effect corrupting each transient of the desired signal being processed by the capacitor. The segmented plate structure employed by the present invention offers a performance improvement by a factor of 1000:1 based just on the length, periodicity, and time constant of the stray circulating eddy current loops allowed, and offers a yet further improvement when the squared inductance multiplying effect of coil loop turns is taken into account.

Additionally, the segmented plate structure employed by the present invention does not stimulate or maintain stray circulating current loops by means of electrostatic force couples, as does the contiguous plate structure of conventional prior art capacitors, as shown in FIG. 14. In fact, the segmented plate structure employed by the present invention tends to discourage and quickly quell any stray circulating eddy current loops that do form in any plate segment 41. As shown in FIG. 26, the displacement current follows virtually ideal parallel paths 57, which would tend to tend to overwhelm any current vector in any other direction, thereby discouraging and quickly quelling any other current vectors. A circulating current loop cannot exist without current vectors in other directions to complete the loop, so all stray circulating eddy current loops tend to be discouraged and quickly quelled by the segmented plate structure employed by the present invention. Thus, the segmented plate structure employed by the present invention offers an even greater performance improvement over the conventional prior art capacitor structure.

U. Minimal Intersegment Circulating Current Loops

It is still possible, with the structure employed by the present invention, to have some stray circulating eddy current loops larger than the size of one plate segment, since a single loop could occupy several plate segments by traveling to and fro between the various segments via end spray 3. However, two factors reduce this potential problem to negligible practical proportions, and further show the advantages of the structure employed by the present invention over the contiguous plate structure employed by conventional prior art roll capacitors.

First, the area of end spray 3 is very small compared to the area of contiguous plate 1 of a conventional prior art roll capacitor. Even a large capacitor with a 1 inch diameter would have an end spray area of merely 0.785 square inches; the area of contiguous plate 1 for such a capacitor might be 2000 square inches, which is 2500 times greater. Thus, the area of end spray 3 cannot support nearly as many stray current paths as the area of contiguous plate 1 of a conventional prior art roll capacitor. This is true in terms of current density that can be supported in any given area, and also in terms of vectorial addition and cancellation (if confined to traverse a small area such as end spray 3, vectorially opposite paths of stray current loops are more likely to meet head on and vectorially add, thereby canceling each other and quashing both loops).

Second, in the structure employed by the present invention all the displacement current follows nearly ideal paths 56,57 of FIG. 26, which have virtually no vector component in the length L dimension. End spray 3 is a thin surface that exists only in the length L dimension, and thus can carry current only in the length L dimension. Thus, the structure of the present invention does not encourage any current to flow to and fro through end spray 3, which is the only way that a stray circulating current loop could get from one plate segment to another and then back again.

Indeed, the structure of the present invention actively discourages any such to and fro current flow through end spray 3. FIG. 31 shows in perspective view one end of roll capacitor 51 employing the segmented plate structure of the present invention. All of the displacement current through each plate segment follows nearly ideal paths 57. To reach each plate segment via end spray 3 from terminal 5, the current follows paths 113. The nearly ideal paths 57 sink all the displacement current away from end spray 3, as soon as the current arrives at plate edge 11 of each plate segment via end spray 3 from terminal 5. This unidirectional current sink pointing away from end spray 3 discourages, via vectorial cancellation, any stray current from going in the opposite direction, i.e. back up into end spray 3. Without any current going back up into end spray 3 from any plate segment, no circulating loops can form via end spray 3, since loop formation requires current going in both directions.

Furthermore, this unidirectional sink also encourages the current to flow in only one direction (in a polar coordinate view) through end spray 3 itself, e.g. radially along paths 113 from a centrally located terminal 5, in order to feed the sink (similarly, a waterfall sucks at the water just upstream, causing an overwhelmingly powerful unidirectional flow). If all the current flow within end spray 3 is unidirectional (e.g. along radial paths 113 from terminal 5), then no circulating loops can form, since a loop using end spray 3 as a highway between plate segments could only traverse it by having vectors in two opposite directions.

In contrast, the contiguous plate structure employed by conventional prior art roll capacitors exhibits almost opposite behavior. Some of the displacement current in this structure's contiguous plate 1 does have significant vector components parallel to end spray 3, and also engenders interference patterns, force couples, and turbulence with vector components in this dimension. These vector components encourage stray circulating current loops such as 67 in FIG. 30 that run close to and parallel with plate edge 11, which is intimately attached to end spray 3. Thus, end spray 3 becomes an electrical continuation of the large contiguous surface area of plate 1, a continuation which can carry circulating current loops as well as the plate itself. In effect, the contiguous plate, carrying stray current loops to and fro over its very large area, and over its very long length L dimension, can engage end spray 3, which exists in the length L dimension, as a partner in this to and fro current flow, and thereby encourage to and fro currents within end spray 3. Because some displacement current propagates through the large contiguous plate with vector components in the same length L dimension as end spray 3 exists, the plate acts less effectively as a sink pointing vectorially away from end spray 3, and thus is also less compelling in setting up a unidirectional (e.g. radial) current flow within end spray 3. Therefore, the contiguous plate structure does face a significant problem from end spray 3 being a vehicle for carrying stray circulating currents to and fro from various parts of the plate, whereas this is not a significant problem for the segmented plate structure employed by the present invention.

V. Twelfth Problem: High Inductance Even for Shortest Paths

There is also a twelfth problem faced by conventional prior art roll capacitors, which can best be described by contrasts with the segmented plate structure employed by the present invention. The second through tenth problems were primarily caused by the many current paths through plate 1 that deviate significantly from ideal paths 13 shown in FIG. 5. These deviant paths are allowed by the contiguous plate prior art structure, whereas the structure employed by the present invention directs and constrains (i.e. controls) the currents within the capacitor so that only paths similar to ideal paths 13 are allowed. Nevertheless, some of the displacement current paths through plate 1 in the conventional prior an structure do closely follow the ideal paths 13. FIG. 32 shows plate 1 of a conventional prior art roll capacitor in plan view, and is similar to FIG. 5. Arrows represent paths 69 followed by that portion of the displacement current that does follow paths similar to the ideal paths 13 of FIG. 5.

The twelfth problem faced by conventional prior art roll capacitors is that even for that portion of the displacement current that does follow virtually ideal paths 69, a conventional prior art roll capacitor still has needlessly high series self inductance; the segmented plate structure employed by the present invention achieves far lower series self inductance.

FIG. 33 shows plate 1 of a capacitor in plan view, where the plate is divided into plate segments 41, in accordance with the structure employed by the present invention. In keeping with our current example, there are assumed to be 1000 such segments 41. Arrows represent paths 70 followed by all of the displacement current through each plate segment 41; these paths 70 are virtually identical to the ideal paths 13 in FIG. 5, as discussed above.

Now, the self inductance of a conductor is proportional to the logarithm of the reciprocal of the conductor width (the dimension perpendicular to current propagation), all other factors being equal. A single plate segment 41 has 1/1000 the width of plate 1 in FIG. 32, in the dimension perpendicular to current paths 69,70. Therefore a single plate segment 41 has 3 times greater series self inductance than the contiguous plate 1 of FIG. 32. But the segmented plate structure shown in FIG. 33 presumably connects all 1000 plate segments 41 in parallel with one another. This parallel array of 1000 plate segments 41 has 1/1000 the series self inductance of any one plate segment 41 (as will be discussed below, the array's self inductance can be reduced even further, by a further factor of 2, by deliberately misaligning registration of the 1000 plate segments, thereby creating an array of up to 2000 plate subarea pairs, yielding up to 2000 capacitances in parallel). For present purposes, we may say that the series self inductance of the whole parallel array of plate segments 41 in FIG. 33 has a series self inductance that is 3/1000 (0.003) times that of the contiguous plate 1 in FIG. 32.

Thus, the segmented plate structure employed by the present invention offers superior electrical performance by having a series self inductance that is 333 times better (smaller) than the contiguous plate structure employed by conventional prior art roll capacitors, even for the lowest inductance paths followed by some of the displacement current in the conventional prior art structure.

W. Ameliorating First Problem of Time Differential Due to End Spray

The structure of the present invention also employs an optional feature that ameliorates the first problem faced by conventional prior art roll capacitors. As noted in the discussion for FIG. 8, some parts of plate edge 11, shown in FIGS. 5 through 7, receive the signal at later times than others, the time delay being caused by the travel time along radius R from centrally located terminal 5 via end spray 3. In the conventional prior art roll capacitor structure, with its contiguous plates, this time delay gives rise to the second through tenth problems. The segmented plate structure employed by the present invention virtually eliminates these second through tenth problems. It still faces the same time delay along radius R via end spray 3, but, in the segmented plate structure employed by the present invention, this time delay does not cause the second through tenth problems, since all displacement current paths through each plate segment can be kept short and parallel, similar to ideal paths 13 in FIG. 5.

But the segmented plate structure, in common with the contiguous plate structure, still faces the first problem; indeed, formats other than roll capacitors, such as stacked capacitors, also still face this first problem. Different paths 16 (e.g. 16a–16c) in FIG. 8 have slightly different lengths, varying over a range corresponding to radius R at each end of a capacitor. This causes a time differential among various paths 16 through the overall capacitor. Since the signal put out by a capacitor is the instantaneous sum of all paths 16, as received at terminal 6 from terminal 5, this time differential will cause a slight time smearing of the signal being processed by the capacitor. In a segmented plate structure the paths within each plate segment might be substantially simultaneous with one another, but there is still time differential from one plate segment to another, depending on how far a particular plate segment is located from terminal 5 along end spray 3 and from terminal 6 along end spray 4. It would be advantageous to minimize this time differential, and thus incur less time smearing of the signal being processed by the capacitor.

If both terminal 5 and terminal 6 are centrally located on the faces occupied by end sprays 3 and 4 respectively, then the maximum time differential is equivalent to the propagation time for radius R, multiplied by two (since the differential at one end of the capacitor adds to the differential at the other end). However, if terminal 5 and/or terminal 6 were not centrally located on the faces occupied by end sprays 3 and 4 respectively, then this maximum time differential could be lessened. Thus, the first problem could be ameliorated, and the capacitor could yield superior electrical performance by processing a signal with less time smearing.

For example, terminal 5 and/or 6 could contact end sprays 3 and/or 4 not at the central point, but rather in the form of an annular ring. If this annular terminal contact were located at a distance approximately 0.5 R from the central point, then the absolute value of the maximum time differential for all plate segments would be minimized. Alternatively, if this annular terminal contact were located at a distance approximately 0.707 R from the central point, then the time differential would be minimized for the greatest number of plate segments, or for the greatest amount of plate area within the capacitor as a whole. Details of non-central terminal structures taught by the present invention will be described below, under Description of Preferred Embodiments.

In the description of FIG. 5 it was noted that prior art's central point terminal contact places terminal 5 disadvantageously at one extreme end of the long plate edge 11 in a roll capacitor; this worsens the second through tenth problems faced by conventional prior art roll capacitors. In contrast, the approximately 0.707 R location for an annular terminal contact would effectively place terminal 5 at the center of the long plate edge 11 in FIG. 5; that is, an equal area of plate 1 would be within the annular contact as would be beyond the annular contact.

Additionally, or alternatively, terminals 5 and 6, not necessarily in annular form, could be made to contact end sprays 3 and 4 at points substantially offset on substantially opposite radii. In this manner, paths 16 traveling a longer distance on end spray 3 would travel a shorter distance on end spray 4, and vice versa. Thus, the time differential among various paths 16 would be lessened.

These non-central terminal contact locations would ameliorate the first problem for all capacitors, and would in turn also ameliorate the second through tenth problems if applied to such capacitors, especially contiguous plate roll capacitors.

It is noted with reference to FIG. 31 that a non-central terminal 5 might result in current flowing in directions other than radial within end spray 3. However, the advantages discussed for the structure of the present invention in conjunction with FIG. 31 still pertain. The current at any point within end spray 3 would still be unidirectional, moving and being sucked away from terminal 5, regardless of the shape and location of terminal 5.

The general structural features of a segmented plate capacitor structure, such as that employed by the present invention, have been discussed above, to clarify the problems of prior art by way of contrast. The particular structure taught by the present invention will be described fully below, under Description of Preferred Embodiments.

III. Segmented Plate Capacitors

A few narrow areas of prior art have employed segmented plate structures for capacitors. But all these prior art structures differ in some key particulars from the structure that will be taught by the present invention. The prior art structures have several disadvantages that limit their utility, make them prohibitively expensive to manufacture, and degrade their electrical performance, as will be described below. In contrast, the structure taught by the present invention has wider utility, is much less expensive to manufacture, and exhibits superior electrical performance.

Moreover, prior art has taught only a few limited uses for a segmented plate structure in general, or in particular for a more specific segmented plate structure such as that employed by the present invention, as will be described below. In contrast, the present invention teaches a number of new uses for a segmented plate structure, e.g. virtual elimination of the second, third, and fifth through tenth problems faced by conventional (contiguous plate) prior art roll capacitors, as described above.

Furthermore, prior art has taught some type of segmented plate structure as a method for solving only a few of the problems faced by conventional prior art roll capacitors, e.g. the fourth and eleventh problems described above. In contrast, the present invention teaches a specific type of segmented plate structure as a method for solving all of the second through twelfth problems.

A. Segmented Plate Structure Employed by Present Invention

In terms of structure, prior art has taught a segmented plate capacitor structure in several formats. The format of segmented plate structure employed by the present invention will be described here, to clarify by contrast the structural distinctions and limitations of prior art, and the disadvantages produced by each such distinction and limitation. A detailed and specific description of the particular structure taught by the present invention follows further below, under Description of Preferred Embodiments.

FIG. 34 shows plate 1 and plate 2 in offset plan view, with plate 2 mostly hidden behind plate 1. The conductive surface of plate 1 is divided into a plurality of separate, distinct insular segments 71 (71a, 71b, etc.), similar to plate segments 41 shown heretofore. Segments 71 are separated by gaps 75, where dielectric substrate 7 (not shown) is exposed. There might be 1000 such segments along the length dimension L of plate 1. An edge 73 of each segment 71 is similar in function to plate edge 11 shown heretofore. End spray 3 (not shown) connects all segments 71 commonly in parallel via their edges 73, and also connects all segments 71 to terminal 5. Likewise, the conductive surface of plate 2 can optionally be divided into a plurality of segments 72 (72a, 72b, etc.), separated by gaps 76. In this case, an edge 74 of each segment is similar in function to plate edge 12 shown heretofore. Segments 72 are connected in common to terminal 6 and to each other via end spray 4 (not shown) and their edges 74.

There are several key topological features that generally characterize this structural format employed by the present invention. First, the opposite polarity plates 1,2 are located on two different planes. Segments that are located in the same plane (i.e. are coplanar) have the same electrical polarity and are connected in common. Conductive surfaces connected to opposite polarities are not coplanar in their entirety (no two electrically distinct plates are coplanar).

Second, segments electrically connected in parallel or to the same polarity can freely be spatially adjacent to one another, for example being side by side in a coplanar topology. Two plate segments of the same polarity can freely be adjacent, without any plate segment of opposite polarity being interposed between the two. A direct straight line can easily be drawn in three dimensional space that connects two plates or plate segments of the same polarity, without touching a plate or plate segment of opposite polarity. Plate segments of the same polarity can have subareas that are mutually coplanar.

Third, the dimensions of various segments 71,72 and gaps 75,76 can freely be arbitrary and varied. The length of segment 71a in the length L dimension can be arbitrary. There is a preferred range for length, which balances several factors to be described later, but the present invention still works and offers its advantageous uses over several orders of magnitude of length for each segment. Likewise, the width dimension W of segment 71 a can be arbitrary. The length and width of succeeding segments 71b,71c, etc. can freely be exactly the same as segment 71a, or only approximately the same, or randomly different and varied from one another, or different and varied from one another in some progression. Similarly, if plate 2 is segmented at all, segments 72a, 72b, 72c, etc. can be the same size as segments 71a, 71b, 71c, etc. respectively, or they can be different and varied. Gaps 75,76 can be arbitrarily wide or narrow, and can be the same or varied in dimension.

Fourth, it follows that the registration alignment, from segments 71 of plate 1 (and gaps 75) to segments 72 of plate 2 (and gaps 76), can freely be arbitrary. The absolute registration alignment, between the segments of plate 1 and the segments of plate 2, can freely be precisely aligned or arbitrarily misaligned, at any point along the length dimension L of the plates 1,2. Furthermore, the degree of alignment or misalignment in registration at any one point can freely be varied for all other points along the length dimension L of plates 1,2. The segments of plate 1 need not have any edges registered in vertical alignment with any segments of plate 2. And the segments of plate 1 are not contiguous to the edges of plate 1's vertical registration alignment with plate 2.

FIG. 34 illustrates some of the variations possible from the arbitrary dimensional freedoms offered by the structure of the present invention. The segments 71a–71e all happen to be the same size, and segment 72a also happens to be this same size, but segments 72b–72d differ in size from segment 72a and also from one another. The gap separating segments 71a and 71b happens to be aligned in registration with the gap separating segments 72a and 72b, but then succeeding gaps on plate 2 are not aligned in registration with any gaps on plate 1, and they vary in the amount or degree of misregistration.

FIG. 35 shows how the structure of FIG. 34 appears when rolled up into a roll capacitor. FIG. 35 is a cross sectional view of segments 71a–71e and 72a–72d. The key structural features described for FIG. 34 still obtain, with the term "substantially coradial" (i.e. being at virtually the same radius from the capacitor cylinder's axis 114) applying in place of the term "coplanar". Segments of the same polarity, or subareas of these segments, can be adjacent and substantially coradial, instead of being adjacent and coplanar. They are substantially coradial instead of perfectly coradial because the layers of a roll capacitor constitute a spiral roll, not perfectly concentric circles. FIG. 35 also shows the arbitrary registration freely allowed from segments 71 to segments 72, and arbitrary misalignment freely allowed between the gaps 75 and 76, and the arbitrary length dimension L freely allowed for each segment 71 and 72 in FIG. 34, which appears in FIG. 35 as an arbitrary length along a circumferential arc. Now seven different formats of segmented plate structures employed by prior art will be described. Some of these formats are actually stacked capacitors structurally, and are not truly segmented plate capacitors, but they are described in this section because their superficial features might resemble a segmented plate structure, and it is necessary to analyze their structures in order to assess their true character.

B. First Structural Format: Interdigital Capacitors

The first segmented plate structure format of prior art is an interdigital capacitor (e.g. Barnes), where the plates are in the shape of peninsular fingers. FIG. 36 shows the two plates of a typical interdigital capacitor in plan view. A plate 77 is in the form of multiple peninsular fingers, and an opposite polarity plate 78, located entirely in the same plane as plate 77, and on the same dielectric substrate 7, also has the form of multiple fingers, which are interdigitally arranged with respect to the fingers of plate 77. Terminal 5 connects to plate 77, and opposite polarity terminal 6 connects to opposite polarity plate 78.

A key structural feature of this format is that both electrode plates, of opposite polarity, coexist on the same plane in their entirety, in contrast to the structure of the present invention. This structure is very inefficient in using volumetric space to achieve capacitance, since capacitance is a function of opposite polarity plate areas being brought into intimate proximity, which is best achieved by placing the opposite polarity plates on different planes and having them face each other (as the present invention does). Thus, this interdigital structure has no utility beyond very small (picoFarad) capacitances, for very narrow applications at very high (Giga-Hertz) frequencies. It would be prohibitively expensive to attempt to use this structure for larger capacitances and broader applications.

C. Second Structural Format: Triad Plate Capacitors

The second structural format comprises a triad of plates, some of which are segmented (e.g. Alexander, Ferrante, Eisler, DenLim FIGS. 6–8 and claims). This format also has the key structural feature that two electrode plates, having opposite polarity or being electrically distinct, coexist on the same plane in their entirety, in contrast to the present invention. FIG. 37 shows the triad of plates of this second structural format, in plan view, with some elements shown transparent for clarity. A plate 79, which can have a shape with peninsular fingers, is located in the same plane as a plate 80 of opposite polarity, which can have a similar shape. Terminal 5 connects to plate 79, and opposite polarity terminal 6 connects to opposite polarity plate 80. A third electrode plate 81 (usually floating electrically) is then added on a different plane.

This triad of plates electrically forms two capacitors in series. This structure is also volumetrically inefficient in achieving capacitance, being four times worse than the structure of the present invention (for example, in the same space that the present invention's structure could achieve 4 gF, the second format could contain two 2 gF capacitors, which would yield 1 gF as a result of their series connection). Likewise, this structure is very expensive to manufacture, since it consumes four times as much material as the structure of the present invention for a given capacitance.

D. Third Structural Format: Stacked Capacitors with Rigidly Progressive Plates The third structural format uses plates that must be rigidly progressive in size (e.g. Wallace, Kanai). FIG. 38 shows the plates on the parent sheet of this rigidly progressive format in plan view. A plurality of plates 82,84 are connected to terminal 5 via end spray 3, and a plurality of opposite polarity plates 83,85 are connected to terminal 6 via end spray 4. The opposite polarity plates coexist on the same dielectric substrate 7, on the same plane of the parent sheet. These plates must progressively increase in size along length dimension L of dielectric substrate 7, such that alternating polarity plates 82,83,84,85 will register accurately atop one another, when dielectric substrate 7 is wound into a cylindrical roll. FIG. 39 shows the finished roll capacitor of this structural format in cross sectional view. Plates 82,83,84,85 are progressively stacked atop one another, and their edges must be registered accurately in vertical alignment so that a gap 86 exists as a radius through the finished cylindrical capacitor. This format also has the key structural feature that both electrode plates, of opposite polarity, coexist in their entirety on the same plane on the parent sheet, in contrast to the present invention. There is only one dielectric substrate, in contrast to the normal embodiment of the structure of the present invention. Another key structural feature is that the plates must be made to a rigidly predetermined absolute size, and must be made progressive in size, and this progression must adhere to a complex formula; in contrast, the structure of the present invention freely tolerates any size segments and any variation in segment size within a capacitor. Yet another key structural feature is that the plates of the final wound roll capacitor must be precisely registered, with successive opposite polarity plates from the parent sheet stacked precisely atop one another; in contrast, the structure of the present invention freely tolerates (and even specifically encourages, as will be described below) varying misaligned registration of segments.

The third structural format is also very expensive to manufacture: expensive and precise tooling must be created to manufacture the progressively sized plates on the parent sheet; different tooling must be created each time the parent sheet changes in thickness (for different voltage capacitors) or in material stretchability, since this affects plate size according to the complex formula; roll winding speed, tension, and temperature must be carefully controlled to maintain constant stretch of the parent sheet and constant airflow into the winding, in order that precise registration alignment can be maintained for the plates stacked atop one another in the final roll capacitor. In contrast, the structure of the present invention freely allows creation of constantly repetitive and approximate segment sizes by inexpensive means (e.g. a simple, even crude rotating drum that interrupts or burns off metallization with approximate regularity), the same means being useful for all parent sheet thicknesses and material stretchability, and freely allows roll winding by inexpensive machines in inexpensive environments, without careful tension and temperature control.

It can also be appreciated that, once this third format is wound into its finished roll form, its structure is really that of a stacked plate capacitor, as shown in FIG. 39. The plates might be curved instead of flat in shape, but they are still vertically stacked atop one another, with all their edges ending in uniform vertical registration (on either side of gap 86), just as in all conventional prior art stacked capacitors (e.g. Behn, Horstmann; see description of FIG. 2). Every plate in the vertical stack is contiguous to both its edges on both sides of gap 86, which are the common vertical (or radial) alignment edges for the stack—in contrast to the present invention, where the segments of plate 1 are not contiguous to the edges of vertical registration alignment with plate 2. Thus, these curved, vertically (or radially) stacked plates are separate, distinct plates, not segments of the same plate.

This third format might seem to be a segmented plate structure when it is viewed in only its parent sheet form, which is merely an intermediate step in manufacture; but in this form it cannot function as a capacitor, and lacks any utility. It also lacks any utility while the plates remain flat, as on the parent sheet; in contrast, the structure of the present invention functions perfectly either as a flat capacitor with flat plates or as a roll capacitor with curved plates.

In actuality, as a functional capacitor, the structure of the third format is simply that of a stacked capacitor. A stacked capacitor has separate, distinct plates atop one another, which cannot be considered to be segments of the same plate; indeed, a stacked capacitor structurally consists of separate capacitors (a separate capacitor is formed by each pair of plates) stacked atop one another and connected in parallel. This third format (e.g. Wallace, Kanai) meets the topological test that differentiates it from true segmented plate capacitors, and makes it instead a simple stacked capacitor. In a stacked capacitor, no plate is adjacent to another plate of the same polarity, since a plate of opposite polarity always is interposed topologically in three dimensional space between plates of the same polarity. No direct straight line can be drawn in three dimensional space that connects two plates of the same polarity without touching a plate of opposite polarity. No two flat plates of the same polarity can be in the same plane, or coplanar, in a functioning finished capacitor. Likewise, no two curved plates of the same polarity can be at substantially the same radius from the cylindrical roll axis, or substantially coradial.

In contrast, the present invention teaches a structure in which two plate segments of the same polarity can freely be adjacent, without any plate segment of opposite polarity being interposed between the two. A direct straight line can easily be drawn in three dimensional space that connects two plate segments of the same polarity, without touching a plate segment of opposite polarity. Plate segments of the same polarity can have subareas that are mutually coplanar, or substantially coradial from a capacitor axis.

E. Fourth Structural Format: Radially Stacked Conventional Roll Capacitors

The fourth structural format is simply a conventional prior art roll capacitor, with a conventional contiguous plate structure, that has been vertically (or radially) stacked in multiples. FIG. 40 shows a conventional prior art roll capacitor with a contiguous plate structure, in cross sectional view. A cylindrical capacitor winding 87a is wound around dummy mandrel core 60. Winding 87a is actually in the form of a hollow cylinder, to accommodate dummy core 60 within. FIG. 41 shows a simple multiple of this same structure, again in cross sectional view. A second winding 87b is structurally identical to winding 87a, also being a hollow cylinder. The dimensions of winding 87b are larger than winding 87a, so that both mandrel 60 and winding 87a fit within winding 87b's hollow cylinder. This winding structure 87a can be repeated further, as 87c, 87d, etc.

Thus, this fourth structural format essentially consists of multiple separate capacitors. Each of these capacitors is structurally identical to a conventional prior art roll capacitor, being limited to a single long contiguous plate for each polarity, and thus offers no fundamental advance in the art. Each of these capacitors still faces the first through twelfth problems discussed above for conventional, contiguous plate prior art roll capacitors; in contrast, the structure of the present invention solves most of these problems.

These multiple separate capacitors might be structurally attached to one another in a coaxial arrangement, instead of being independently mounted side by side on a printed circuit board, but they are still functionally independent. Indeed, this prior art even teaches these multiple windings as being functionally independent, even when they are to be electrically connected in parallel. All prior art teaches a fully circumferential barrier or sleeve 88 that separates winding 87a from 87b (Stockman and Warmont teach an alien dielectric, while Lim teaches to use the dielectric substrates themselves as a cylindrical barrier sleeve, requiring that this insulation, free of conductive plate material, be "sufficient to encircle said capacitor section at least once"). This fully circumferential barrier fully separates winding 87a from winding 87b, topologically and functionally. It means that winding 87a is a separate, independent capacitor from winding 87b. It means that windings 87a and 87b are functionally independent capacitors that happen to be physically adjacent, and are stacked vertically or radially. Because the capacitors are functionally independent, the contiguous plate 1 within one capacitor is necessarily functionally independent from contiguous plate 1 in another capacitor. Therefore, the conductive plate surfaces of the several independent capacitors cannot be said to be segments of the same plate, as in the structure of the present invention. Because of the fully circumferential barrier 88 in this fourth structural format, separate plate conducting surfaces of the same polarity cannot possibly be coplanar, or substantially coradial from a capacitor axis, in contrast to the structure of the present invention, where separate plate segments of the same polarity can be coplanar (as in FIG. 34) or substantially coradial from a capacitor axis (as in FIG. 35). This fourth format (e.g. Lim, Stockman, Warmont) meets the topological test that differentiates it from true segmented plate capacitors, and makes it instead a simple stacked capacitor. In a stacked capacitor, no plate is adjacent to another plate of the same polarity, since a plate of opposite polarity always is interposed topologically in three dimensional space between plates of the same polarity. No direct straight line can be drawn in three dimensional space that connects two plates of the same polarity without touching a plate of opposite polarity.

In contrast, the present invention teaches a structure in which two plate segments of the same polarity can freely be adjacent, without any plate segment of opposite polarity being interposed between the two. A direct straight line can easily be drawn in three dimensional space that connects two plate segments of the same polarity, without touching a plate segment of opposite polarity. Plate segments of the same polarity can have subareas that are mutually coplanar, or substantially coradial from a capacitor axis.

F. Fifth Structural Format: Pockmarked Contiguous Plate Capacitors

The fifth structural format starts with the single large contiguous plate of conventional prior art roll capacitors, and then merely pockmarks it (e.g. Morecroft, Kato, FIG. 5B and . . .), instead of dividing it into distinct, true segments as does the structure of the present invention. FIG. 42 shows contiguous plate 1 in plan view; this is similar to FIG. 15. The fifth structural format cuts a plurality of slits 89 in the contiguous conductive surface of plate 1. But these slits merely pockmark the contiguous conductive surface, and do not divide the plate into distinct segments. Therefore, this structure still allows undesirable stray circulating eddy current loops to form on the pockmarked large contiguous conductive surface of plate 1, especially large loops which are the most disadvantageous as discussed above.

Stray circulating eddy current loops 90,91 in FIG. 42 are similar to loops 39,40 in FIG. 15, which form on the contiguous plate of the conventional prior art roll capacitor. Thus, this fifth structural format shows no essential advantage over the conventional prior art roll capacitor. In particular, this format still allows the longest stray circulating loops to form, such as 91, which is similar to loop 40 in FIG. 15 and to loop 67 in FIG. 30. These longest loops can have the worst corrupting effect upon the desired signal being processed by the capacitor, because of their long periodicity and the very high inductance for their path, as discussed above. In contrast, the structure of the present only allows very short stray circulating loops, such as 64,65 in FIG. 30.

Moreover, this fifth structural format still faces the first through twelfth problems faced by conventional prior art roll capacitors, as described above. In particular, the various points along the length dimension L of plate edge 11 are still fed over a period of time, rather than simultaneously; this causes a fan shaped propagation pattern for some displacement current, which results in long paths, high self inductance, and interference and turbulence, as described above. In contrast, the structure of the present invention divides plate 1 into true segments, and all points along plate edge 11 within each segment are fed substantially simultaneously, producing virtually ideal paths 13 for all the displacement current, and thereby solving the second through twelfth problems that are still faced by the fifth structural format.

G. Sixth Structural Format: Fixed Registration Capacitors

The sixth structural format is limited to keeping its plate segments aligned in rigid absolute registration, between the two plates of opposite polarity (e.g. Bailey, Horstmann, Tamada, Kato). This limitation has the disadvantages of adding manufacturing expense and degrading electrical performance. In contrast, the structure of the present invention freely allows and even encourages random absolute registration alignment between the segments of opposite polarity plates; this has the advantage of reducing manufacturing expense. Furthermore, the structure of the present invention freely allows and even encourages variation of alignment registration within each capacitor; this has the advantage of providing superior electrical performance.

FIG. 43 shows one example of this sixth structural format (after Bailey FIG. 1). A plate 92 and a plate 93 are shown in plan view, with plate 93 shown behind plate 92, and plate 92 shown as transparent for clarity. Plates 92,93 are both formed with a shape having fingers. Bailey is limited to maintaining a fixed absolute registration alignment in which the fingers of plate 92 are "alternately disposed" with respect to the fingers of plate 93. For example, Bailey's structure would no longer function as intended if the fingers, and the gaps between the fingers, were aligned in perfect vertical registration on one plate with respect to those on the other plate.

Conversely, other examples of this sixth structural format are also limited to maintaining a fixed absolute registration alignment, but one in which the fingers are aligned in substantially perfect vertical registration. FIG. 44 shows such an example (after Horstmann FIG. 2). A plate 94 and a plate 95 are shown in plan view, with most of plate 95 shown behind plate 94. Plates 94,95 are both formed with a shape having fingers. The fingers of plate 95 are totally hidden behind the fingers of plate 94 in FIG. 44, since this structure requires the fingers to be in substantially perfect registration. Horstmann teaches that the displacement current in this structure follows a path 96 within plate 94, and a path 97 within plate 95. The purpose of this structure is to make the paths 96 and 97 as topologically close to each other as possible in space, but traveling in opposite vectorial directions. This purpose is served only if the fingers of plate 94 are maintained in substantially perfect registration with the fingers of plate 95; this fixed registration alignment must be maintained throughout the capacitor.

The absolute registration alignment required by this sixth structural format has the disadvantage that it can be expensive to manufacture, particularly for usably large capacitance values made in roll form. First, the two rolls for the two plates on the winding machine must be carefully started in perfect absolute registration alignment with each other, requiring costly hand intervention by the operator for each capacitor to be wound. Second, it is difficult to then maintain this same registration between the two plates as the capacitor is wound (a precisely staggered tension offset, an adjustment changing with temperature, might be required, with slower than normal winding speeds).

H. Problems of Internal Self Resonance

The fixed, unvarying registration alignment required by this sixth structural format has the disadvantage that it degrades electrical performance, by concentrating the capacitor's self resonance at just one frequency, thereby making it a high Q self resonance. Every capacitor has an internal self resonance, caused by its capacitance reactively interacting with its series self inductance. This internal self resonance is undesirable for most circuits in which a capacitor might be employed, since the capacitor no longer acts primarily as a capacitive reactance in the frequency region of this self resonance. The undesirable effects of this self resonance can be especially problematic if the resonance has a high Q concentrated around a single frequency. A series resonant circuit with a high Q resonance has a much lower impedance notch, develops higher internal voltages, and rings longer after each transient, than one with a low Q resonance. A capacitor with a higher Q internal self resonance can have more severe adverse effects upon the circuit in which the capacitor is employed, for example promoting instability in the circuit at the frequency of the capacitor's internal self resonance, or corrupting the signal with its own prolonged ringing response to transients.

The frequency at which this internal self resonance occurs is determined by the value of the capacitor's capacitance and its series self inductance. The higher the frequency, the better for most applications, since this can keep the self resonance beyond the passband of the circuit employing the capacitor or beyond the passband of the signal being processed by the capacitor.

Thus, there are two desiderata for a capacitor's internal self resonance: low Q and a high frequency. Conventional prior art roll capacitors, with a contiguous plate structure, fail to achieve the high frequency desideratum. Their series self inductance is very high, which disadvantageously results in the self resonance occurring at a very low frequency. As discussed above, even their shortest displacement current paths have 333 times greater self inductance compared to all the displacement current paths in an equivalent segmented plate capacitor structure with 1000 segments. Meanwhile, their longest displacement current paths, traveling all 1000 coil loop turns of a roll capacitor, could have over 1,000,000 times greater self inductance. The frequency of a series resonance is inversely proportional to the square root of the inductance. Thus, the frequency of the self resonance in a conventional prior art roll capacitor is 18 to 1000 times lower than a segmented plate structure with 1000 segments achieves. The contiguous plate structure exhibits 18 to 1000 times worse electrical performance in meeting this desideratum.

On the other hand, the contiguous plate structure does achieve the other desideratum of low Q. The wide range of self inductance for the different path lengths followed by displacement current result in a wide range of resonant frequencies for the various paths. The internal series self resonance is spread over a range of frequencies, between 18 and 1000 times lower than the resonant frequency of a segmented plate structure with 1000 segments. Incidentally, varying inductance over a wide range is not the best method for achieving a wide spread of resonant frequencies and thus low Q, since a wide range of inductances corrupts the desired signal via time dispersion smearing, as discussed in the fifth problem above; it will be seen that the structure of the present invention employs a different method for achieving low Q.

In contrast, consider the segmented plate structure using the sixth format, characterized by fixed segment size with fixed registration. It has the converse strength and weakness. It achieves the desideratum of a high frequency for its internal self resonance, but fails to achieve the desideratum of low Q for this internal resonance.

Consider now the capacitance and self inductance of not the whole array of 1000 plate segments, but rather that of just one plate segment. With 1000 segments, the capacitance of each segment would be 1/1000 that of the equivalent contiguous plate capacitor, while the inductance of each segment would be 3 times higher than that of the shortest paths through the contiguous plate, due to the factor of conductor width alone. Thus, the product of capacitance and self inductance would be 333 times greater for the contiguous plate structure than the segmented plate structure. The frequency of a series resonance is inversely proportional to the square root of this product, so the resonant frequency would be 18 (square root of 333) times higher for one segment than for the shortest paths through the contiguous plate.

However, the segmented structure of the sixth format fails to achieve the desideratum of low Q. All its plate segments are limited to staying in the same fixed, unvarying registration alignment throughout the capacitor, and there is no teaching to vary the size of these plate segments. Thus, all 1000 plate segments would have the same capacitance. All paths through any single plate segment have the same inductance, since all the displacement current nearly follows ideal paths 13 through each segment. Thus, the series resonance for any single segment will be high Q. Furthermore, all 1000 plate segments will have similar (though not precisely identical) self inductance as one another. Thus, all 1000 plate segments will have a high Q series resonance at a similar frequency as one another. Therefore, the entire segment array of the sixth structural format will have a high Q internal series self resonance, within a narrow frequency spread. As noted, this high Q internal self resonance is detrimental to the capacitor's performance in most circuit applications, at frequencies near this resonance.

I. Reducing Problems of Internal Self Resonance

The structure of the present invention performs in contrast to both the contiguous plate structure and the sixth structural format, characterized by fixed segment size with fixed registration. The structure of the present invention can achieve both desiderata for a capacitor's internal self resonance, low Q and a high frequency. The present invention also can achieve both desiderata at an inexpensive manufacturing cost, in contrast to the third structural format above.

The general approach taken by the present invention will be described here, to clarify by contrast the structural distinctions and limitations of prior art, and the disadvantages produced by each such distinction and limitation. A detailed and specific description of the particular structure taught by the present invention follows further below, under Description of Preferred Embodiments.

The method and structure by which the present invention achieves both desiderata is distinct from prior art. The conventional prior art roll capacitor, with its contiguous plate structure, inadvertently spreads out the range of self resonant frequencies by having a wide range of inductances for various displacement current paths. This is disadvantageous because the high inductances of this range lower the frequencies at which self resonance occurs. This is further disadvantageous because the wide range of inductances corrupt the desired signal via time dispersive smearing.

In contrast, the present invention spreads out the range of resonant frequencies by varying capacitance rather than by varying inductance. The frequency of a resonance is determined by the product of inductance and capacitance, so either can be varied in order to achieve a wide range, low Q spread of resonant frequencies. Varying capacitance instead of inductance has an advantage in that it is not destructively time dispersive of the desired signal. Various capacitances in parallel simply add to form a large capacitance, and pure capacitance is of course what is desired from a capacitor structure. Varying capacitance instead of inductance has the further advantage that it does not lower the self resonant frequency. In fact, the structure of the present invention advantageously raises the self resonant frequencies yet further, by providing a range of yet smaller capacitances.

The basic approach taught by the present invention is to create a particular type of segmented plate structural format, and use it in a particular manner, such that a range of small capacitor circuits is created within the single overall capacitor structure. FIG. 45 shows this concept schematically. A large number of small capacitor circuits are connected in parallel. In keeping with our current example, if there are 1000 plate segments for each of the two opposite polarity plates 1,2 in the capacitor as a whole, then there could be about 2000 such small capacitor circuits within the capacitor as a whole. Each of these circuits comprises a capacitor 105 and a series inductance 106. The capacitors 105 have capacitances varying over a wide range of values, the largest of these having the capacitance of one of the 1000 plate segments, and varying all the way down to virtually zero capacitance. Meanwhile, the series inductances 106 remain relatively constant, and all very small, since all of the displacement current nearly follows ideal paths 13.

Thus, each of the series circuits comprising a capacitance 105 and inductance 106 can have a different self resonant frequency, over a very wide range. The lowest of these self resonant frequencies would be that obtained by one of the 1000 full size plate segments; this nominal baseline would already be advantageously a very high frequency, since the capacitance of a full size plate segment is 1/1000 the capacitance of the whole capacitor and the inductance is very low for all displacement current paths within each segment. The range of self resonant frequencies would then advantageously vary upward from there, for all the other of the 2000 series circuits having a smaller capacitance. This is in contrast to the conventional prior art capacitor structure, where the resonant frequencies varied disadvantageously downward rather than upward, from the nominal baseline established by the shortest, most direct displacement current paths.

FIG. 46 shows the mechanism by which the structure of the present invention can execute the concept shown in FIG. 45. FIG. 46 is similar to FIG. 34, and shows plates 1 and 2 in plan view, with plate 1 atop plate 2, and plate 2 partially hidden behind plate 1. Plate 1 comprises a plurality of plate segments 101 (101a-101d), separated by gaps 103; likewise, plate 2 comprises a plurality of plate segments 102 (102a-102d), separated by gaps 104. Also shown is a plurality of subareas 99 of plate segments 101, and a plurality of subareas 100 of plate segments 102, each of these subareas being delineated by a dashed lines or a gap.

The structure of the present invention freely allows and even encourages registration alignment between segments of opposite polarity plates that is random in absolute alignment at any point, and further that can vary within a capacitor. In FIG. 46, plate segments 101a-d can be inexpensively manufactured with approximately uniform size, and likewise plate segments 102a-d can be inexpensively manufactured with an approximately uniform size that is slightly greater in the length L dimension. This size differential produces a progressively varying registration alignment between segments of opposite polarity plates, within each capacitor, as shown in FIG. 46. This can be seen as gaps 103 of plate 1 becoming progressively more misaligned with gaps 104 of plate 2, as they become farther from terminals 5 and 6.

FIG. 46 exaggerates the size differential for clarity; in reality, a very slight size differential can produce significant alignment variation within a single capacitor. For example, a mere 0.05% size differential would produce a progressive alignment variation that would amount to 50% of a segment length at the end of the 1000 segments rolled up within a single capacitor. For reasons discussed below, an alignment variation that reaches 50% maximum misalignment is all that is required within each capacitor for optimum achievement of low Q for the internal self resonance. Consequently, a mere 0.05% size differential would be sufficient (any greater size differential could also produce advantageous low Q results). Such a small segment size differential as 0.05% could be inexpensively manufactured for the structure of the present invention. For example, a single inexpensive rotating drum, periodically interrupting the film metallization to create the gaps dividing the plate segments, could be employed for making both segment sizes, thereby saving even further on tooling costs; simply adjusting the film tension and/or speed could change the drum's slippage against the film by a 0.05% differential, thereby creating a 0.05% differential in segment size along the length L dimension.

This example also illustrates why prior art structural formats such as the third and sixth have the disadvantage of being so expensive to manufacture. These prior art structural formats require fixed absolute registration alignment between segments of opposite polarity plates, and require that this fixed alignment does not change substantially throughout the body of a wound capacitor roll. Even if all manufacturing processes were controlled within 0.05%, these prior art structural formats could literally wind up with a 50% misalignment error at the end of a 1000 segment roll capacitor, which would be intolerable for their teachings (a 50% misalignment would convert Bailey's structure into Horstmann's, and vice versa). Many types of manufacturing processes would have to be tightly controlled, because they affect segment size and alignment, especially for the film dielectric substrate used by the majority of roll capacitors: film tension, winding speed, room temperature, film stretchability (including precise film thickness and chemical composition), etc.

The present invention freely tolerates and encourages registration misalignment, and variation in misalignment, which is easy and inexpensive to achieve. The present invention then utilizes this varying misalignment to advantage, as follows.

J. Varying Mutually Facing Area of Subarea Pairs

FIG. 46 shows that, within a single capacitor, the gaps 103 can sometimes be aligned in registration on top of gaps 104, and are sometimes misaligned, and are misaligned by varying amounts.

Now, a basic capacitor is formed by two conductive surface areas in close proximity. It requires two conductive surface areas to constitute a capacitance. When either of the two conductive areas are interrupted by a gap, we may consider that a capacitance has been defined, for the mutually common facing subarea of both conductive areas whose borders are gaps interrupting either surface area. Thus, in FIG. 46, subareas 99 of plate 1 and subareas 100 of plate 2 are defined wherever a gap 103 or a gap 104 exists, interrupting either of the two conducting surface areas it takes to define a capacitance. FIG. 46 shows displacement current, represented as arrows 98, moving from each subarea 99 of plate 1 to its corresponding facing subarea 100 of plate 2.

The subareas 99 vary significantly in size (as do the corresponding subareas 100), much more so than the differential in size between segments on the two plates. This significant size variation among subareas 99 (and 100) is due to registration misalignment and variation in registration alignment. Even a slight misalignment produces a large size variation among subareas 99,100. For example, a 5% misalignment would produce some subareas 99 having 5% the area of a full segment, and other subareas 99 having 95% the area of a full segment, thereby producing some subareas 99 having 19 times greater area than other subareas 99. Thus, some subarea pairs 99,100 would have 19 times greater capacitance than other subarea pairs 99,100. Likewise, a 10% misalignment would produce some subarea pairs having 9 times greater capacitance than other subarea pairs 99, 100.

It can be appreciated that registration misalignment, and variation in this misalignment, is a powerful method for varying the capacitance of subarea pairs 99, 100. It is much more powerful than the more direct method of merely varying plate segment size; if plate segments were kept in perfect registration alignment between opposite polarity plates, as the third and sixth structural formats require, then a variation factor of 19 times greater capacitance could only be achieved by varying plate segment sizes by a factor of 19.

Indeed, the structure of the present invention can achieve a wide range of capacitance variation for subarea pairs without varying segment size within one plate at all, by instead simply varying registration alignment. If registration alignment can be varied merely through the range from perfect alignment to 25% misalignment, then a wide range of capacitance variation can be achieved for subarea pairs, ranging from 0% to 25% and also 75% to 100% of the capacitance of a full size plate segment pair. If registration alignment can be varied through the range from perfect alignment to 50% misalignment, then the full range of capacitance variation can be achieved for subarea pairs, ranging from 0% to 100% of the capacitance of a full size plate segment pair. This is the greatest variation possible within a single capacitor as a whole; any further variation would simply be repetitious.

As noted above, this range, varying from perfect alignment to 50% misalignment, can be achieved in a 1000 segment capacitor if the constant segment size on one plate is made merely 0.05% larger along length dimension L than the constant segment size on the opposite polarity plate. A larger size differential would simply produce repetitious results for a 1000 segment capacitor.

A small size differential can produce a smooth variation in the progressive misalignment, and thus a smooth variation in the size of subarea pairs 99,100, and therefore a smooth variation in the range of capacitances from various subarea pairs 99,100, and therefore in turn a smooth as well as wide spread of self resonant frequencies, thereby achieving the desideratum of very low Q for the capacitor's internal self resonance.

The capacitance of subarea pairs 99,100 can vary from that of a full size segment 101 as a maximum, to virtually zero as a minimum. The capacitance of any subarea pair 99,100 is proportional to its mutually facing area, i.e. to its size along the length L dimension. Thus, various subarea pairs 99,100 are the structural elements that form the varying capacitances of capacitors 105 in the conceptual schematic of FIG. 45.

All of the displacement current follows nearly ideal paths 13 through each subarea pair 99,100, thus furnishing a very low and nearly constant self inductance for all inductances 106 in FIG. 45. The inductance does increase slightly for the narrower subarea pairs 99,100, due to narrower conductor width, but only in proportion to the logarithm of the subarea size along the length L dimension. Thus, for practical purposes, we may say that the inductances 106 are all nearly the same value. Thus, the resonant frequencies of the subarea pairs 99,100 vary effectively as the capacitance varies for these subarea pairs. This nearly constant inductance for all displacement current paths also eliminates the time dispersion problem faced by conventional prior art roll capacitors, with their wide range of inductances.

As FIG. 45 shows, all 2000 series circuits 105,106 are connected in a parallel array, to constitute the capacitor as a whole. Because there are about 2000 circuits in parallel, not just 1000 plate segments, the self inductance of the array can be seen to be reduced still further, by a factor of nearly 2 compared to the situation described under discussion of the twelfth problem above.

The self resonant frequencies of the various series circuits 105,106 can vary progressively and smoothly over a very wide range, and therefore the self resonance of the whole array, of the capacitor as a whole, can be smoothly distributed over a very wide range of frequencies, starting at the self resonant frequency of one full size segment and extending upward indefinitely in frequency. Indeed, the self resonance of this array that is the whole capacitor can be so smoothly and widely distributed that the structure of the present invention can be said to have virtually eliminated self resonance as a problem in capacitors.

K. Seventh Structural Format: Protection Function Capacitors

The seventh structural format specifies higher resistance, fuselike current limiting connections to each plate segment (e.g. Hamabe, Gizolme, Sterner). FIG. 47 shows an example of this structural format, in plan view. FIG. 47 shows plate 1, which has been divided into a plurality of segments 107. The key feature characterizing this structural format is that the electrical connection from each segment 107 to end spray 3 is made via a higher resistance conductive path that has less current capability than segment 107 itself. Therefore, this electrical connection will melt or evaporate like a fuse in the event of catastrophic current overload to a particular segment, thereby cutting off current to that segment, and restricting damage to the capacitor as a whole, which could take the form of explosion and fire were it not for the disconnection by the fuse. Essentially, this structural format builds a fuse into each segment 107. In FIG. 47 the form of this fuse is shown as holes 108 in the metallization of each segment 107, thereby leaving narrow, current restrictive paths 112 between holes 108 as the only electrical connection from each segment 107 to end spray 3. Alternative forms of fuse include cracks or a ditch in the thickness of the metallization.

The sole object of this seventh structural format is to afford some protection in the event of catastrophic failure from current overload (local or global) of the capacitor, by containing damage as locally as possible, and thereby avoiding explosion or fire for the whole capacitor. The structure and method has utility only in the event and for the occasion of catastrophic failure. It has no utility on a continuous basis, for the ordinary operation of the capacitor as a capacitor. The seventh structural format may be said to provide some control of current in the event of catastrophic failure, but it does not provide any control of current or electrical change on a continuous basis, during ordinary operation when no catastrophic events are occurring.

In contrast, the present invention offers a structure and method that has utility on a continuous basis, improving the ordinary operation of a capacitor as a capacitor per se. The present invention does provide continuous control of current and other electrical changes, directing and constraining these changes so as to provide superior electrical performance from a capacitor, in modes of operation not limited to a catastrophic failure mode.

The seventh structural format is actually disadvantageous for the ordinary functioning of the capacitor. The higher resistance presented by the fusing connection increases the equivalent series resistance through the capacitor. Low equivalent series resistance (ESR) is widely regarded as an important electrical measure of capacitor merit, which is desirable for most capacitor applications. In contrast, the structure of the present invention advantageously offers low equivalent series resistance, by not having any high resistance fusing connections. Clearly the structure of the present invention is distinct from the seventh structural format taught by prior art.

Hamabe alludes to a different segmented plate structure, one without high resistance fusing connections (his FIG. 1b). This structure is shown in FIG. 48, which shows plate 1 in plan view. A plurality of plate segments 110, separated by gaps 111, do not have any interruptions such as holes 108 in FIG. 47 to create high resistance fusing connections. But Hamabe specifically teaches against this structure, saying "This structure of simply splitting the metallized film electrode into a plurality of segments has, however, a number of unsolved problems in the aspects of the reliability in its protection function and of the loss in material in its manufacturing process." Since the protection function is the only utility that Hamabe (and the art in general) have taught for a true, insular segmented plate structure, Hamabe's teaching against this FIG. 48 structure for the protection function is tantamount to totally dismissing this structure as having no utility whatsoever.

The structure taught by the present invention is distinct even from the structure that Hamabe dismisses and teaches against, as shown in FIG. 48. The structure of the present invention includes deliberate misalignment of plate segments between opposite polarity plates, and deliberate variation of this misalignment, to secure a utility and performance advantage over other segmented plate structures, such as FIG. 48. The present invention teaches structural means by which this deliberate misalignment and variation in misalignment can be achieved for best advantage. Likewise, the method and use taught by the present invention includes this misalignment and variation in misalignment, in contrast to the uses and methods taught by prior art.

The seventh structural format can still serve its intended protection function if the segments of one plate are accidentally misaligned with respect to the segments of the opposite polarity plate. But there is not any teaching that such misalignment can be advantageous, or can be deliberately introduced and then varied by specific structures or methods. In contrast, the present invention does incorporate all these teachings.

Furthermore, the FIG. 48 structure is limited to a very short plate segment length along the plate's length L dimension. Indeed, in the FIG. 48 structure the shorter the plate segment length the better, for the fusing protection function that is the only use taught by prior art for this structure. In contrast, the structure of the present invention is not thus limited as to plate segment length being very short. Indeed, the present invention teaches a structure in which the plate segment length is deliberately made significantly longer than in the FIG. 48 structure, so as to provide better electrical performance from a capacitor in ordinary operation, absent catastrophic failure.

L. Plate Segment Length and Separation Gap

The other major reason Hamabe cites for teaching against the FIG. 48 structure is "the loss in material in its manufacturing process." This reason demonstrates further structural differences distinguishing the structure of the present invention, both from the seventh structural format of FIG. 47 and also from the FIG. 48 structure. The seventh structural format and the FIG. 48 structure may both be termed protection function structures. These protection function structures have two structural features that are in contrast to the structure of the present invention.

First, the protection function structures require that the separation between plate segments, at gaps 109 and 111, be relatively large. This separation must be sufficient so that the effects of catastrophic failure on any one segment do not spread or arc over to any adjacent segment, taking into account the spreading power of locally explosive heat, instantaneous high current, and high voltage differential. In contrast, the structure of the present invention freely allows almost arbitrarily small separation between plate segments, with very narrow gaps. The structure of the present invention is not intended to address catastrophic failure events, but instead is intended to provide advantageous utility during ordinary capacitor operation. Thus, adjacent plate segments of the same polarity plate can be expected to have the same voltage and current at the same time, with no substantial differentials. Therefore the gaps separating plate segments can be very narrow, as narrow as can most economically be manufactured.

The structure of the present invention is further distinct because it allows the gaps to be made with crude edges. In contrast, the protection function structures require more precisely straight edges for gaps, in order to discourage arc-over when there are high voltage and current differentials between adjacent segments of the same polarity plate during an event of catastrophic failure. This structural distinction also gives the present invention a further utility and advantage in being less expensive to manufacture.

Second, the protection function structures require that each and every segment be small in length (along the length L dimension). This is particularly true for the FIG. 48 structure, which lacks the high resistance fusing connection. Indeed, the shorter the plate segment length in these protection function structures, the better they can perform their sole function of fusing protection in the event of catastrophic failure. If the protection function is to work at all, the total amount of current flow during catastrophic failure must be limited, and the total amount of plate vaporization must also be limited. This prevents uncontrolled current avalanching from one destroyed segment to other nearby segments. This also limits the total heat and pressure generated within the capacitor, so that global fire and explosion does not occur. The only way to limit total current, when there is a catastrophic failure in one plate segment, is to limit the conductive area through which catastrophic current can flow. Therefore, the area of each segment must be limited to a small size. Since each plate segment must traverse almost the full width of the plate across the width W dimension (to make a volumetrically efficient capacitor), it is the length L dimension of each plate segment that must be kept short in order to keep the area of each plate segment small.

This segment area limitation, hence segment length limitation, is especially restrictive for the FIG. 48 structure, where there is no high resistance fusing connection to limit current. But this limitation also applies to the seventh structural format (FIG. 47), as follows. The total of narrow current paths 112 in FIG. 47 that feed a given segment 107 must in parallel pass only a limited amount of catastrophic current into the heart of the capacitor before they vaporize and break their fusing connection. Thus, if the plate segment length L dimension is made larger, then the current paths 112 must be made narrower and higher in resistance per unit length of plate segment. This would mean that any given area of plate would be fed through a higher series resistance, and this would disadvantageously raise the ESR of the capacitor as a whole. The ESR of the seventh structural format is already problematically high for many capacitor applications. If the plate segments of the seventh structural format are made longer in the length L dimension, then the capacitor's ESR becomes disadvantageously even higher, for a given level of catastrophic current limiting protection. If the seventh structural format is to secure acceptably low ESR and still bestow catastrophic current protection at a low enough limit to contain damage, then it must require that each and every segment be small in length (along the length L dimension). Likewise, if the FIG. 48 structure, lacking current limiting fusing connections, is to bestow catastrophic current protection at a low enough limit to contain damage, then it must require that each and every segment be small in length (along the length L dimension). Thus, the shorter the plate segment length in these protection function structures, the better they can perform their sole function of fusing protection in the event of catastrophic failure.

The practice by prior art has confirmed these requirements and limitations of the prior art structures. In practice, insular segmented plate structures have been made for only one use and function: a protection function in the event of catastrophic failure within a capacitor. Protection function structures, both with and without high resistance fusing connections, have in practice been made with a very short length L dimension for each plate segment, being typically about ⅓ inch. Furthermore, these protection function structures have in practice been made with plate segment proportions where the segment's length L dimension is much smaller than the segment's width W dimension, typically by a ratio of 1 to 3 (as shown for the plate segments 110 in FIG. 48). These proportions have been found necessary because the displacement current propagates substantially along the width W dimension, and the protection function requires prevention of catastrophic current flashover and damage propagating along the length L dimension, in which direction it would reach other plate segments and cause further damage.

In contrast, the structure, use, and method of the present invention is not limited to requiring that each and every segment be small in length (along the length L dimension), or be proportioned smaller along the length L dimension than along the width W dimension, for proper or optimal functioning as intended. The present invention has free choice of a virtually unlimited range of plate segment length and plate segment proportions to function as intended. The example used in the specification of the present invention has the length L dimension of a plate segment being 2 inches, and larger than the width W dimension, indeed 2 times larger, rather than being merely ⅓ as much. Thus, in this example, the structure of the present invention typically differs from prior art by a factor of 6 or more.

Two further structural distinctions have been discussed, contrasting the present invention with prior art's seventh structural format (FIG. 47) and also with the FIG. 48 structure that Hamabe teaches against plate segment length along the length L dimension, and gap separation between plate segments. These two structural distinctions demonstrate yet further advantage, use, and utility for the present invention, and yet further disadvantage for the FIG. 47 and FIG. 48 protection function structures. The short plate segments to which the protection function structures are limited mean that there must be a greater number of segments within a given capacitor than if the plate segments could be longer. A greater number of segments means a greater number of gaps to separate segments. Gaps are wasteful of material, and hence add needless expense to the manufacturing cost of a capacitor. This also makes the finished capacitor needlessly large volumetrically, and hence more expensive to employ in a product package. The more gaps there are, the worse the waste and the higher the expense. Furthermore, the wider the gap separations must be between segments, the worse the waste and the higher the expense.

In contrast, the structure of the present invention freely allows, indeed encourages, narrower gap separation, and also longer plate segment length, hence fewer segments, hence fewer gaps. Thus the structure of the present invention is less wasteful of material, is less expensive to manufacture, is volumetrically more efficient, and is less expensive to employ as a capacitor in a product package. It might be thought that this contrast is merely a matter of degree in dimensions; but in fact this contrast is decisive enough for Hamabe to have cited it ("the loss in material in its manufacturing process") as one of his two reasons for teaching against the FIG. 48 structure and justifying the patentable utility of his structural alternative. If this reason can distinguish and support Hamabe's utility over the FIG. 48 structure, then it should also distinguish and support the present invention's structure and utility over the FIG. 48 structure, since the present invention has less material waste due to gap area than the FIG. 48 structure, typically by a factor of 6 or better.

Furthermore, these two structural distinctions are mutually exclusive in being advantageous or disadvantageous for the distinct functions of the present invention vs. prior art. This makes the structure and method of the present invention even more distinct over prior art. As noted, the use and function of the present invention focuses on continuous control of electrical change within a capacitor, to secure improved electrical performance from the capacitor in ordinary operation. This is in contrast to the protection function for catastrophic events that is the sole use taught by prior art for the seventh structural format or the FIG. 48 structure.

For the protection function use, the shorter the plate segments are the better, yielding even better fusing action and isolation protection—until a point is reached where such a structure is dismissed and taught against because of "the loss in material in its manufacturing process." In developing the structure of the present invention, it has been experimentally determined that short plate segment lengths, if short enough in the length L dimension to be useful for the FIG. 48 structure and its protection function, in fact yield suboptimal electrical performance for a capacitor in ordinary operation (possibly due to electrostatic field loss, edge effect, and fringing occurring at the many gaps between the many short segments). Conversely, when plate segments were lengthened along the length L dimension, it was experimentally determined that the electrical performance of a capacitor in ordinary operation could be improved and even optimized, but these plate segments were then too long to be useful for the protection function structures.

Thus, these dimensional structural distinctions, contrasting the present invention's structure with the protection function structures, are mirrored and emphasized by mutually exclusive advantages and disadvantages for the distinct uses taught for these structures.

IV. Prior Art Methods and Uses

The new capacitor structure taught by the present invention yields a number of advantages not taught or realized by prior art. These advantages are new uses taught by the present invention, or new methods for achieving various kinds of advantages.

The new uses and methods taught by the present invention relate to the particular new segmented plate capacitor structure taught by the present invention, and they also relate more broadly to some other segmented plate structures that were taught by prior art, but which have never been employed for the new uses taught by the present invention.

A. Reducing Eddy Currents

One use, for the structure taught by the present invention, is ameliorating or solving the eleventh problem faced by conventional prior art capacitors, namely stray circulating eddy current loops, especially large loops. This use was described in conjunction with FIG. 15 and also FIG. 30. Morecroft has also addressed this problem of eddy currents in large continuous plate surface areas, and suggests a similar use for the structure he teaches. However, Morecroft's structure is markedly different from the structure taught by the present invention, lacking truly distinct, separate plate segments. Moreover, as discussed for FIG. 42, Morecroft's structure does not even achieve the use intended, a use that is achieved by the present invention's structure, since Morecroft's structure still allows many large stray circulating loops to range over his large, single, pockmarked plate surface.

Bailey also addresses the use of reducing eddy current losses in the structure he teaches. However, his structure is different in particular from the structure taught by the present invention. Bailey's structure is limited to requiring that the plate segments of opposite polarity plates remain in substantially fixed registration alignment that is alternately disposed. In contrast, the structure of the present invention is not so limited, and further includes a structural mechanism by which the registration alignment is varied substantially within a capacitor. Moreover, Bailey's teaching of the use and function of his structure depends on his spaces 7 and 8 separating electrostatic field areas 9 in his FIG. 3, which is the reason why Bailey has limited his structure to constant alternate disposition of the registration alignment. In contrast, the present invention's teaching of its use and function does not so depend, and this is the reason why the present invention's structure can freely allow random registration alignment and substantial variation of that alignment.

Thus, while the end benefit of reducing eddy currents might be similar between Bailey and the present invention, the structures are distinct and the means for achieving the end benefit are distinct. In particular, the specification of the present invention teaches that segment size alone reduces eddy current losses, as explained for FIG. 30, and further that the virtually ideal paths 57 taken by all displacement current discourage circulating eddy current loops, as explained for FIGS. 31 and 26. These mechanisms achieve the end benefit of reducing eddy current losses without relying on any particular or fixed registration alignment between plate segments of opposite polarity plates. Therefore it is submitted that the present invention does teach a new use over Bailey. The present invention may be said to teach a method of reducing eddy current losses, using distinct plate segments, without requiring a given absolute registration alignment, and without requiring a substantially unchanging registration alignment.

B. Reducing Coil Loop Multiplying Effect

Another use, for the structure taught by the present invention, is ameliorating or solving the fourth problem faced by conventional prior art capacitors, namely very high inductance for the longer displacement current paths due to the solenoid coil loop multiplying effect, which multiplies the inductance by the square of the number of turns a given path follows around a roll capacitor, as shown in FIG. 20. Kanai addresses the use of eliminating circumferential loop turns and thereby reducing inductance in the structure he teaches. However, Kanai's structure is markedly different from the structure taught by the present invention. As discussed above, Kanai's structure is actually a stacked capacitor, with pairs of separate plates atop one another constituting multiple capacitors. It does not qualify as a true segmented plate capacitor in its finished roll form, since it fails to meet the topological test that two adjacent plate segments of the same polarity can be coplanar, or substantially coradial from a capacitor axis. It might appear to have a segmented single plate in its unfinished form, when viewed only as a parent sheet; but in this form it cannot function as a capacitor, and lacks any utility. Also, as a parent sheet all its plates of opposite polarity are coplanar, which is structurally distinct from the present invention. Kanai's structure is also different from the present invention because it requires precise and fixed registration alignment between opposite polarity plates, with the edges of these plates being registered with one another on either side of gap 86 as shown in FIG. 39.

Moreover, the fact that each of Kanai's plates does not complete a circumferential loop turn of the capacitor is a trivial consequence of the existence of gap 86 and the structure's requirement that all plate edges end together on either side of this gap. Kanai's finished capacitor structure is topologically equivalent to the common stacked plate capacitor of prior art, except that the plates stacked atop one another are curved instead of flat. Thus, the utility of not completing any circumferential coil loops follows as trivially for Kanai's structure as it does for any common flat plate stacked capacitor.

In contrast, the present invention teaches a structure that freely allows random registration alignment among plate segments of a roll capacitor spiral. Thus, there is no single gap, such as 86 in FIG. 39, where all plate segment edges terminate in registration. Therefore it is not similarly trivial or obvious that the present invention can have the utility of ameliorating or solving the problem of high inductance caused by circumferential coil loop turns in a roll capacitor. If this had been obvious to someone skilled in the art, then a true segmented plate structure such as shown in FIG. 48 would have already been used and taught as a method for reducing inductance due to coil loop turns, especially because such a structure is much less expensive to manufacture than Kanai's structure. But no such use or method has been taught by prior art for such a structure.

Moreover, the present invention teaches further that the use and method of eliminating coil loop turns can be obtained, by the present invention's structure, even for those plate segments that do complete several circumferential coil loop turns within the finished capacitor, for example plate segment 63 in FIG. 28. The present invention teaches that the entire plate edge 11 of such a segment 63 is fed virtually simultaneously, and therefore all the displacement current through such a segment follows nearly ideal parallel paths 56, as shown in FIG. 26. Thus, virtually no displacement current in a plate segment follows longer diagonal paths such as path 48 in FIG. 19. Therefore, virtually no displacement current paths complete any coil loop turns, even if some plate segments do, and there is no squared multiplying effect upon inductance. This use and method of reducing inductance relies on the achievement of nearly ideal, parallel short paths for all displacement current.

Kanai does not teach that his structure achieves these nearly ideal, parallel short paths, and does not teach that this achievement is possible even if plate segments do complete more than one coil loop turn within a roll capacitor.

Thus, it is submitted that the use and method taught by the present invention is distinct over Kanai, and represents an advance in understanding, and also represents an advance in utility, especially since the structure of the present invention is much less expensive to manufacture than Kanai's structure. The present invention may be said to teach a method of reducing the squared inductance multiplying effect of coil loop turns: 1) using plate segments that can be coplanar or substantially coradial from a capacitor axis, or 2) without requiring a given absolute registration alignment or a substantially unchanging registration alignment, or 3) even in the case where a plate segment executes several coil loop turns within a roll capacitor, or 4) where the method relies on directing and constraining all the displacement current to follow substantially parallel paths within each plate segment.

OBJECTS AND ADVANTAGES

Accordingly, it is an object of the present invention to provide a capacitor structure that can achieve superior electrical performance.

A further object of the present invention is to provide a capacitor structure that can achieve superior electrical performance in ordinary operation, not just in a catastrophic failure mode of operation.

A further object of the present invention is to provide a capacitor structure that provides continuous control of electrical change within the capacitor, directing and constraining this electrical change, so as to provide superior electrical performance.

A further object of the present invention is to provide a capacitor structure where the superior electrical performance comprises one or more of the following group: lower series self inductance, lower self inductance arising from coil loop circumferential turns within a roll capacitor, lower dissipation factor, higher quality factor, lower losses, lower series impedance at high frequencies, lower equivalent series resistance, lower heat generation, higher current capability, higher power capability, higher voltage capability for a given capacitance at a given frequency, a capability to process higher frequencies, better electrical performance at higher frequencies, higher ambient temperature capability, more nearly ideal phase angle, lower loss angle, lower loss tangent, higher frequency of internal self resonance, lower Q of internal self resonance, less transient ringing from internal self resonance, less density of stray circulating eddy currents, less circulating loop current having long periodicity, less circulating loop current having a long decay time, less electrical interference in the plates, less electrical turbulence in the plates, lower noise, lower distortion, less time differential among various displacement current paths through a capacitor, less inductance differential among various displacement current paths through a capacitor, improved simultaneity among all displacement current paths through a capacitor, less time dispersion of a signal by a capacitor, and less corruption of a signal by a capacitor.

A further object of the present invention is to provide a capacitor structure that can achieve superior electrical performance at lower expense of manufacturing and/or at lower expense of employment in relevant applications.

A further object of the present invention is to provide a new method for obtaining improved electrical performance from a capacitor.

A further object of the present invention is to provide a new use for a segmented plate capacitor structure.

SUMMARY OF THE INVENTION

In brief, the present invention provides a capacitor structure comprising:

a first plate comprising a plurality of segments, where some segments can be mutually coplanar, or substantially coradial from a capacitor axis, and where some segments have an insular or peninsular topology, and a second plate that is not coplanar with the first plate in its entirety, where the second plate may optionally also comprise a plurality of segments, and a structural means for varying the size of a mutually facing area shared by a segment of the first plate with a segment on the second plate, whereby the size of the mutually facing area varies among the plurality of segments of the first plate.

The present invention also provides an optional terminal structure for this capacitor, where the terminal contacts a face of the capacitor but does not contact the point that is located at the center of this face.

The present invention also encompasses the above structure formed into any three dimensional shape, and/or executed in plurality.

The present invention also teaches a method for obtaining superior electrical performance from a capacitor in ordinary operation, not just in a catastrophic failure mode of operation, the method being the steps of making a capacitor structure comprising:

a first plate comprising a plurality of segments, where some segments can be mutually coplanar, or substantially coradial from a capacitor axis, and where some segments have an insular or peninsular topology, and a second plate that is not coplanar with the first plate in its entirety, where the second plate may optionally also comprise a plurality of segments, where the size of a mutually facing area, shared by a segment of the first plate with a segment on the second plate.

The present invention also teaches a new use for a capacitor structure comprising:

a first plate comprising a plurality of segments, where some segments can be mutually coplanar, or substantially coradial from a capacitor axis, and where some segments have an insular or peninsular topology, and a second plate that is not coplanar with the first plate in its entirety, where the second plate may optionally also comprise a plurality of segments, where the size of a mutually facing area, shared by a segment of the first plate with a segment on the second plate, is allowed to vary, the new use being the continuous control of electrical change within the capacitor, directing and constraining this electrical change, so as to provide superior electrical performance.

BRIEF DESCRIPTION OF THE DRAWINGS

FIG. 49 is a perspective view of a basic capacitor structure.

FIG. 50 is an elevation cross sectional view of a basic capacitor structure.

FIG. 51 is an offset plan view of a basic capacitor, showing proportions appropriate for making a roll capacitor.

FIG. 52 is a perspective view of a roll capacitor, not yet fully rolled, showing how dimensions of plate in plan view relate to finished roll capacitor.

FIG. 59b is an elevation side view of the same structure shown in FIG. 59a.

DESCRIPTION OF PREFERRED EMBODIMENTS

I. Basic Structure

Figure 1:
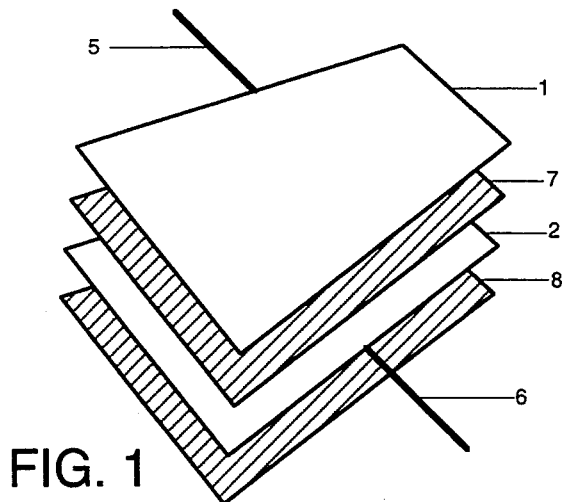
FIG. 1 is a perspective view of a basic capacitor structure.
Figure 2:
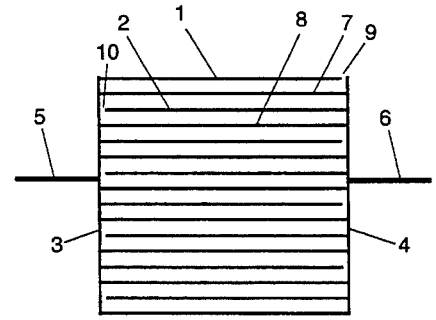
FIG. 2 is an elevation cross sectional view of a stacked capacitor structure.
Figure 3:
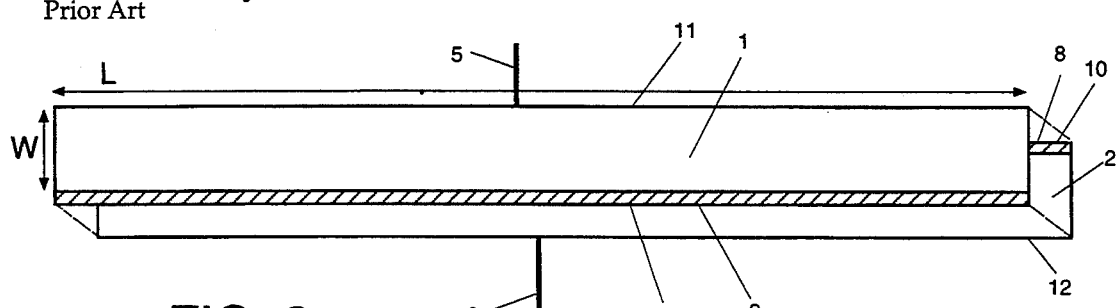
FIG. 3 is an offset plan view of a basic capacitor planar structure intended for a roll capacitor.
Figure 4:
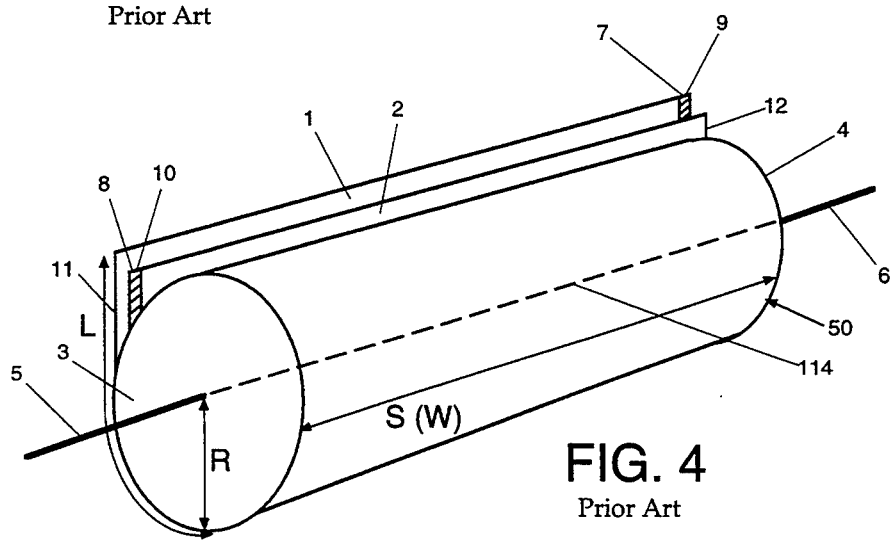
FIG. 4 is a perspective view of a basic roll capacitor.
Figure 5:
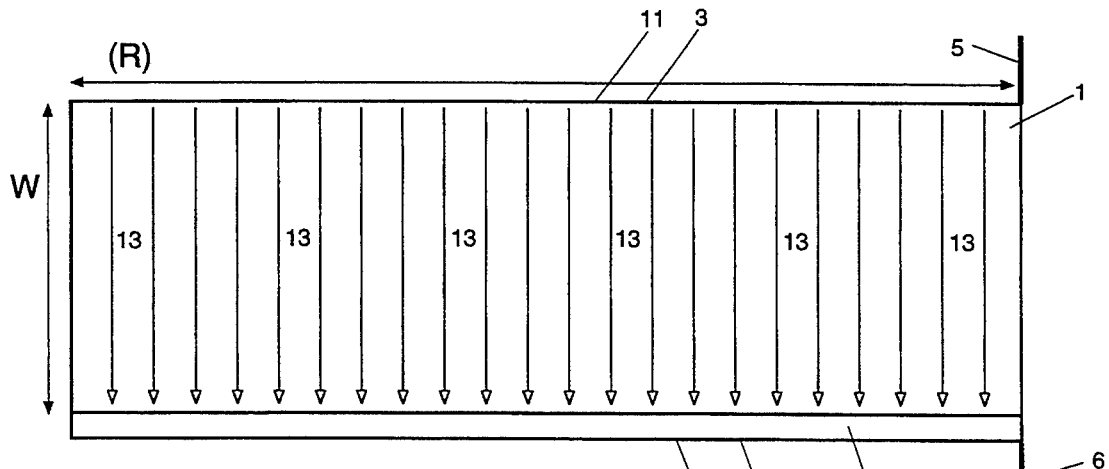
FIG. 5 is a plan view of the contiguous plates of a conventional prior art roll capacitor, as unrolled to be flat, showing ideal displacement current paths.
Figure 6:
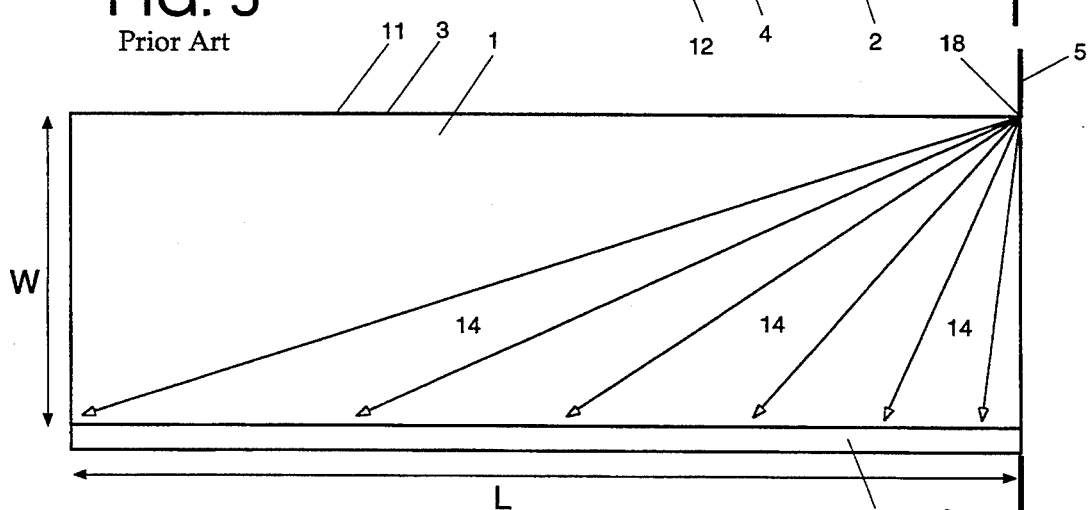
FIG. 6 is a plan view of the same plates as FIG. 5, showing possible current distribution paths.
Figure 7:
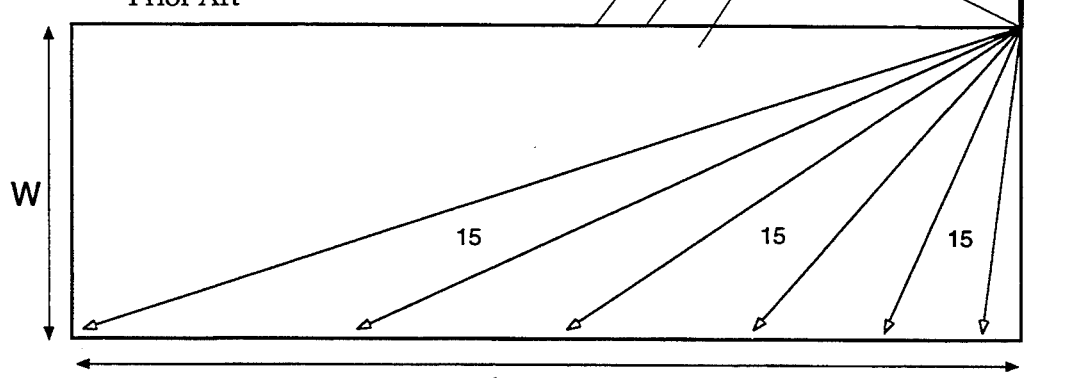
FIG. 7 is a plan view of the same plates as FIG. 5, showing the paths followed by the initial propagation of displacement current.
Figure 8:
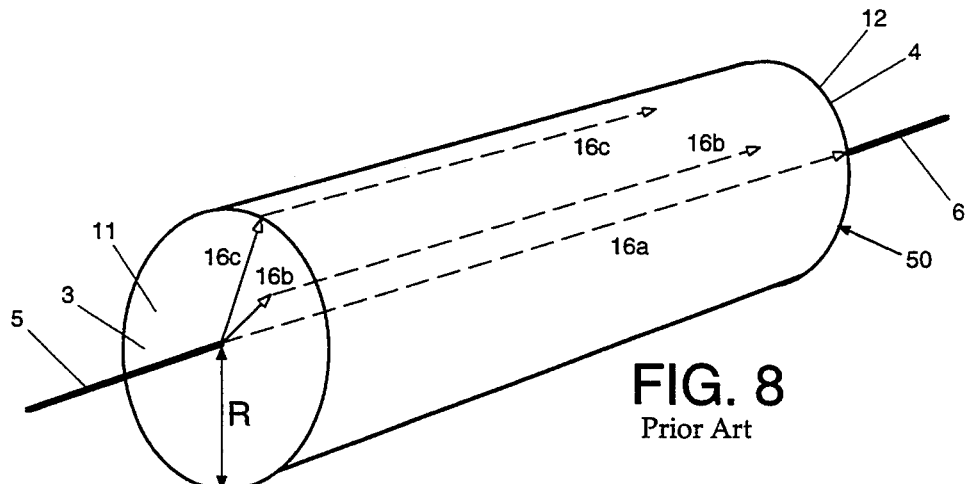
FIG. 8 is a perspective view of a roll capacitor, showing various length current paths due to end spray radius.
Figure 9:
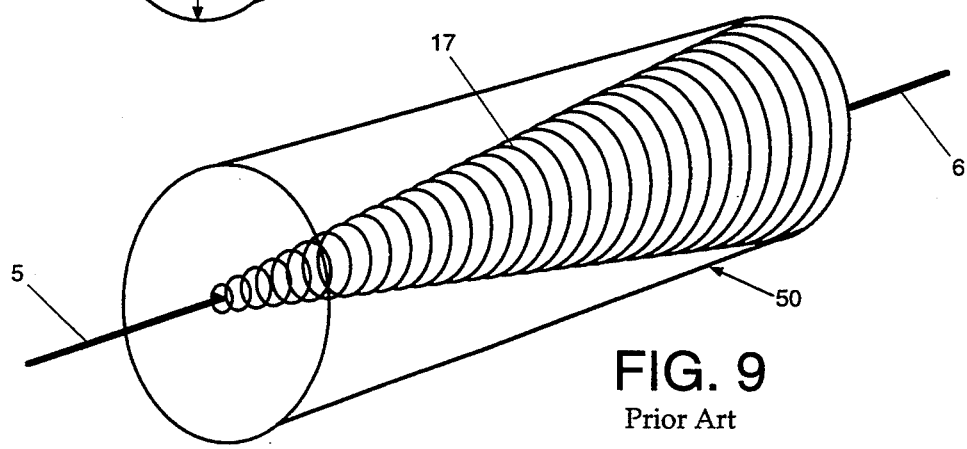
FIG. 9 is a perspective view of a conventional prior art roll capacitor, showing in three dimensional perspective the longest current path shown in FIGS. 6 and 7.
Figure 10:
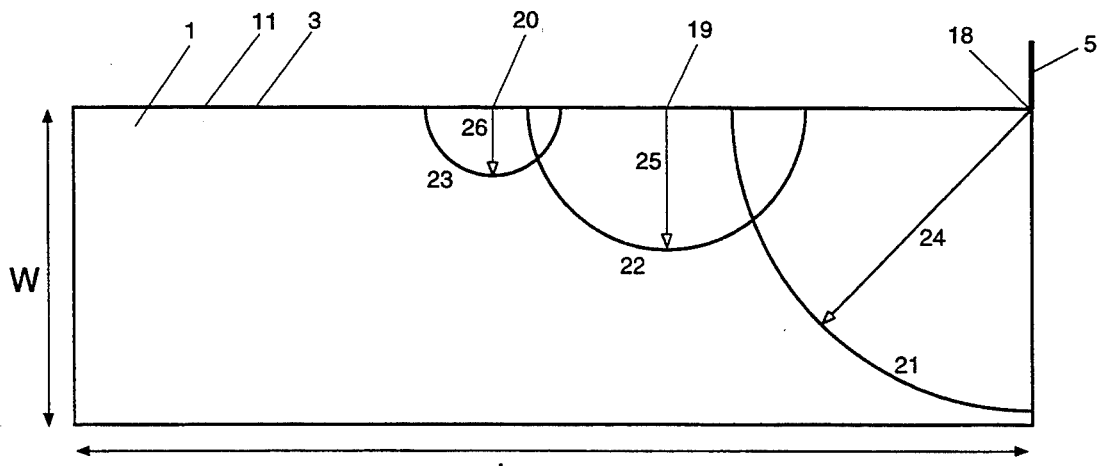
FIG. 10 is a plan view of a conventional prior art contiguous plate, showing propagation of one impulse.
Figure 11:
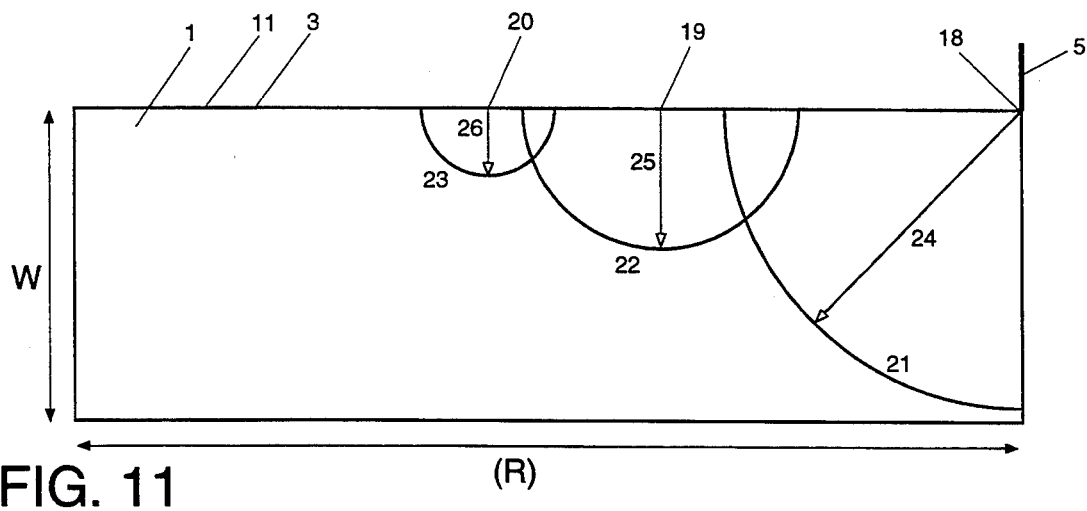
FIG. 11 is a plan view of a conventional prior art contiguous plate, showing interference for one impulse.
Figure 12:
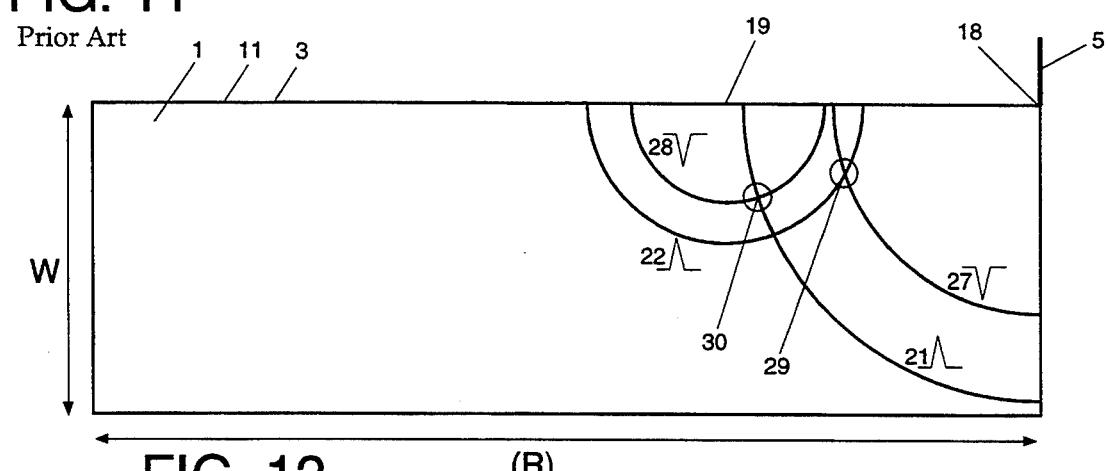
FIG. 12 is a plan view of a conventional prior art contiguous plate, showing interference among temporally successive impulses.
Figure 13:
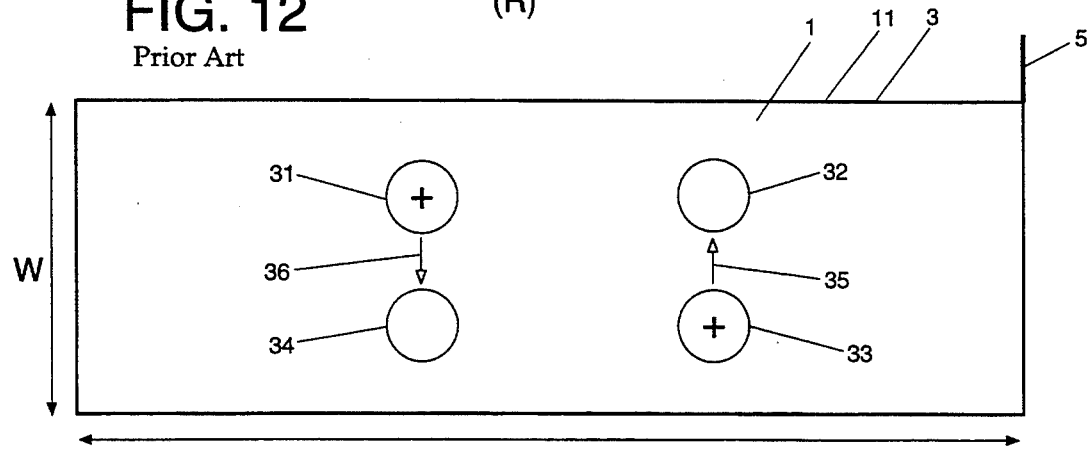
FIG. 13 is a plan view of a conventional prior art contiguous plate, showing local turbulence of charge movement.
Figure 14:
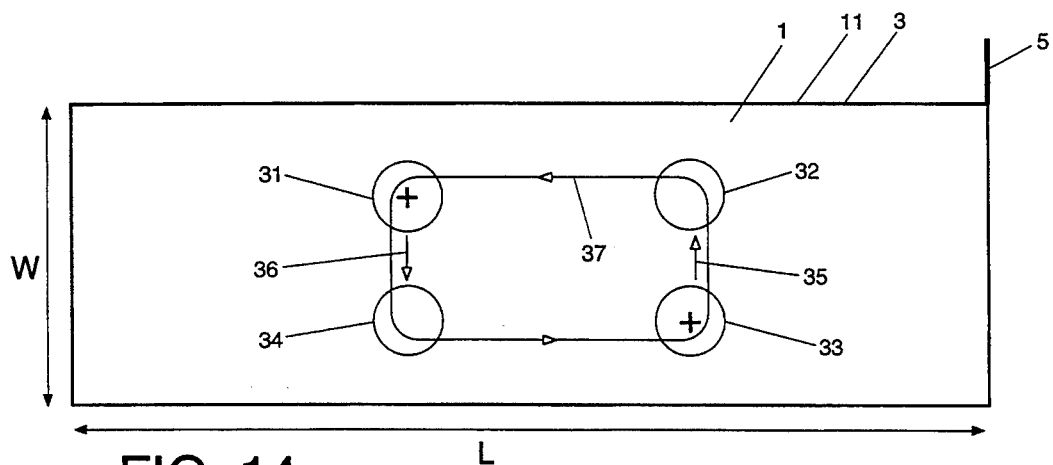
FIG. 14 is a plan view of a conventional prior art contiguous plate, showing the stimulation of stray circulating current loops.
Figure 15:
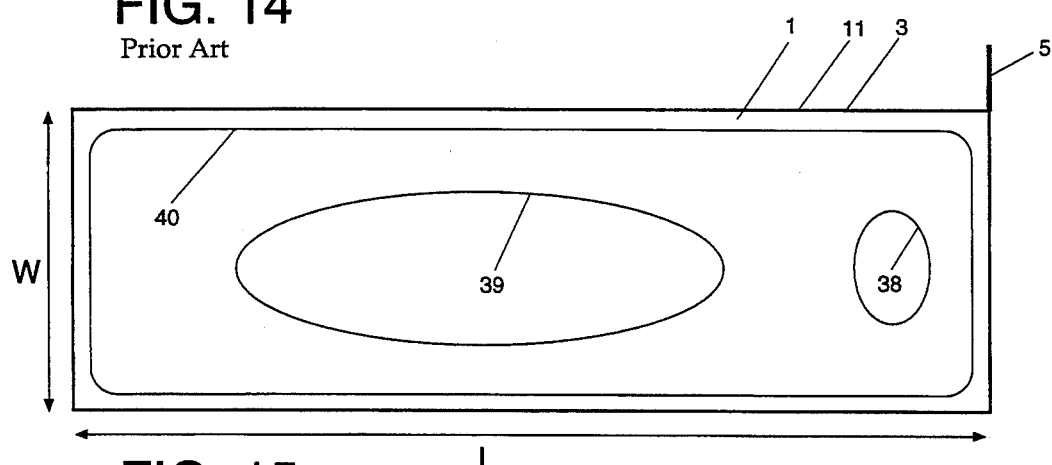
FIG. 15 is a plan view of a conventional prior art contiguous plate, showing various size stray current loops.
Figure 16:
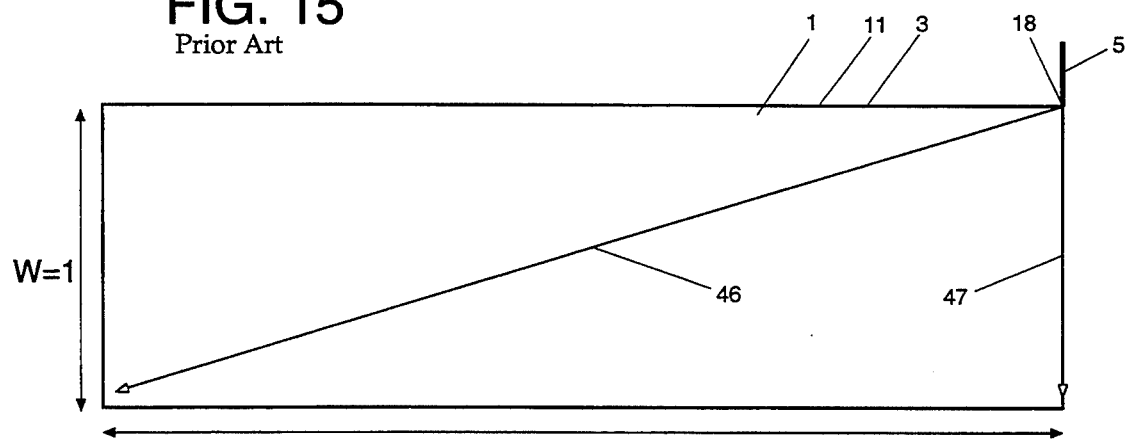
FIG. 16 is a plan view of a conventional prior art contiguous plate, showing relevance of path length differential to time differential.
Figure 17:
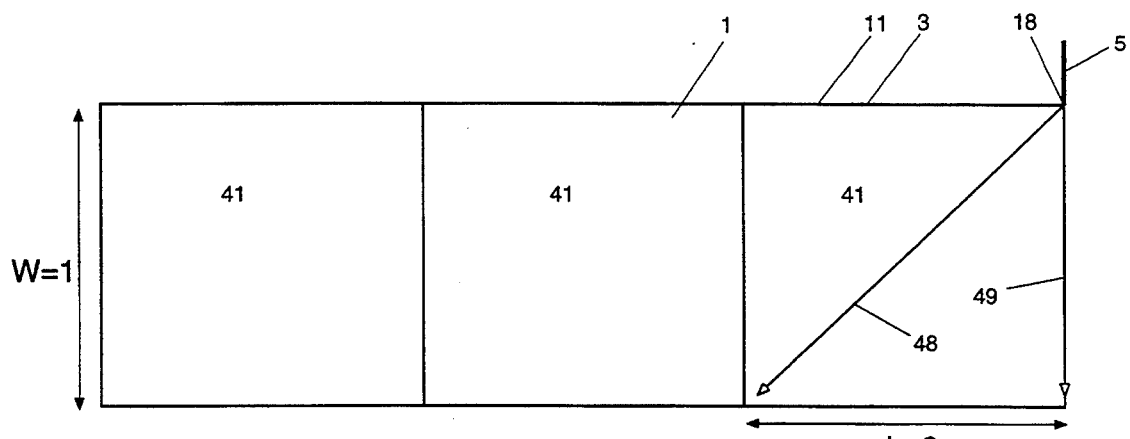
FIG. 17 is a plan view of a segmented plate, showing relevance of path length differential to time differential.
Figure 18:
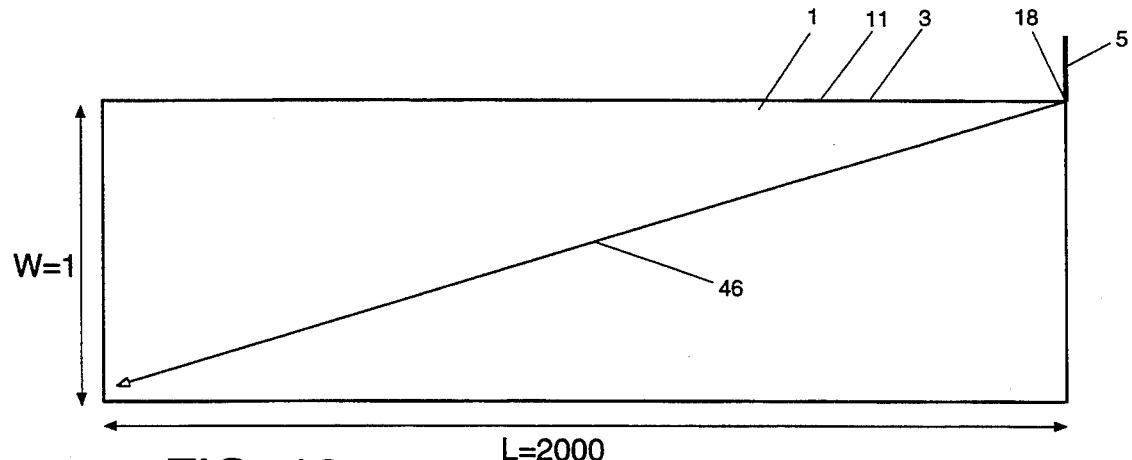
FIG. 18 is a plan view of a prior art contiguous plate, showing relevance of longest path to linear inductance.
Figure 19:
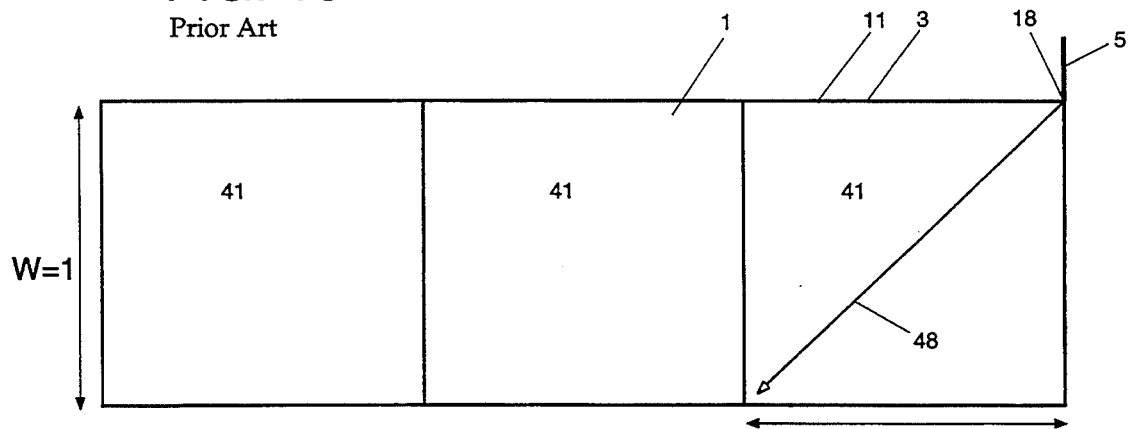
FIG. 19 is a plan view of a segmented plate, showing relevance of longest path to linear inductance.
Figure 20:
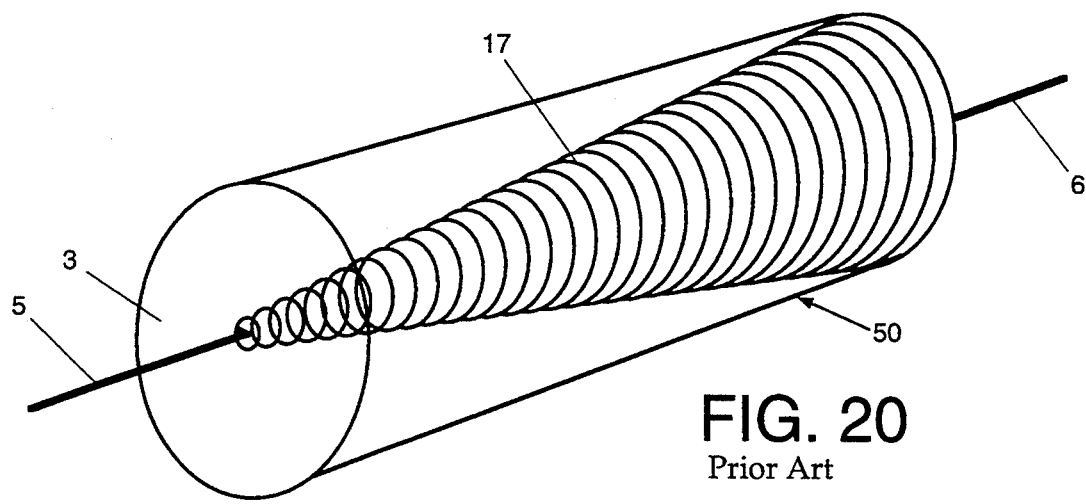
FIG. 20 is a perspective view of a conventional prior art roll capacitor, showing relevance of longest current path to coil loop inductance.
Figure 21A:
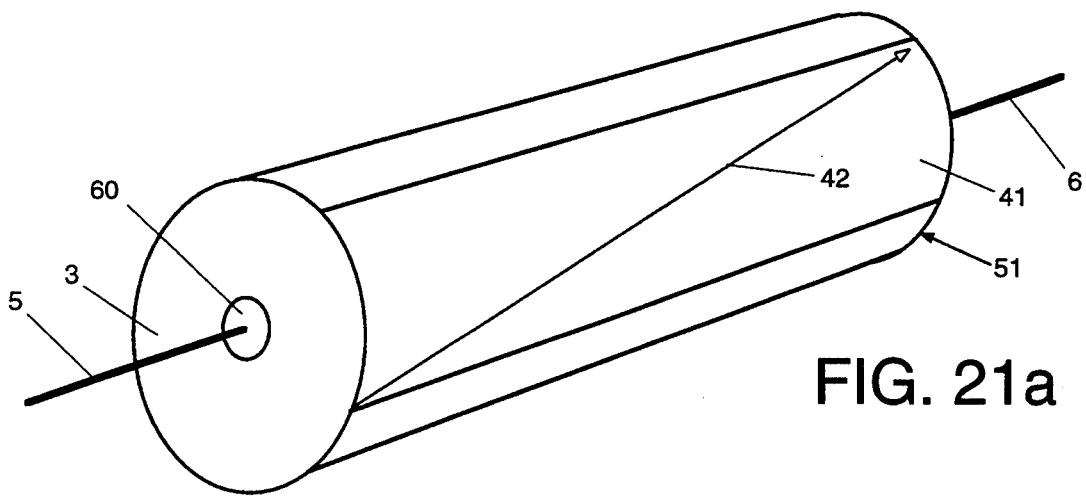
FIG. 21a is a perspective view of a segmented plate roll capacitor, showing relevance of longest current path near outside to coil loop inductance.
Figure 21B:
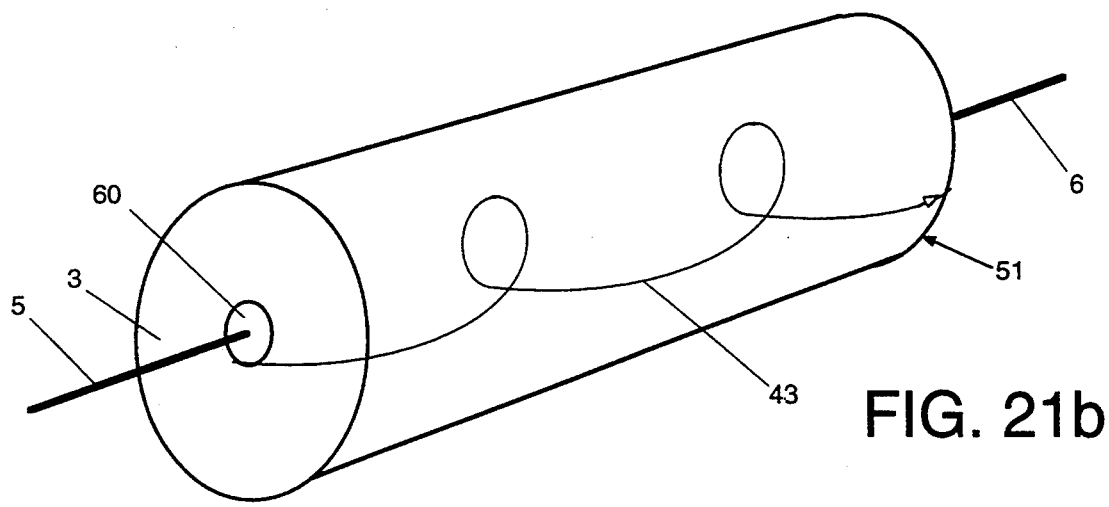
FIG. 21b is a perspective view of a segmented plate roll capacitor, showing relevance of longest current path near center to coil loop inductance.
Figure 22:
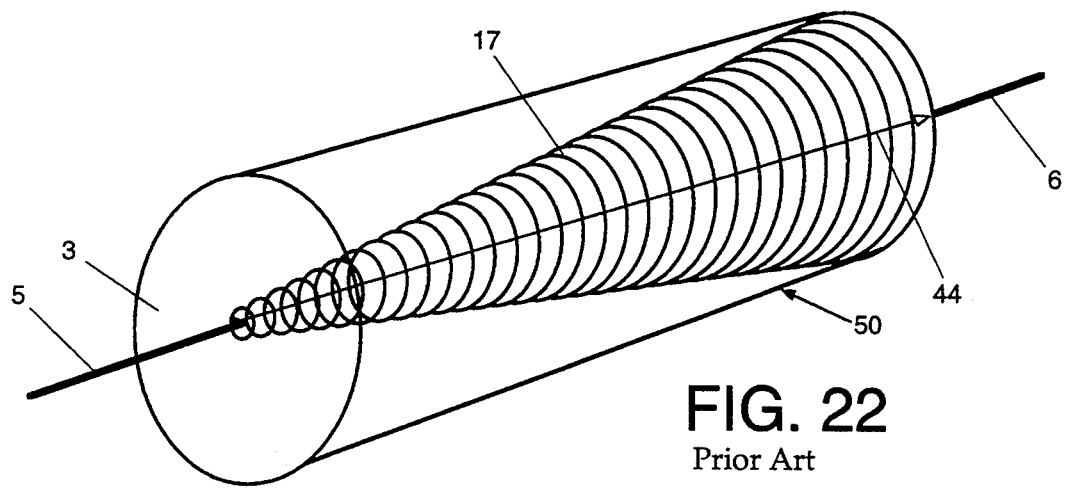
FIG. 22 is a perspective view of a conventional prior art roll capacitor, showing relevance of path differential to inductance differential.
Figure 23A:
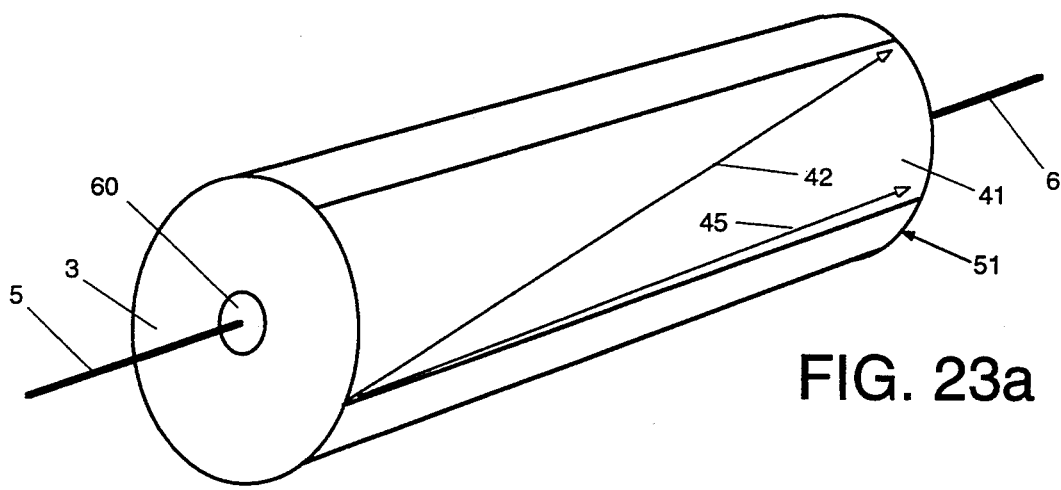
FIG. 23a is a perspective view of a segmented plate roll capacitor, showing relevance of path differential near outside to inductance differential.
Figure 23B:
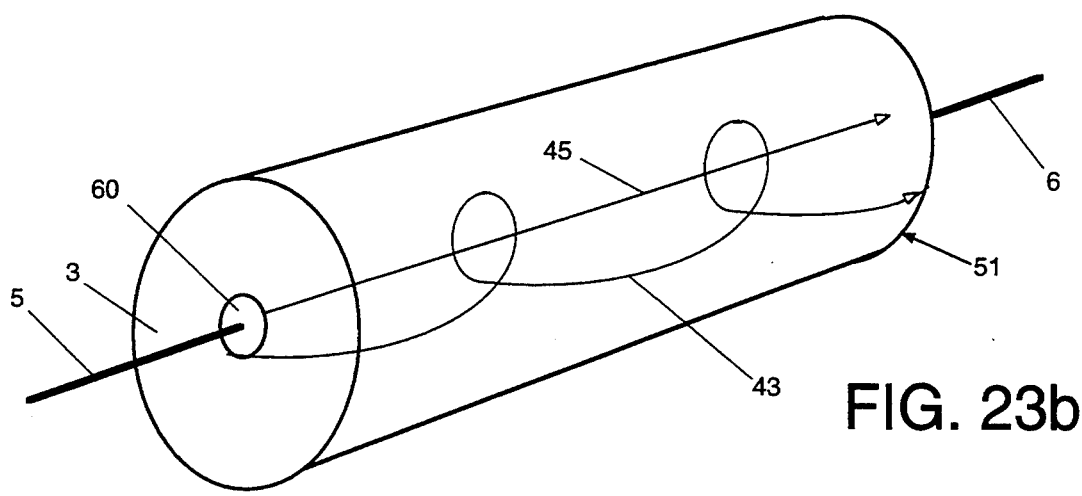
FIG. 23b is a perspective view of a segmented plate roll capacitor, showing relevance of path differential near center to inductance differential.
Figure 24:
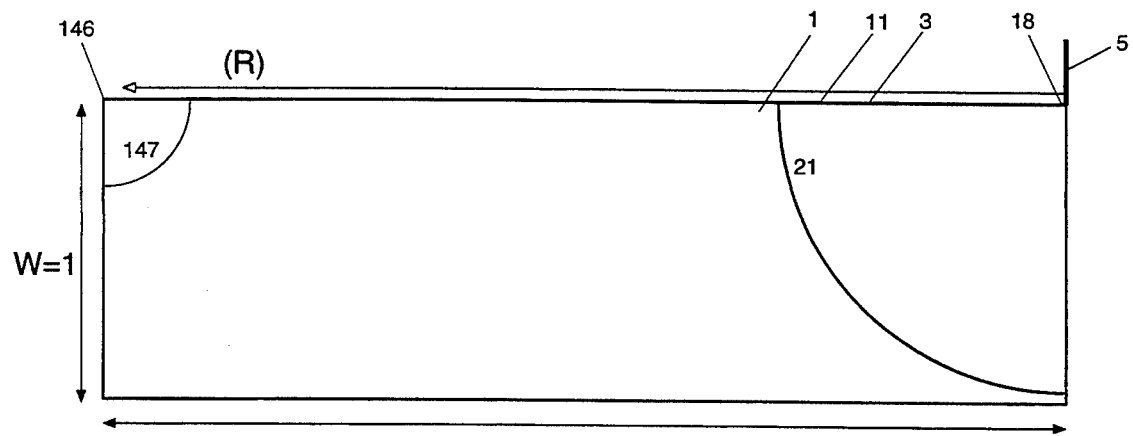
FIG. 24 is a plan view of a conventional prior art contiguous plate, showing wavefronts propagating from opposite ends of plate.
Figure 25:
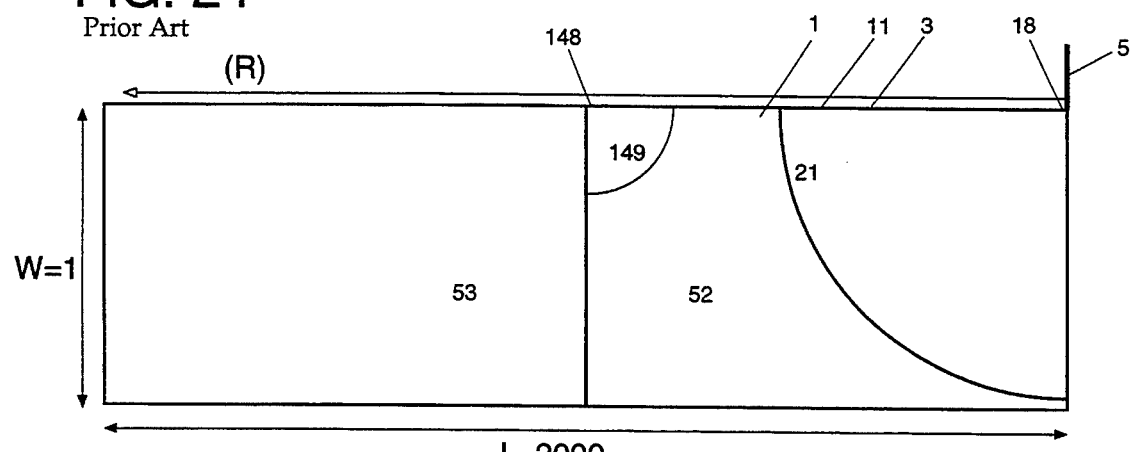
FIG. 25 is a plan view of a segmented plate with 2 segments, showing wavefronts propagating from opposite ends of a segment.
Figure 26:
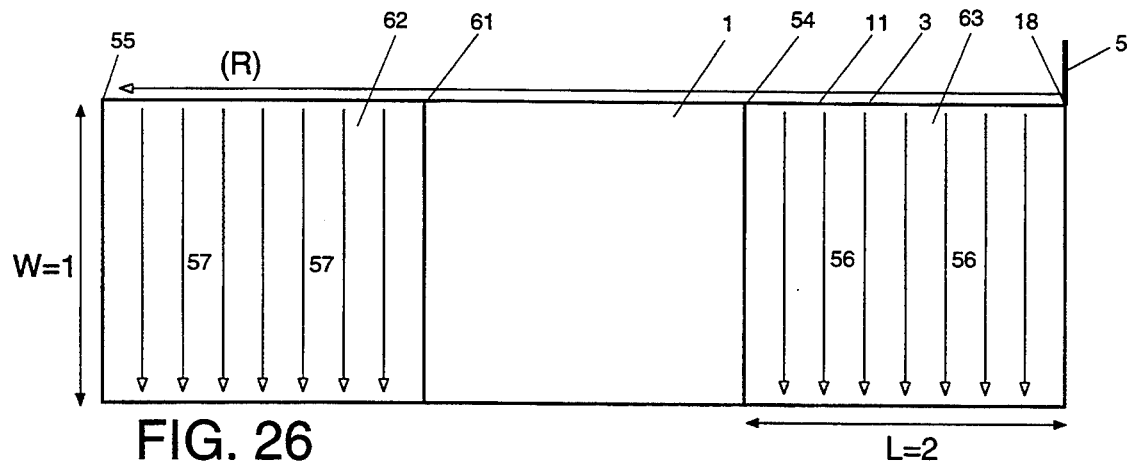
FIG. 26 is a plan view of a segmented plate with 1000 segments, showing wavefronts propagating from opposite ends of two typical segments.
Figure 27:
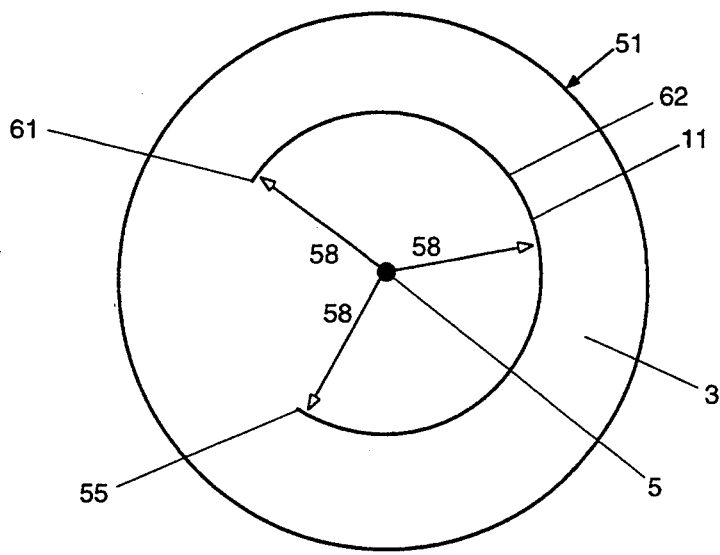
FIG. 27 is an elevation view of the circular end of a segmented plate roll capacitor, showing how all points on a typical plate segment edge are fed simultaneously.
Figure 28:
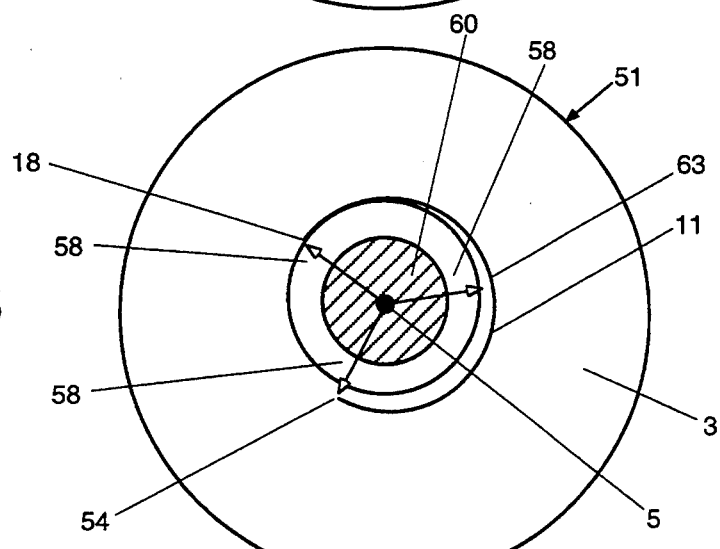
FIG. 28 is an elevation view of the circular end of a segmented plate roll capacitor, showing how all points on an inner plate segment edge are fed virtually simultaneously.
Figure 29:
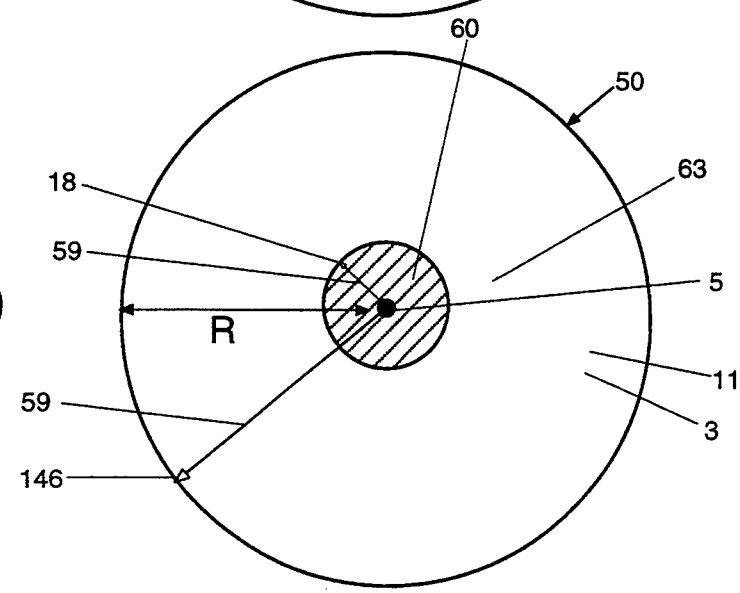
FIG. 29 is an elevation view of the circular end of a conventional prior art roll capacitor, showing how various points on the plate edge are fed non-simultaneously.
Figure 30:
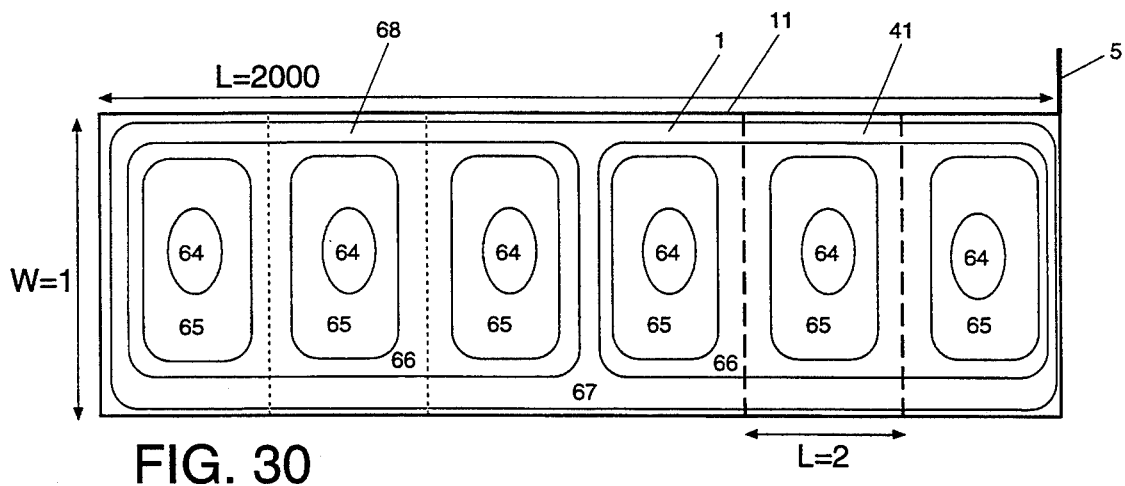
FIG. 30 is a plan view of a plate, showing various size circulating current loops allowed by contiguous plate vs. segmented plate structure.
Figure 31:
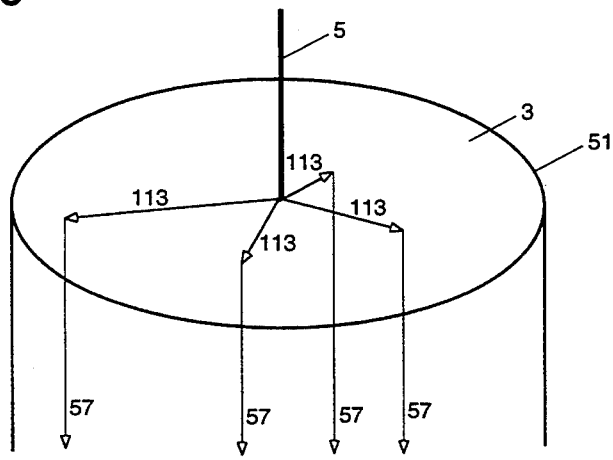
FIG. 31 is a perspective view of one end of a segmented plate roll capacitor, showing displacement current patterns in and away from end spray.
Figure 32:
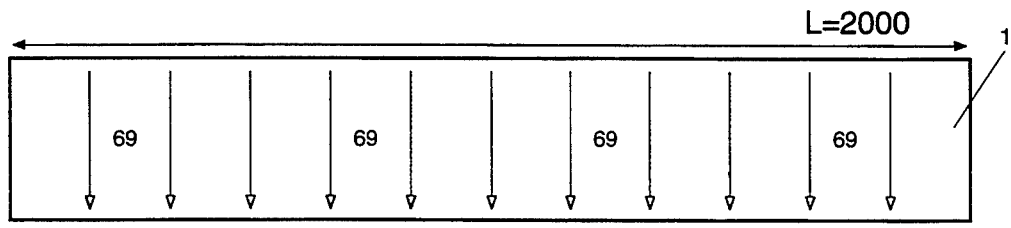
FIG. 32 is a plan view of a conventional prior art contiguous plate, showing derivation of inductance for shortest paths, followed by some of displacement current.
Figure 33:
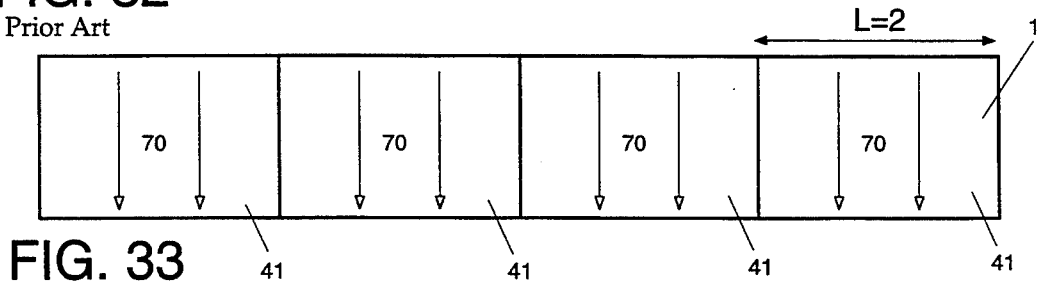
FIG. 33 is a plan view of a segmented plate, showing derivation of inductance for all displacement current through array of segments.
Figure 34:
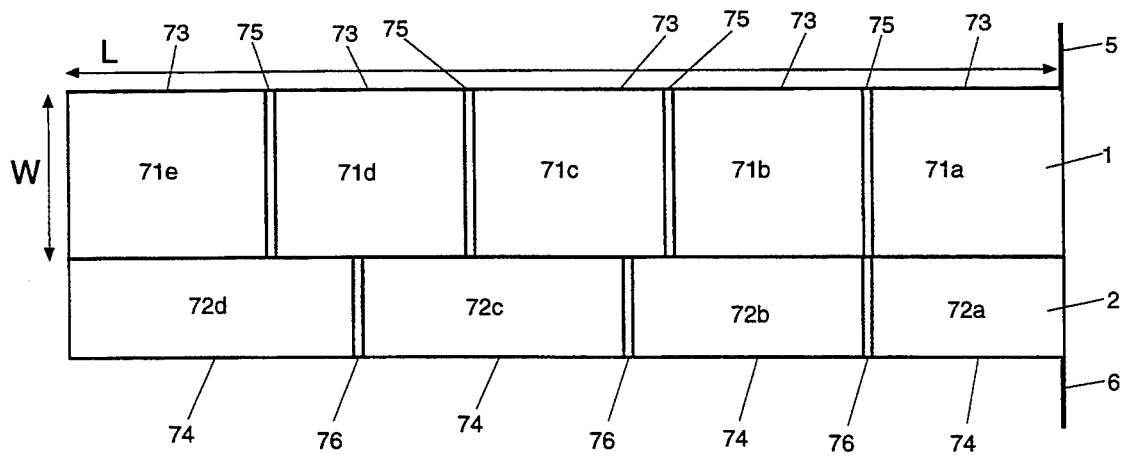
FIG. 34 is a plan view of two segmented plates, showing variation in plate segment size and in registration alignment.
Figure 35:
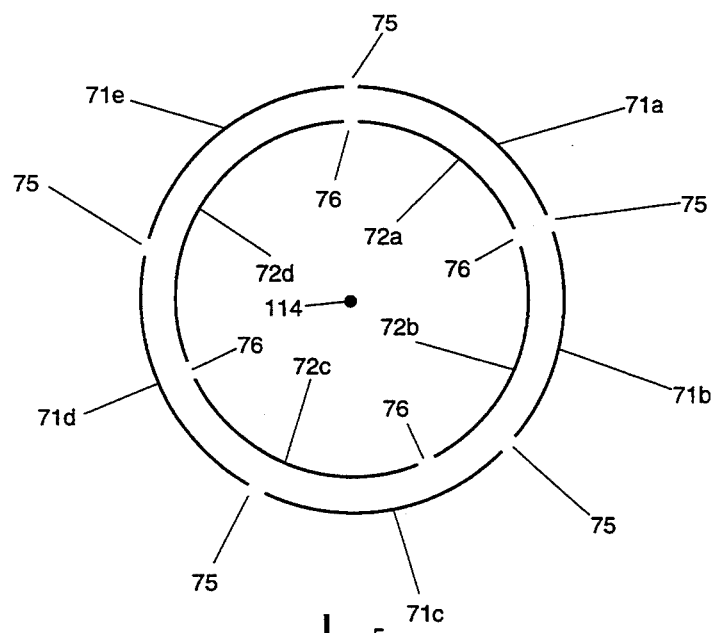
FIG. 35 is an elevation cross sectional view of a segmented plate capacitor, showing another view of the same variations shown in FIG. 34.
Figure 36:
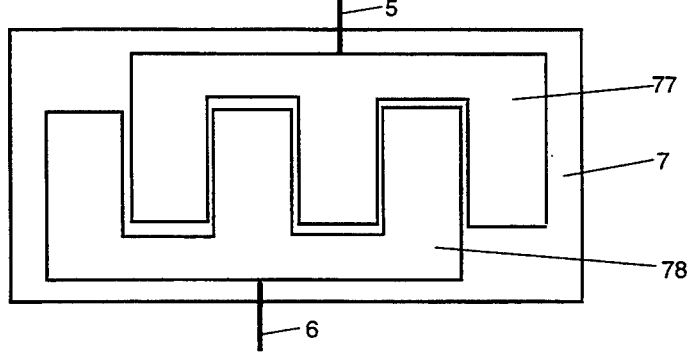
FIG. 36 is a plan view of the plates of an interdigital capacitor of prior art.
Figure 37:
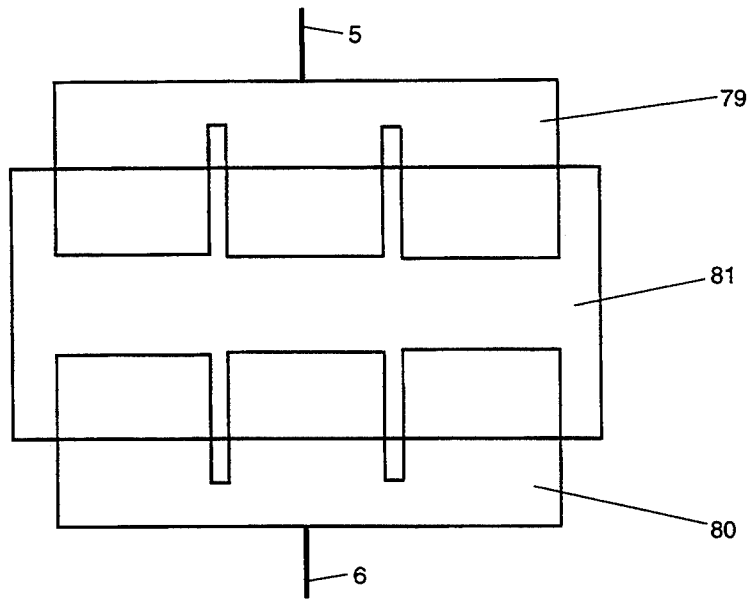
FIG. 37 is a plan view of the plates of a triad plate capacitor of prior art.
Figure 38:
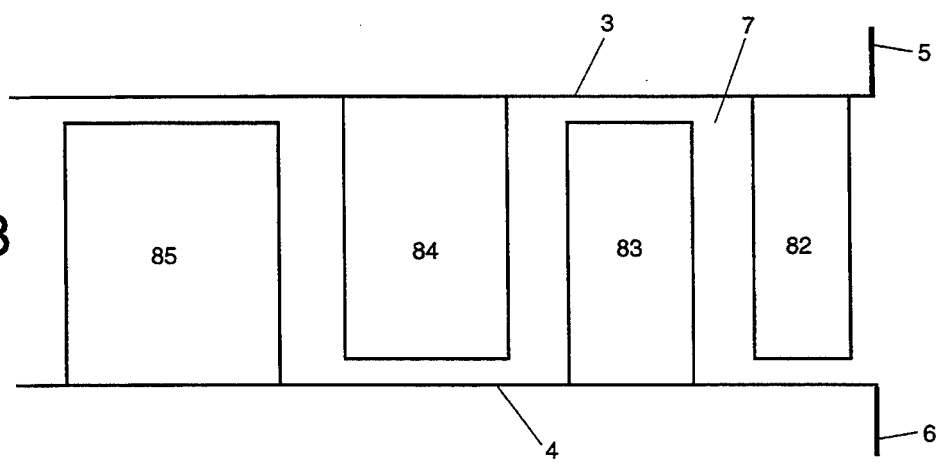
FIG. 38 is a plan view of the plates of a rigidly progressive plate stacked capacitor of prior art.
Figure 39:
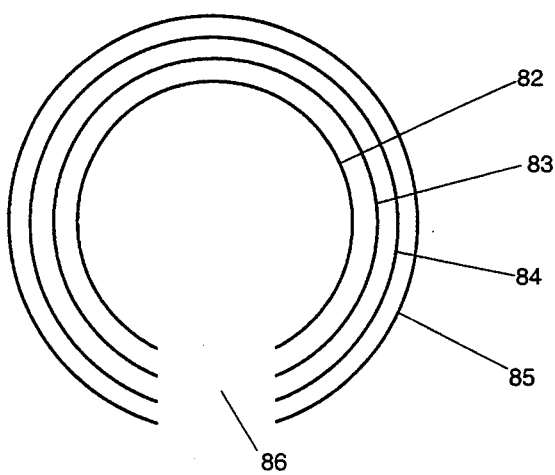
FIG. 39 is an elevation cross sectional view of the plates shown in FIG. 38.
Figure 40:
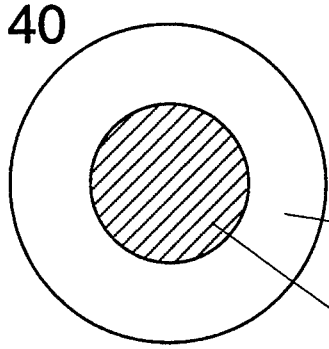
FIG. 40 is an elevation cross sectional view of a conventional prior art roll capacitor.
Figure 41:
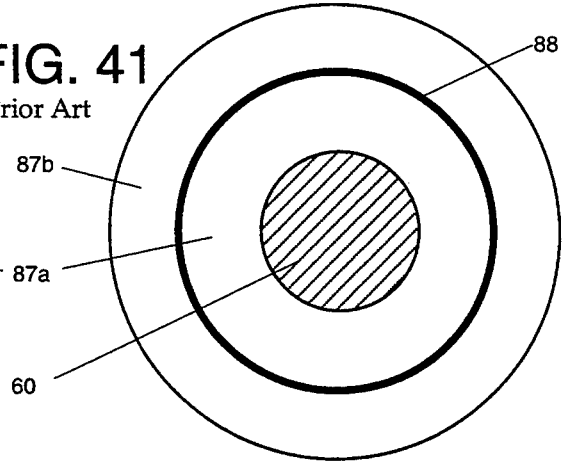
FIG. 41 is an elevation cross sectional view of two such conventional prior art roll capacitors, stacked radially.
Figure 42:
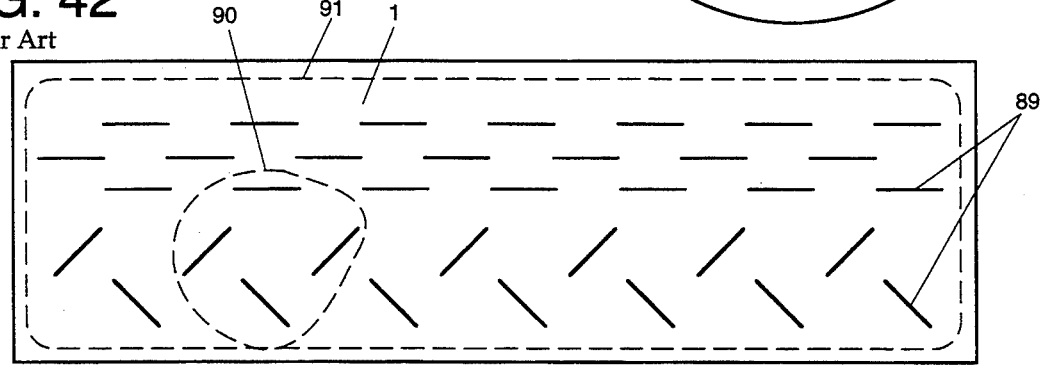
FIG. 42 is a plan view of a pockmarked contiguous plate of prior art, showing large stray circulating current paths.
Figure 43:
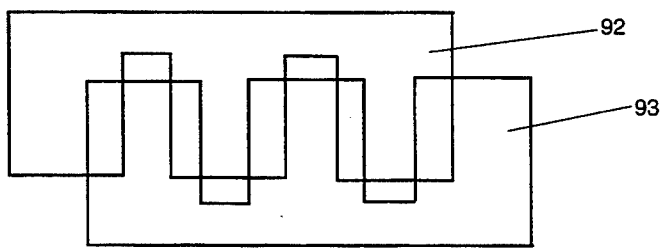
FIG. 43 is a plan view of a segmented plate structure of prior art, requiring fixed alternate registration alignment.
Figure 44:
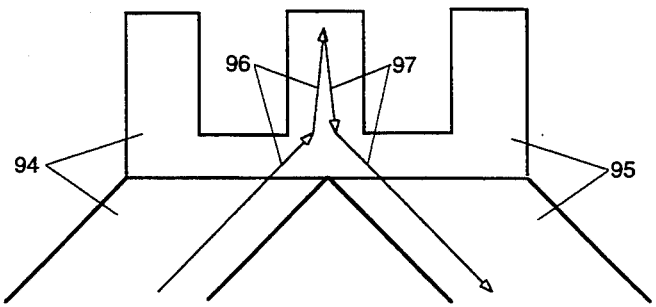
FIG. 44 is a plan view of a segmented plate structure of prior art, requiring fixed perfect registration alignment.
Figure 45:
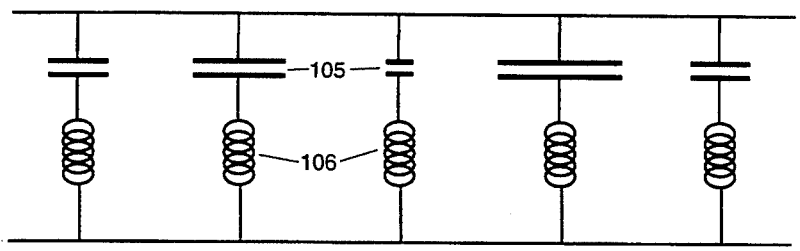
FIG. 45 is a schematic diagram showing the electrical equivalent of an array of plate segments.
Figure 46:
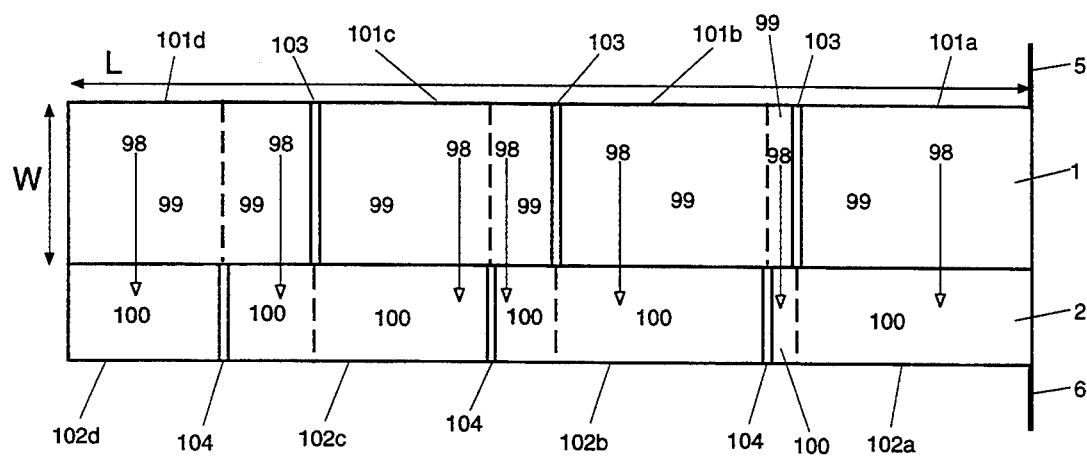
FIG. 46 is a plan view of two segmented plates, showing the formation of subarea pairs of various sizes.
Figure 47:
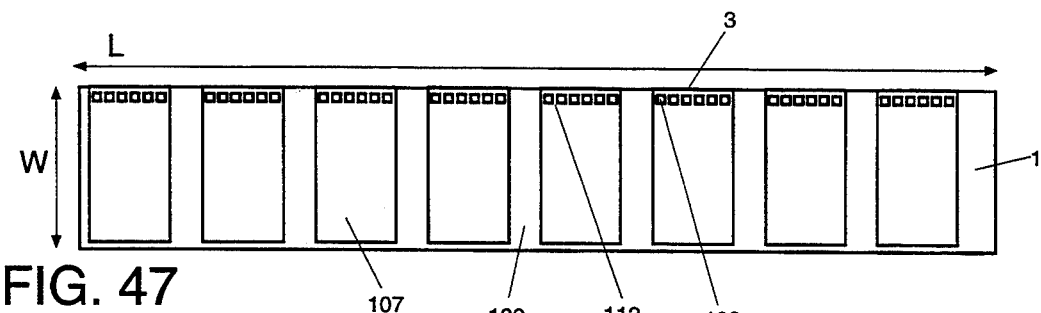
FIG. 47 is a plan view of a protection function segmented plate with fusing connections.

A basic capacitor comprises two electrode plates placed in close proximity, separated by a dielectric. FIG. 49 shows a basic capacitor in perspective view. A first electrode plate 201 is placed in close proximity to a second electrode plate 202, and they are separated by a dielectric 207. Dielectrics can often act as supporting substrates for the electrode plates; if dielectric 207 acts as a supporting substrate for plate 201, it can be appropriate to add a second dielectric supporting substrate 208 for plate 202.

A terminal 205 connects plate 201 to any external circuit, and a second terminal 206 connects plate 202 to any external circuit. Plate 201 is normally said to have opposite polarity from plate 202, since opposite polarity electric charge accumulates on the two plates 201,202 when they are in close proximity. Plates 201 and 202 are normally said to be opposite polarity plates, connected to opposite polarity terminals 205 and 206 respectively.

FIG. 50 shows the basic capacitor of FIG. 49 in cross sectional view from the edge of plates 201,202. In the structure of the present invention, opposite polarity plates 201,202 are not located in the same plane in space (they are not coplanar in their entirety) when the plate surfaces are planar. By locating opposite polarity plates 201,202 on two different planes, a maximum amount of the conductive surface area of both plates can be placed in the closest proximity. This in turn maximizes the amount of capacitance that can be realized in a given volume of space, thereby maximizing the volumetric efficiency and cost effectiveness of the capacitor.

The four elements comprising plates 201,202 and dielectric substrates 207,208 may be said to constitute a sandwich structure 209. FIG. 51 shows such a sandwich structure 209 in plan view, with plate 202 shown offset for clarity. The shape of this sandwich structure as seen in plan view is normally rectangular, but could have other shapes instead. The dimensions of the normal rectangle shape are shown as length L and width W. The absolute values of length L and width W can be chosen over a wide range by the capacitor designer, as can the ratio of length L to width W. If the sandwich structure is intended to be rolled up so as to make a roll capacitor, it is normal for the length L to be much greater than the width W. For the sake of convention in this description of a preferred embodiment, the length L dimension will be the dimension along which the electrical connections are made to plates 201 and 202. It is understood that other descriptive conventions and other topological structural variations are possible.

To make a roll capacitor, the sandwich structure 209 of FIG. 51 can be rolled up in a spiral, to form a cylinder such as shown in FIG. 52 in perspective view. The cylinder is shown not yet completely rolled up, with the trailing end of sandwich structure 209 exposed, so as to clarify the structure of the roll capacitor. When the rolling is complete, the finished cylinder becomes a roll capacitor 250. Sandwich structure 209, including plates 201,202, has been rolled up along the length L dimension to form a spiral; the direction of spiral rolling is along the length L dimension, as shown. The width W dimension of plates 201,202 and sandwich structure 209 becomes the length S of the cylinder. This cylinder has an axis 237 (dashed line), extending along the length S of the capacitor through the center of the spiral roll. The radius of this cylinder from axis 237 is shown as R. The number of spiral roll turns is the number of complete circumferential turns that sandwich structure 209 makes around axis 237 as it is rolled up into a spiral to make a roll capacitor. A conductive end spray 203 can be applied to the circular surface at one end of the cylinder, thereby electrically connecting terminal 205 to the rolled up spiral edge of plate 201. Likewise, a conductive end spray 204 (hidden in FIG. 52) can be applied to the circular surface at the opposite end of the cylinder, thereby electrically connecting opposite polarity terminal 206 to opposite polarity plate 202.

The structure of the present invention is applicable to either a planar plate capacitor or to a roll capacitor, in which the plates have been rolled up into a spiral to form a cylinder. If the plates remain planar, then in the structure of the present invention opposite polarity plates 201,202 are not coplanar in their entirety. Likewise, if the plates are rolled up to form a roll capacitor, then in the structure of the present invention opposite polarity plates 201,202 do not co-exist in the same layer of the rolled up sandwich structure, and thus will not be coradial from cylinder axis 237 in a normal roll capacitor of round cross section. The round cross section of a roll capacitor may be changed in shape, for example to oval, but in this case it still remains true that in the present invention opposite polarity plates 201,202 do not coexist in the same layer of the rolled up sandwich structure.

A sufficient criterion to distinguish this structural aspect of the present invention over prior art is that no two plates are mutually coplanar in their entirety. This is sufficient because prior art structures relevant to this aspect, which allow same polarity plate segments to be coplanar, also have the structural feature of having two or more distinct, electrically separate plates being coplanar in their entirety.

H. Plate Segments

The present invention employs a particular structure for plate 201, which is also optionally applicable to plate 202. The conductive surface of plate 201 is divided into a plurality of distinct plate segments. These plate segments may have insular topology or peninsular topology.

A. Insular Segment Topology

Figure 53:
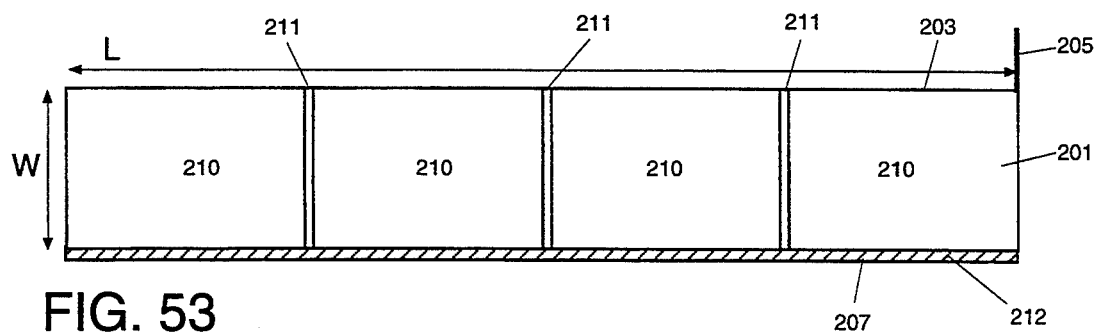
FIG. 53 is a plan view of a capacitor plate comprising insular segments, in accordance with the present invention.

FIG. 53 shows plate 201 in plan view. Plate 201 is shown divided into a plurality of distinct plate segments 210, along the length L dimension of plate 201. If the entire length L of plate 201 is divided into plate segments 210, then plate 201 consists of the aggregate of plate segments 210. End spray 203 connects a plurality of plate segments 210 (perhaps all of them) in common to terminal 205. Plate segments 210 can be supported by dielectric substrate 207; in this case the plate segments 210 can consist of patterned metallization upon dielectric substrate 207.

Each adjacent pair of plate segments 210 is separated from one another by a gap 211. Each gap 211 can consist of an absence of conductive surface upon dielectric substrate 207. The plate segments shown in FIG. 53 have insular topology. Each plate segment 210 is structurally a separate island, since gaps 211 extend the full distance of one plate segment edge, and the full distance across plate 201, thereby structurally isolating each plate segment from adjacent plate segments of the same polarity. These plate segments with insular structural topology can then be electrically connected in parallel, for example by end spray 203.

Normally, each plate segment 210 extends fully along the width W dimension to one edge of dielectric substrate 207, to that edge where the plate segments connect to end spray 203. Normally, a safety edge margin 212 is provided, where each plate segment does not extend as far along the width W dimension as dielectric substrate 207 extends, for the edge of each plate segment 210 that is opposite its edge that connects to end spray 203.

B. Coplanar or Coradial Segments

In contrast to stacked capacitor topology, the present invention teaches a structure in which two plate segments of the same polarity can freely be adjacent, without any plate segment of opposite polarity being interposed between the two. A direct straight line can easily be drawn in three dimensional space that connects two plate segments of the same polarity, without touching a plate segment of opposite polarity. Plate segments of the same polarity can have subareas that are mutually coplanar, or substantially coradial from a capacitor axis when the plates are not planar.

In the present invention, adjacent plate segments 210 of the same polarity can freely be generally mutually coplanar. In particular, subareas of a plurality of plate segments of one plate (e.g. the mutually nearest subareas of adjacent plate segments, at edges that face each other across a single gap 211) can freely be mutually coplanar, as shown in FIG. 53. If the planar form of plate 201 is changed to a different three dimensional form, for example by being rolled up to make a roll capacitor, then subareas of a plurality of plate segments of one plate can freely be mutually substantially coradial from a capacitor axis (this is shown for plate segments 227 in FIG. 58). The plate segment subareas would be substantially coradial instead of perfectly coradial because the layers of a roll capacitor constitute a spiral roll, not perfectly concentric circles.

This aspect of the structure of the present invention is distinct from stacked capacitor prior art because it is not limited to requiring that same polarity plate segments be on different planes or at substantially different radii from a capacitor axis. A sufficient distinguishing criterion for this structural aspect is to specify that subareas of a plurality of plate segments of one plate can be mutually coplanar, or substantially coradial from a capacitor axis.

C. Gaps

Gaps 211 can be very narrow, with imprecise edges. This minimizes loss in material, in capacitance, and in volumetric efficiency, and also minimizes expense of manufacture and of employment of the capacitor. Gaps 211 can be very narrow and imprecise because, in the use and application for which the present invention is intended, adjacent plate segments 210 of the same polarity remain at the same voltage potential, have the same currents, and do not have any substantial current flow with a vector component pointing across any gap 211.

D. Segment Size and Length

The area of each plate segment 210 is not limited to being very small, because in the present invention each segment is not limited to serving a protection function, involving current limiting or fusing disconnection in the event of catastrophic failure. Thus, plate segments 210 are not limited to being very short along the length L dimension. Since the present invention freely allows moderate length plate segments, it freely allows fewer plate segments than the number required by a structure that is limited to the very short plate segments necessary to serve a current limiting or fusing function in the event of catastrophic failure. With fewer plate segments 210 there would be fewer gaps 211. This further minimizes loss in material, in capacitance, and in volumetric efficiency, and also minimizes expense of manufacture and of employment of the capacitor.

The art has determined that the protection function can be effectively accomplished only if the length of each plate segment along the length L dimension is limited to less than ½ inch, and only if the proportions of each plate segment are that the width W dimension is significantly larger than the length of each plate segment along the length L dimension, by a factor exceeding 2:1. In contrast, it has been experimentally determined that the structure of the present invention can most effectively accomplish its intended uses, functions, and methods if the plate segment proportions are reversed compared to the art, such that the length along the length L dimension of each plate segment 210 exceeds the plate segment's width along the width W dimension. It has further been experimentally determined that the structure of the present invention can perform most effectively when gaps 211 are made very narrow, and when the length of at least most of the plate segments 210 is made significantly longer than ½ inch along the length L dimension, by a factor of at least 2. It is conjectured that the present invention's distinct plate segment proportions and dimensions provide superior performance because they reduce electrostatic field loss, edge effect, and fringing that may occur at the gaps between segments.

The present invention freely allows variation of plate segment size within plate 201 or within a given capacitor. The present invention is not limited to requiring that all plate segments 210 be manufactured with high precision to be exactly the same size, or to follow an exact variation or progression in size.

The present invention freely allows plate segments 210 to have any shape, and to vary in shape within plate 201 or within a given capacitor. Good volumetric efficiency of capacitance can be achieved by making plate segments 210 in the shape of parallelograms or interlocking polygons (e.g. trapezoids) that are closely spaced within plate 201. In some cases, rhomboid parallelograms can be advantageous over rectangular parallelograms.

Likewise, the present invention freely allows gaps 211 to have any size or shape, and to be oriented in any direction, so long as they in aggregate adequately perform their required function of creating plate segments that have an insular or peninsular topology.

E. Peninsular Segment Topology

Figure 54:
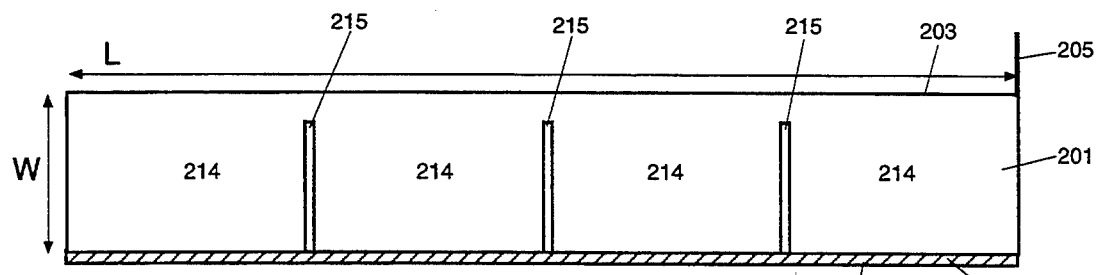
FIG. 54 is a plan view of a capacitor plate comprising peninsular segments, in accordance with the present invention.

FIG. 54 shows a variation of the structure described for FIG. 53. In FIG. 54 plate 201, shown in plan view, is divided into a plurality of plate segments 214. Each adjacent pair of plate segments is partially separated from one another by a gap 215. Each gap 215 can consist of an absence of conductive surface upon dielectric substrate 207. The plate segments shown in FIG. 54 have peninsular topology, in contrast to the insular topology of plate segments 210 of FIG. 53, since gaps 215 do not extend the full distance across plate 201, and thereby do not completely structurally isolate each plate segment from adjacent plate segments of the same polarity. These plate segments with peninsular structural topology can also be further electrically connected in parallel, for example by end spray 203.

Figure 55:
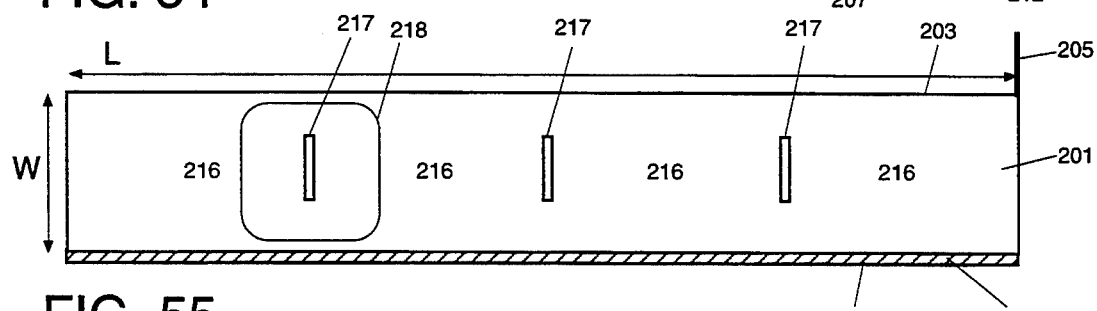
FIG. 55 is a plan view of a capacitor plate that is not segmented in accordance with the present invention.

FIG. 55 further clarifies the concept of peninsular plate segment topology taught by the present invention, by showing a plate segment topology that is not peninsular (and not insular), and is therefore not representative of the structure taught by the present invention. FIG. 55 shows plate 201 in plan view. Plate 201 contains a plurality of subareas 216 defined by a gap 217 or a plurality of gaps 217. None of the subareas 216 are in the shape of a peninsula, or have a peninsular structural topology. Furthermore, the non-peninsular structural topology shown in FIG. 55 allows a large circulating current loop 218 to circulate between two adjacent plate subareas 216, such that the loop has simultaneous independent access via plate 201 to both substantially opposite ends (across the width W dimension) of at least one subarea 216. In contrast, the peninsular topology shown in FIG. 54 does not allow any such circulating current loop to have simultaneous independent access via plate 201 to both substantially opposite ends (across the width W dimension) of any one plate segment 214.

Good practice suggests that a gap or series of gaps 215 in FIG. 54 cover at least half the distance across the width W dimension of plate 201, to clearly delineate a peninsula. If a gap or series of gaps were to cover less than half this distance across plate 201, then the gaps could not be said to clearly delineate a peninsular topology, since the predominant distance across plate 201 would be contiguous mainland, rather than being predominantly peninsular as delineated by a gap or series of gaps.

The present invention allows any mixture of insular and peninsular topology plate segments within plate 201, or within a given capacitor. The minimal criterion, to adequately distinguish this structural aspect of the present invention from prior art, is that plate 201 contain at least one segment that has insular or peninsular topology; the remainder of plate 201 need not follow this structure.

III. Structural Means for Creating Varying Capacitive Elements

The structure of the present invention incorporates structural means for deliberately creating, within one overall finished capacitor, a number of capacitive elements having different capacitances from one another in a deliberate manner, in order to realize further advantages in electrical performance. Different structural means for this goal are appropriate for different overall plate and capacitor structures. This structural feature of the present invention may be described as a structural means for varying the size of the mutually facing area shared by a segment of one electrode plate 201 with a segment on a second electrode plate 202.

The method and use taught by the present invention differ slightly in this regard from the apparatus taught by the present invention. The apparatus taught allows various absolute registration between plates at any point along a plate, and then includes structural means for specifically varying the registration alignment from this point for other points along the plate within the same overall capacitor. The method taught also allows various absolute registration alignment at any point, but then merely allows a varying of this registration alignment within the same overall capacitor. Likewise, the use taught addresses capacitor structures that also allow various absolute registration alignment at any point, but then merely allow a varying of this registration alignment within the same overall capacitor. Thus, the method and use taught by the present invention address a slightly broader structure than the apparatus taught by the present invention.

The method and use taught by the present invention may be said to address allowing various registration alignment between segments of a first plate and a second plate, whereby the size of a mutually facing area, shared by a segment of the first plate with a segment on the second plate, is not fixed at an unchanging predetermined value. This encompasses both the allowing of various absolute registration alignment at any point and also the allowing of varying the registration alignment within the same overall capacitor.

A. Varying Segment Size on One Plate

The structure of the present invention allows one plate 201 to be divided in any of the manners described above into a plurality of plate segments, and a second plate 202 to not be divided into a plurality of segments (i.e. to be one large segment). In this case, an appropriate structural means for creating capacitive elements with different capacitances would be to deliberately vary the size of the plate segments of plate 201. The size of the mutually facing area, shared by each segment of plate 201 with the single segment that is plate 202 as a whole, would thus vary among the plate segments of plate 201, in accordance with the varying size of the plate segments of plate 201.

Figure 56:
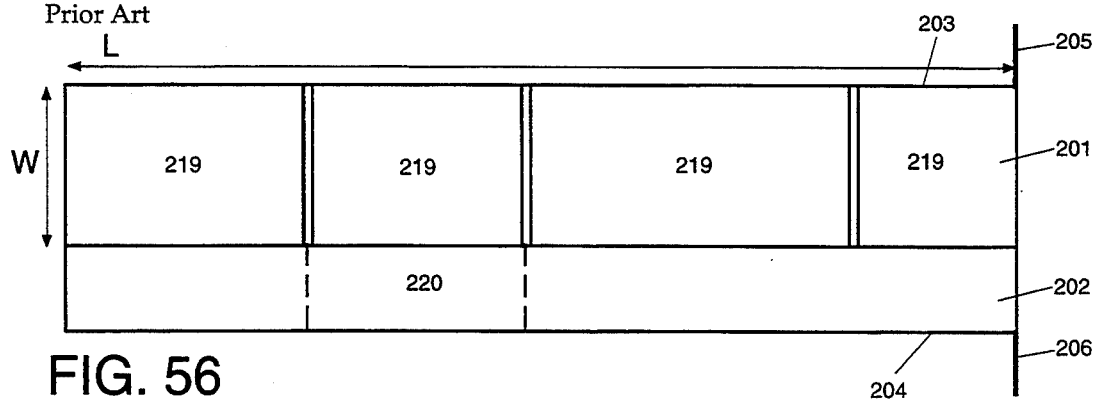
FIG. 56 is an offset plan view of two plates, showing variation in plate segment size, subarea pair size, and registration alignment where one plate is contiguous.

FIG. 56 shows plates 201 and 202 in plan view, with plate 202 mostly hidden behind plate 201. Plate 201 is shown divided into a plurality of plate segments 219, which here are shown as all having insular topology. Plate 202 is an undivided, contiguous conductive surface. Plate segments 219 differ from one another in size; here they are shown varying in the length L dimension, with a uniform width W dimension. The size variation can be random or progressive among nearby segments, can encompass a wide range or a narrow range, and can be accomplished in small or large steps.

A capacitive element is formed by a plate segment 219 acting in conjunction with that subarea of plate 202 which it overlays. One such subarea 220 of plate 202 is shown, delineated by a dashed line. The capacitive element consists of the pair of elements 219,220 acting in conjunction. The capacitance of each element will be determined by the size of any particular plate segment 219. The best electrical performance can be realized if the capacitances of these capacitive elements vary over a wide range, thereby spreading the internal self resonance of the capacitor as a whole over a wide frequency range. A wide range of sizes for plate segments 219 could be inexpensively manufactured by demetallizing a stripe across the width W dimension of plate 201, at intervals determined by a computer programmed to produce random sizes or progressive sizes.

B. Differing Segment Size on Two Plates

The structure of the present invention also allows two plates 201 and 202 to both be divided into a plurality of plate segments. In this case, a wide range of capacitances can be inexpensively achieved for the various capacitive elements, by an alternative structural means, without having to vary plate segment size within one plate. The present invention freely allows random and varying registration alignment between plate segments of opposite polarity plates. This structural means takes advantage of that free allowance.

Figure 57:
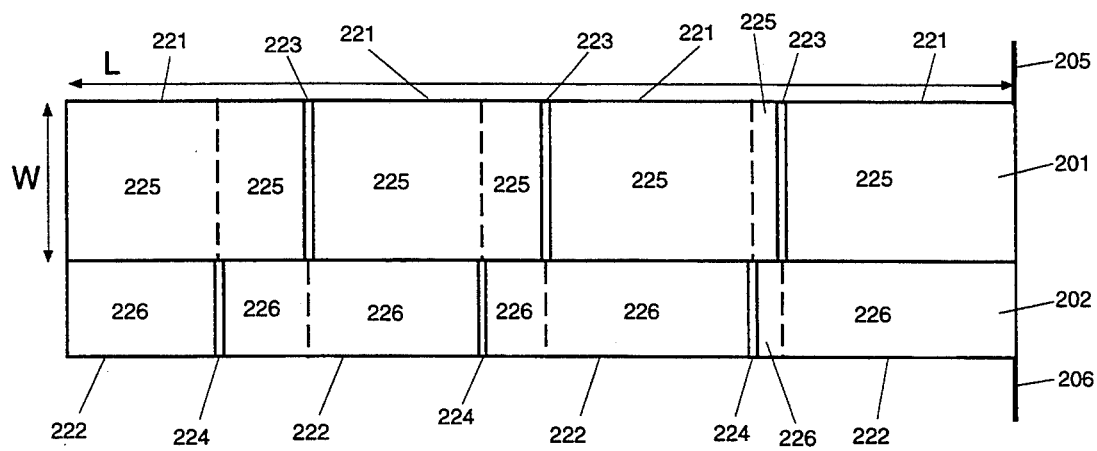
FIG. 57 is an offset plan view of two plates, showing variation in plate segment size, subarea pair size, and registration alignment where both plates are segmented.

FIG. 57 shows plates 201 and 202 in plan view, with plate 202 mostly hidden behind plate 201. Plate 201 is divided into a plurality of plate segments 221, which are separated from one another by gaps 223. Likewise, plate 202 is divided into a plurality of plate segments 222, separated from one another by gaps 224. The structure of the present invention freely allows random and varying registration alignment between plate segments 221 and 222, and also between gaps 223 and 224.

As shown in FIG. 57, the deliberate misalignment of absolute registration between segments 221 and segments 222 produces subareas 225 of plate segments 221 and subareas 226 of plate segments 222, delineated by dashed lines or gaps. The location of a either gap 223 on plate 201 or a gap 224 on plate 202 delineates the boundary for a subarea 225 of plate 201 and also for a subarea 226 of plate 202. A capacitive element is formed by a subarea 225 of plate 201 acting in conjunction with that mutually facing subarea 226 of plate 202 which it overlays. Every subarea pair 225,226 forms a capacitive element. The subarea pairs 225,226 can differ from one another in size, and thus form capacitive elements having different capacitances.

If the deliberate misalignment of absolute registration between segments 221 and 222 is further deliberately varied within a single capacitor as a whole, then a wide range of sizes can be achieved for subarea pairs 225,226, thereby yielding an advantageously wide range of capacitances for capacitive elements constituting the overall capacitor. An easy and inexpensive structural means for deliberately varying this misalignment is to make the plate segments 222 slightly longer or shorter in the length L dimension than plate segments 221. This will make the initial absolute misalignment of registration progressively vary along the length L dimension of the entire plate pair 201,202.

In FIG. 57, plate segments 221 of plate 201 all have the same size as one another, which makes them inexpensive to manufacture. Likewise, plate segments 222 of plate 202 all have the same size as one another, which also makes them inexpensive to manufacture. Plate segments 222 are slightly longer in the length L dimension than plate segments 221. This segment length difference between the two plates can be very small, and can be inexpensively achieved by merely altering some tolerance adjustments during manufacturing, for example by altering film tension during the manufacture of metallized film.

The widest possible range of sizes for subarea pairs 225,226 varies from the size of a full plate segment 221 as a maximum, down to virtually zero as a minimum. This determines the widest possible range of capacitances achievable by the capacitive elements formed by subarea pairs 225,226. It can be advantageous to create this widest possible range of capacitances within each overall capacitor, and further to make this range as smooth as possible; for example, this will spread out the overall capacitor's internal self resonance as widely and smoothly as possible.

In order to achieve this widest possible range of sizes for subarea pairs 225,226, with optimum smoothness, it is sufficient to gradually vary the registration misalignment from perfect alignment to merely 50% misalignment (where a gap on one plate is aligned with the center of a plate segment of the opposite polarity plate), within each overall capacitor. It can be appreciated from FIG. 57 that a 10% misalignment produces both a 10% area (and 10% capacitance) subarea pair 225,266 and also a 90% area (and 90% capacitance) subarea pair 225,226, relative to the area and capacitance of a full size plate segment pair 221,222. Likewise, a 20% misalignment produces both a 20% and an 80% capacitance element, a 40% misalignment produces both a 40% and a 60% capacitance element, and a 50% misalignment produces two 50% capacitance elements.

It is substantially irrelevant at what absolute registration alignment this varying series begins or ends, if the entire possible range is covered at least once. This fact enables the present invention's structure to freely tolerate any misalignment in absolute plate segment registration between opposite polarity plates, in contrast to some prior art structures.

Thus, both the smoothest variation and also the widest range of capacitance, for capacitive elements formed by subarea pairs 225,266, can be achieved by progressively varying the misalignment in the smallest possible steps that will achieve the range from perfect alignment to 50% misalignment just once within a given overall capacitor. The percentage size of this optimum, smallest possible step is a function of the number of plate segments 221 within a given overall capacitor. For example, if there are 1000 plate segments 221 within a given overall capacitor, then the optimum step size for varying misalignment is 50%/1000=0.05%; thus the length of plate segments 222 should be merely 0.05% larger than plate segments 221 for a capacitor with 1000 plate segments.

If the differential in plate segment length between plates 201 and 202 were larger than this optimum small percentage, then there would be some needless repetition of the full range of capacitance variation among subarea pairs 225,226. This in itself would not be harmful, but it would be at the expense of optimum smoothness in spreading out the capacitance variation, since the steps of capacitance would be farther apart than necessary. If the differential in plate segment length were smaller than this optimum, then there would be one or two gaps in the range of capacitances achieved by the subarea pairs 225,226.

C. Varying Registration Alignment for a Roll Capacitor

The structure of the present invention encompasses capacitors where the plates remain flat, and also allows two plates 201 and 202 to be formed into any three dimensional shape, for example both being rolled up into a spiral, to form a roll capacitor. In this case, a wide range of capacitances can be achieved for the various capacitive elements by a third alternative structural means. This third structural means can be achieved even more inexpensively, since there is no need to vary plate segment size at all. The third structural means takes advantage of two structural facts.

First, as noted, the optimum plate segment length differential between plates 201 and 202 is very small (0.05% for a 1000 segment capacitor), and thus the optimum step size for progressive variation in alignment is similarly very small (also 0.05% per segment for a 1000 segment capacitor).

Figure 58:
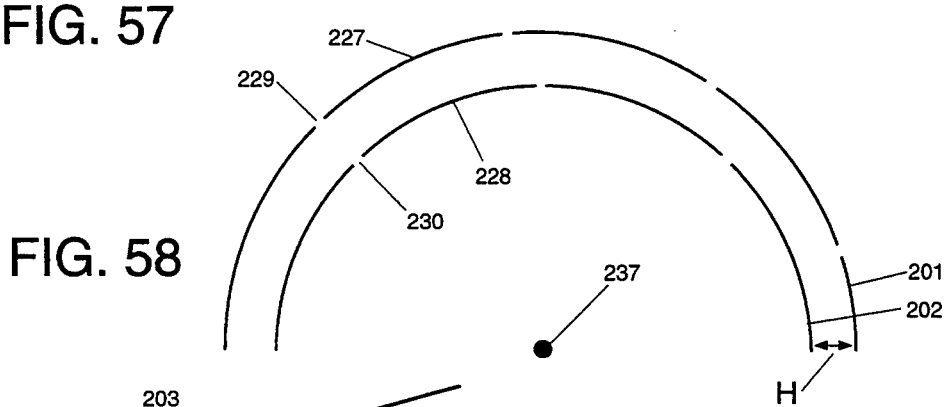
FIG. 58 is an elevation cross sectional view of an arc of two plates in a roll capacitor, where both plates are segmented, showing variation in subarea pair size and registration alignment, where all plate segments are the same size.

Second, the outer plate of the plate pair 201,202 has a slightly greater distance to complete each turn of the roll capacitor spiral than the inner plate of the plate pair 201,202. This is illustrated in FIG. 58, which shows an arc section of one turn of plates 201,202 in a roll capacitor, in a cross sectional edge view. For convenience in description, plate 201 will be considered here to be the outer plate. FIG. 58 shows a plurality of plate segments 227 of plate 201 separated by gaps 229, and a plurality of plate segments 228 of plate 202 separated by gaps 230. In FIG. 58, all plate segments 227 are the same length as one another, and all plate segments 228 are the same length as one another, and furthermore all plate segments 227 are the same length as all plate segments 228. Thus, both plates 201 and 202 can be manufactured very inexpensively by the same machine, without any adjustments or alterations. In FIG. 58 it is also shown that same polarity plate segments 227 are mutually substantially coradial from capacitor axis 237, as are plate segments 228.

For each spiral roll turn completed of a roll capacitor, plate 201 executes a farther circumferential distance around the turn than plate 202. The difference in circumferential distance for each turn is a function of the thickness of the plate, including the supporting dielectric substrate (not shown in FIG. 58, for the sake of clarity). This difference is given by the formula $2\pi H$, where H is the thickness of one plate, including its supporting dielectric substrate (the factor of 2 derives from the fact that it is the radius that is increased by H, and the diameter differential is twice the radius differential). The thickness H also is equal to the distance between opposite polarity plates 201,202.

The difference in circumferential distance extends along the length L dimension of plates 201 and 202. Thus, this difference produces a progressive increase in plate segment misalignment between opposite polarity plates 201,202 within each turn of the roll capacitor. This can be seen in FIG. 58 as a progressive variation in the alignment of gaps 229 to gaps 230.

Furthermore, this progressive increase in misalignment is cumulative from one spiral roll turn executed by the plate pair 201,202 around the roll capacitor to the next turn, and so on. Thus the total variation in registration alignment within one capacitor is given by the formula $2\pi HN$, where N is the total number of spiral roll turns, and H is the thickness of one plate including its supporting dielectric substrate, or the distance between two opposite polarity plates.

The thickness of the plate including its supporting dielectric substrate is predetermined for a given capacitor by the voltage rating required for that capacitor. For example, a roll film capacitor rated at 400 volts might typically require a film thickness of about 0.5 mil (0.0005 inches). The total number of turns in a given capacitor is predetermined by its capacitance. For example, a typical roll film capacitor of 10 gF might require about 1000 turns. Thus, the total variation in registration alignment within such a capacitor would be 3.14 inches.

From the discussion above, we know that it is sufficient to achieve a progressive misalignment range of 0% to 50% of a plate segment length just once within an overall capacitor, to achieve the widest possible range of capacitance variation with optimum smoothness. Thus, these factors would be optimized for the given capacitor example by deliberately choosing a plate segment length of 2 times 3.14, or 6.28 inches. The total variation in registration alignment for a capacitor with 1000 turns and a 0.5 mil thickness for plate and dielectric substrate would be 3.14 inches, which is 50% of the plate segment length of 6.28 inches. Thus, the formula for the ideal plate segment length is $4\pi HN$. If a shorter plate segment length were chosen, the capacitance variation would needlessly repeat itself within one overall capacitor, with some sacrifice in smoothness of variation in capacitance, since the steps would be farther apart than necessary. If a longer plate segment length were chosen, then there would be one or two gaps in the range of capacitances achieved by the subarea pairs 225,226.

D. Specifying Plate Segment Length

The third structural means for achieving an optimum variation in plate segment misalignment, between opposite polarity plates 201 and 202, takes advantage of the structural facts taught by the present invention that the incremental variation required for optimum total variation is very small, and that this small incremental variation can be readily achieved by the progressive misalignment offset that can be obtained in a roll capacitor structure. To these structural teachings offered by the present invention is added the further structural distinction that the plate segment length can be deliberately chosen and specified, so as to optimize this variation in plate segment misalignment, using the formulas taught by the present invention. Thus, the structure of the present invention includes a specification for optimizing plate segment length that is distinct over prior art from a structural standpoint.

Figure 48:
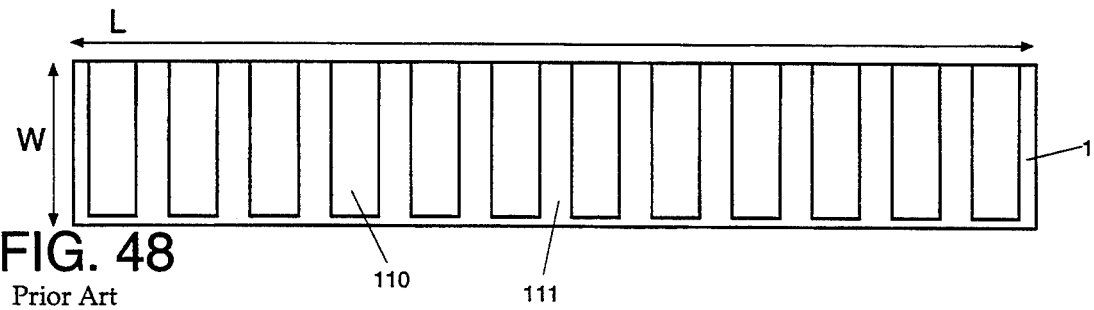
FIG. 48 is a plan view of a protection function segmented plate with short segments.

It is noted that the optimum plate segment length determined by the present invention differs significantly from the very short plate segment length required by protection function segmented plate structures. The optimum plate segment length for the foregoing typical example, 6.28 inches, is about 12 times longer than the ⅛ inch plate segment length that is the maximum for a protection function structure (such as described previously for FIG. 48) to function at all as intended.

A plate segment length in the vicinity of 6.28 inches would execute several turns around a typical roll capacitor, in which case the structural features described for FIG. 58 would actually occur over a multiple of several turns, rather than within an arc constituting a fraction of one turn as shown in FIG. 58 for the sake of clarity.

A plate segment executing a few turns of a roll capacitor would not noticeably increase series self inductance. The few turns are so similar in radius, and so similar in distance from terminal 205, that all portions of each plate segment would still be fed substantially simultaneously by end spray 203 from terminal 205. This simultaneity in turn guarantees that all the displacement current paths through each plate segment are the shortest paths and are parallel to one another. Thus, virtually no displacement current would follow longer diagonal paths, or would execute any coil loop turns of the capacitor, both of which paths would increase self inductance if they were followed.

There are further factors that can also be considered in choosing an optimum plate segment length for a capacitor. Shortening the plate segment length would result in more plate segments within a given capacitor, thereby placing more capacitive elements in parallel. This would reduce somewhat the self inductance of the capacitor as a whole, an advantageous consequence. However, the structure of the present invention already reduces self inductance, with its creation of subarea pairs by deliberate registration misalignment, thereby virtually doubling the number of capacitive elements in parallel, so a further reduction in self inductance by further reducing plate segment length can reach a point of diminishing returns. On the other hand, shortening the plate segment length and producing more plate segments within a given capacitor would also produce more gaps, and a lower ratio of plate area to gap area. This would result in added expense from wasted material and poorer volumetric efficiency, and also would result in poorer electrical performance, possibly due to gaps causing field losses, edge effect, and fringing; these are all disadvantageous consequences. Thus, these further factors can be mutually contraindicative as to whether plate segment length should be made significantly longer or shorter than the optimum determined by the formula for optimal variation of registration alignment, as discussed above. These further factors should be borne in mind if significant deviation from the formula for optimal variation of registration alignment is contemplated.

The formula for optimal variation of registration alignment can itself be implemented with considerable latitude, since the effects of suboptimal variation of registration alignment are not severe. As noted, too much variation merely produces a needless repetition of the capacitance variation series, with somewhat suboptimal smoothness because the steps are larger than necessary; too little variation produces a very smooth capacitance variation within its range, but does not complete the greatest possible range, leaving one or two gaps somewhere in the maximum possible range.

For purposes of inexpensively manufacturing a range of capacitors having different capacitance values, and perhaps also employing different film thicknesses, it can be advantageous to determine a single compromise plate length that can adequately serve the full range of capacitors proposed. The formula for optimal variation of registration alignment shows that smaller capacitor values, having fewer turns, would ideally employ shorter plate segments. Larger value capacitors, having more turns, would ideally employ longer plate segments. As capacitor values continue to increase, their physical size becomes impractically large to accurately manufacture and to employ in many electronic products, so it is customary to employ thinner film for very large capacitance values. This thinner film would, according to the formula taught by the present invention, call for a shorter optimum plate segment length than a thicker film.

Thus, as capacitance values progressively increase for a range of capacitors, the formula calls for a progressive increase in ideal plate segment length with increasing capacitance until a change is made to a thinner film, at which point the ideal plate segment length takes a step down to become shorter, then progressively rising again as capacitance values continue to increase for that given film thickness. It can be appreciated that the entire range of ideal plate segment lengths is compressed by this step down in ideal length, for each step to a thinner film, as capacitance values continue to increase. For example, a typical range of capacitors from 0.2 gF to 10 gF, a 50:1 range in capacitance, could call for a merely 25:1 range in ideal plate segment length according to the formula for optimal variation of registration alignment, if the larger capacitors follow the customary practice of employing a film half as thick as the smaller capacitors. Because the range of ideal plate segment lengths is compressed, a compromise plate length value chosen within this range would not be significantly suboptimal for the full range of capacitors. In this manner, a single set of tooling can be inexpensively employed for manufacturing a single plate segment size that can adequately serve for a full range of capacitors with diverse capacitance values.

IV. Terminal Contact Structure

The structure of the present invention can also optionally incorporate a terminal whose initial point of contact with any end spray is not at the center of the end spray area, and which can further have a substantially annular form as it contacts the end spray. This non-central terminal structure applies to the present invention not only in roll capacitor form, but also in other forms, for example a stacked multiple of the present invention.

Figure 59A:
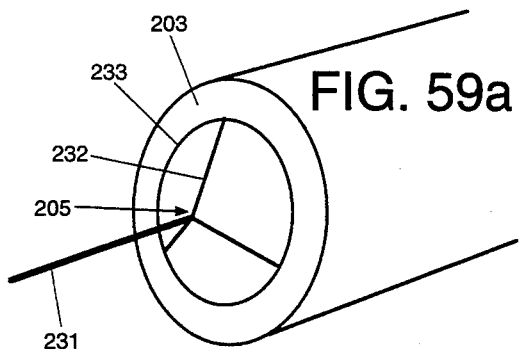
FIG. 59a is a perspective view of a roll capacitor end, showing a terminal structure with annular contact.
Figure 59B:
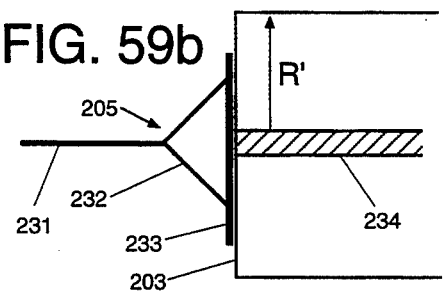

FIGS. 59a and 59b show one possible embodiment. FIG. 59a shows a roll capacitor end in perspective view, and FIG. 59b shows the same roll capacitor end in side view. Terminal 205 is shown comprising three elements: a lead wire 231, an arm or arms 232, and an annular ring 233. Lead wire 231 is connected to annular ring 233 via arm or arms 232. None of these three elements comprising terminal 205 contact end spray 203 at the center of the capacitor face occupied by end spray 203. Arm or arms 232 could be shaped in many ways, for example a solid walled cone. Annular ring 233 can preferably but not necessarily be circular in shape. FIG. 59b also shows an optional dummy core mandrel 234, which is often employed for winding roll capacitors.

The points at which annular ring 233 contacts end spray 203 can preferably but not necessarily be located in the range 0.5 to 0.707 of the way along outward pointing radial vectors R', which begin at the outer periphery of any dummy core mandrel 234 and extend to the outer periphery of the capacitor. If the face occupied by end spray 203 is not circular (it could for example be oval or rectangular), then R' could be along a major radius, or a minor radius, or along the distance from the mandrel core to a side, or along the distance from the mandrel core to a corner.

If annular ring 233 contacts end spray 203 at 0.5 of R', then the worst case time differential among all plate segments receiving a signal fed by terminal 205 would be minimized. The distance to the farthest plate segments from annular ring 233, both toward the capacitor's center and also toward the capacitor's periphery, would be merely 0.5R' greater than the zero distance to the nearest plate segments lying directly underneath annular ring 233. Thus, the distance differential resulting from this terminal 205 structure is merely half of the R' distance differential that would result from a conventional prior art terminal 205 structure where terminal 205 contacts the center of the face occupied by end spray 203. The maximum time differential is therefore correspondingly half as much, thereby producing the advantage of half as much time smearing of the signal being processed by the capacitor.

A roll capacitor has more plate segments and more plate area toward the outer part of its radius than toward the inner part of its radius. Therefore, if the annular ring contacts end spray 203 at 0.707 of R', then the time differential would be minimized for the greatest number of plate segments and for the greatest amount of plate area. Thus, the greatest amount of the signal being processed by the capacitor would be time smeared the least.

Figure 60:
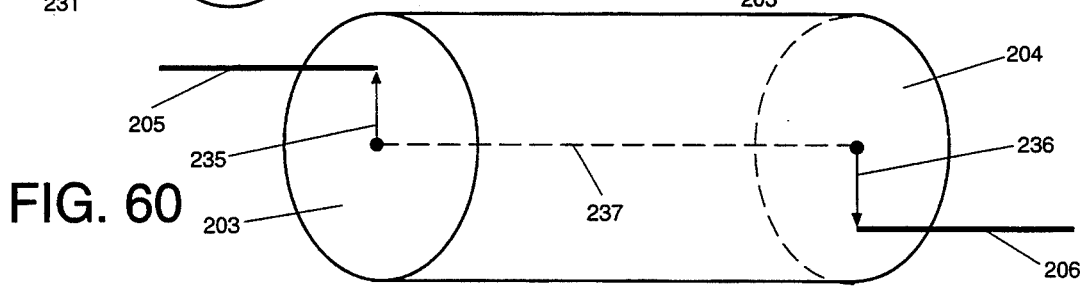
FIG. 60 is a perspective view, showing hidden surfaces, of a roll capacitor, showing a terminal structure with offset contacts.

FIG. 60 shows another possible embodiment, with different structures possible for terminals 205 and 206. FIG. 60 shows a capacitor in perspective view, with the hidden face occupied by end spray 204 partially delineated by a dashed line. Here terminals 205 and 206 can have the form of simple lead wires attached to end sprays 203 and 204 respectively, or can be more complex in form. Terminal 205 is connected to end spray 203 not at the center of the face occupied by end spray 203, but rather at a distance along a radius vector 235. Terminal 206 is connected to end spray 204 at a distance along a radius vector 236, which points substantially opposite in direction than radius vector 235, relative to capacitor axis 237. Terminal 206 is likewise not connected at the center of the face occupied by end spray 204, and is preferably but not necessarily connected at a distance along radius vector 236 that is similar to the distance at which terminal 205 is connected along radius vector 235.

Thus, the points of initial contact for terminals 205 and 206 are offset with respect to one another, on their respective faces. The result of this offset can be that those current paths through the capacitor as a whole which must travel a longer distance, within end spray 203 from terminal 205 to reach a given plate segment, would have a shorter distance to travel within end spray 204 from that given plate segment to reach terminal 206. Conversely, those current paths which travel a shorter distance, within end spray 203 from terminal 205 to reach a given plate segment, would have a longer distance to travel within end spray 204 from that given plate segment to reach terminal 206. The consequence is that the current paths through the capacitor as a whole will be more nearly equal in length among all plate segments, thereby producing the advantage of better simultaneity, henceless time smearing of the signal being processed by the capacitor.

A sufficient criterion for distinguishing the terminal structure aspect of the present invention is that a terminal contacts a face of said capacitor but does not contact the point that is located at the center of this face. It can be appreciated that this structural aspect of the capacitor serves the same goal and general function as other structural aspects also taught by the present invention, namely improving simultaneity through the capacitor and thereby improving electrical performance.

The present invention encompasses structures employing more plates than the two 201,202. The present invention encompasses such a structure so long as no two plates are mutually coplanar in their entirety, and so long as at least one plate is segmented in accordance with the teachings of the present invention.

Although the present invention has been described in considerable detail in the above specification, it is not intended that the invention be limited to such detail except as necessitated by the appended claims or their legal equivalent.

I claim:

1. A wound capacitor comprising,
   a first electrode comprising a first plurality of discrete segments joined by a first electrical conductor along one edge of said first electrode,
   a dielectric layer,
   a second electrode comprising a second plurality of discrete segments joined by a second electrical conductor along one edge of said second electrode,
   said first electrode, said dielectric layer, and said second electrode being wound into a spiral of N turns, said first and second electrodes being spaced apart by a distance H,
   wherein each of said segments is approximately of a length L, where $L=4\pi H\ N$.

2. The capacitor of claim 1 wherein each of said segments is approximately of said length L within a factor of 50.

3. The capacitor of claim 1 wherein each of said segments is substantially exactly of said length L.

4. The capacitor of claim 1 wherein subareas of a plurality of segments, from among said first plurality of discrete segments, are mutually substantially coradial from an axis of said capacitor.

5. The capacitor of claim 1 wherein no plurality of distinctly electrically connected electrodes are mutually coplanar in their entirety and no plurality of distinctly electrically connected electrodes are mutually coradial in their entirety from an axis of said capacitor.

6. The capacitor of claim 1 wherein each segment of said first plurality of segments is electrically connected through substantially the entirety of the length and thickness dimensions of said each segment.

7. The capacitor of claim 1 wherein at least one segment of said first plurality of segments is greater in length than in width.

8. A stacked capacitor comprising,
   a first electrode comprising a first plurality of discrete segments joined by a first electrical conductor along one edge of said first electrode,
   a dielectric layer,
   a second electrode comprising a second plurality of discrete segments joined by a second electrical conductor along one edge of said second electrode,
   said first electrode, said dielectric layer, and said second electrode being laminated to form a stacked capacitor of substantially fixed capacitance,
   said first plurality of segments including first and second end segments and at least first and second intermediate segments formed between said first and second end segments, said first and second intermediate segments being separated by a first number of intermediate segments, where said first number may be odd or even, with zero being regarded as an even number,
   said second plurality of segments including first and second end segments and at least first and second intermediate segments formed between said first and second end segments, said first and second intermediate segments being separated by a second number of intermediate segments, where said second number is identically odd or even as said first number,
   said first intermediate segment of said first plurality of segments being oppositely disposed to at least said first intermediate segment of said second plurality of segments such that these two segments overlap by a first area of a first given dimension,
   said second intermediate segment of said first plurality of segments being oppositely disposed to at least said second intermediate segment of said second plurality of segments such that these two segments overlap by a second area of a second given dimension,
   wherein said first and second areas have substantially different dimensions.

9. The capacitor of claim 8 wherein said stacked capacitor is formed into a three dimensional shape.

10. The capacitor of claim 8 wherein subareas of a plurality of segments, from among said first plurality of discrete segments, are mutually substantially coplanar, or are mutually substantially coradial from an axis of said capacitor.

11. The capacitor of claim 8 wherein no plurality of distinctly electrically connected electrodes are mutually coplanar in their entirety and no plurality of distinctly electrically connected electrodes are mutually coradial in their entirety from an axis of said capacitor.

12. The capacitor of claim 8 wherein each segment of said first plurality of segments is electrically connected through substantially the entirety of the length and thickness dimensions of said each segment.

13. The capacitor of claim 8 wherein at least one segment of said first plurality of segments is greater in length than in width.

* * * * *